US010185449B2

(12) United States Patent
Shishido et al.

(10) Patent No.: US 10,185,449 B2
(45) Date of Patent: Jan. 22, 2019

(54) TOUCH PANEL

(71) Applicant: Semiconductor Energy Laboratory Co., Ltd., Atsugi-shi, Kanagawa-ken (JP)

(72) Inventors: Hideaki Shishido, Atsugi (JP); Yoshiharu Hirakata, Ebina (JP); Daisuke Kubota, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 435 days.

(21) Appl. No.: 15/140,626

(22) Filed: Apr. 28, 2016

(65) Prior Publication Data
US 2016/0328051 A1    Nov. 10, 2016

(30) Foreign Application Priority Data

May 8, 2015  (JP) ................. 2015-095745
May 8, 2015  (JP) ................. 2015-095796

(51) Int. Cl.
*G06F 3/045* (2006.01)
*G06F 3/044* (2006.01)
*G02F 1/1333* (2006.01)
*G06F 3/041* (2006.01)
*G09G 3/00* (2006.01)

(52) U.S. Cl.
CPC .......... *G06F 3/044* (2013.01); *G02F 1/13338* (2013.01); *G06F 3/0412* (2013.01); *G06F 3/0416* (2013.01); *G09G 3/00* (2013.01); *G06F 2203/04102* (2013.01); *G06F 2203/04103* (2013.01); *G06F 2203/04107* (2013.01);
(Continued)

(58) Field of Classification Search
CPC ...... G06F 3/044; G06F 3/0416; G06F 3/0412; G06F 2203/04102; G06F 2203/04103; G06F 2203/04107; G06F 2203/04111; G06F 2203/04112; G09G 3/00; G02F 1/13338
See application file for complete search history.

(56) References Cited

U.S. PATENT DOCUMENTS 7,460,354 B2 * 12/2008 Shimizu ................. H01G 4/012
361/303
9,099,562 B2     8/2015 Akimoto et al.
(Continued)

FOREIGN PATENT DOCUMENTS

JP    2007-096055    4/2007
JP    2007-123861    5/2007

*Primary Examiner* — Claire X Pappas
*Assistant Examiner* — Gerald Oliver
(74) *Attorney, Agent, or Firm* — Robinson Intellectual Property Law Office; Eric J. Robinson

(57) ABSTRACT

To provide a thin touch panel, a touch panel with high visibility, a lightweight touch panel, or a touch panel with low power consumption. A pair of conductive layers is included in a capacitive touch sensor. The two conductive layers have a mesh shape including a plurality of openings. Furthermore, the conductive layers are provided to overlap with a region between two display elements in a plan view. Furthermore, the conductive layers included in the touch sensor are provided between two substrates included in the touch panel, and a conductive layer capable of supplying a constant potential is provided between a circuit which drives a display element and the pair of conductive layers.

29 Claims, 54 Drawing Sheets

(52) U.S. Cl.
CPC .............. *G06F 2203/04111* (2013.01); *G06F 2203/04112* (2013.01)

(56) References Cited

U.S. PATENT DOCUMENTS

| | | | |
|---|---|---|---|
| 9,154,127 B2 | 10/2015 | Guard | |
| 9,202,987 B2 | 12/2015 | Takayama et al. | |
| 9,244,568 B2 | 1/2016 | Philipp | |
| 2004/0179325 A1* | 9/2004 | Togashi | H01G 4/012 361/306.3 |
| 2008/0218645 A1* | 9/2008 | Zhu | G02F 1/134363 349/33 |
| 2009/0200574 A1* | 8/2009 | Kopta | H01L 29/8611 257/104 |
| 2009/0212445 A1* | 8/2009 | Mimino | H01L 23/5222 257/786 |
| 2010/0072469 A1* | 3/2010 | Yamazaki | H01L 27/1225 257/43 |
| 2012/0299865 A1 | 11/2012 | Yu | |
| 2013/0127775 A1 | 5/2013 | Yilmaz et al. | |
| 2013/0321366 A1 | 12/2013 | Kozuma et al. | |
| 2014/0184951 A1* | 7/2014 | Yeh | G06F 3/044 349/12 |
| 2014/0306247 A1* | 10/2014 | Lee | H01L 33/387 257/88 |
| 2014/0306260 A1 | 10/2014 | Yamazaki et al. | |
| 2014/0374744 A1* | 12/2014 | Matsukura | H01L 27/088 257/43 |
| 2015/0062525 A1 | 3/2015 | Hirakata | |
| 2015/0318339 A1 | 11/2015 | Nakamura et al. | |
| 2015/1034686 | 12/2015 | Kusunoki et al. | |
| 2016/0041644 A1* | 2/2016 | Bae | G06F 3/044 345/174 |
| 2016/0098120 A1 | 4/2016 | Miyake | |
| 2016/0179259 A1 | 6/2016 | Watanabe et al. | |
| 2016/0195983 A1 | 7/2016 | Miyake | |
| 2016/0274398 A1 | 9/2016 | Hirakata et al. | |
| 2016/0274699 A1 | 9/2016 | Shishido et al. | |
| 2016/0282990 A1 | 9/2016 | Kimura et al. | |

* cited by examiner 33R 33G 33B 33

33R 33G 33B 33

33R 33G 33B 33Y 33

33R 33G 33B 33Y 33

23 33B 33Y 33

33G 33R 23 33B 33R 33

33G 23 33B 33R 33

23a 33G 33R 33G 33B 33

33R 33G 33B 33

33R 33G 33B 33Y 33

33R 33G 33B 33Y 33

23 33B 33Y 33

33G 33R 23 33B 33R 33

33G 23 33B 33R 33

23a 33G

During a writing period 3510
3511

During a sensing period 3510
3511

FIG. 33A1
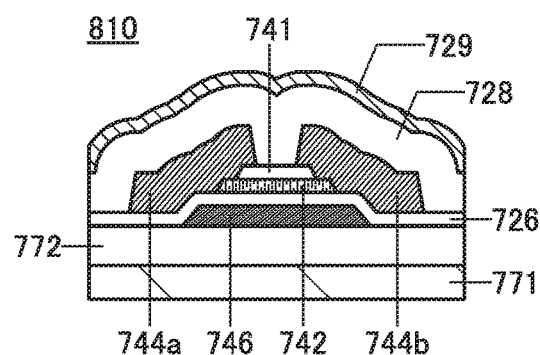
FIG. 33A2
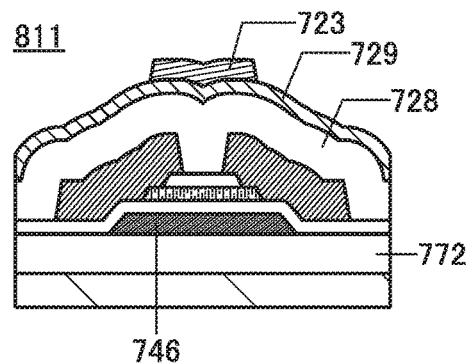
FIG. 33B1
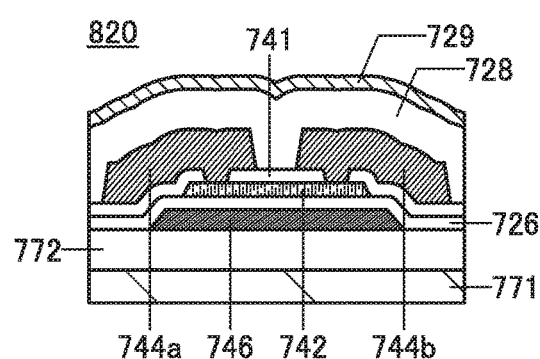
FIG. 33B2
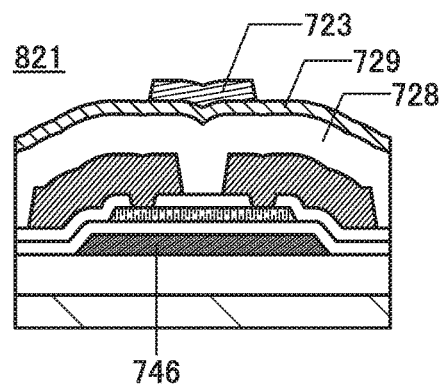
FIG. 33C1
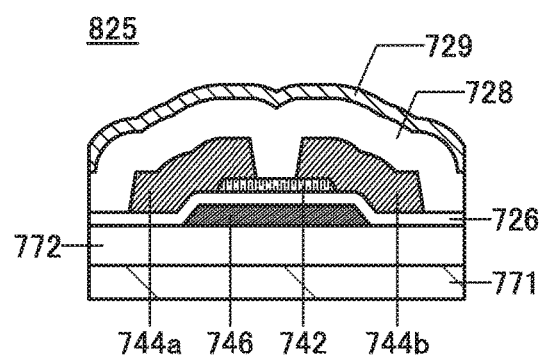
FIG. 33C2
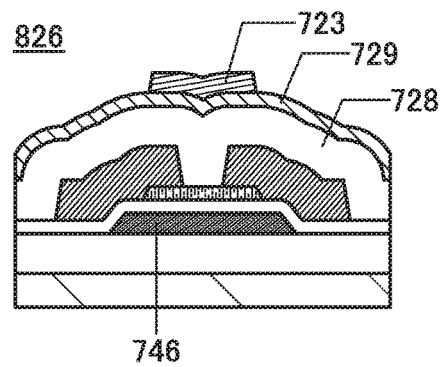

FIG. 34A1
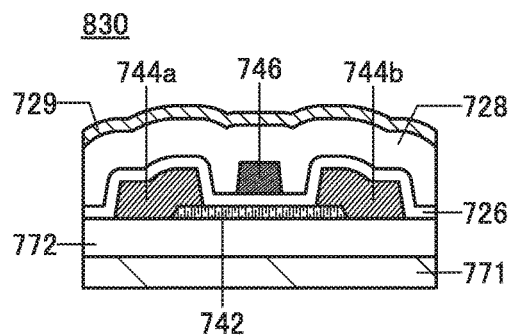
FIG. 34A2
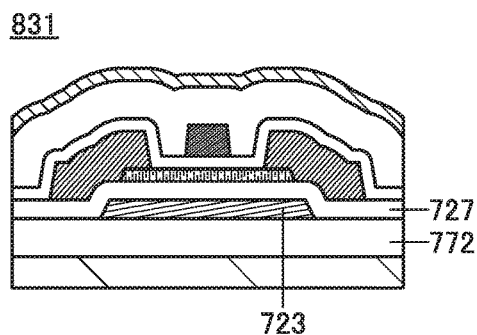
FIG. 34A3
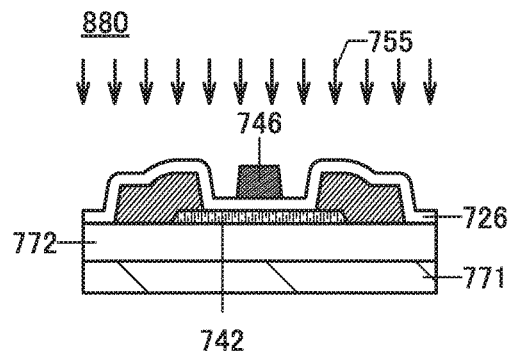
FIG. 34B1
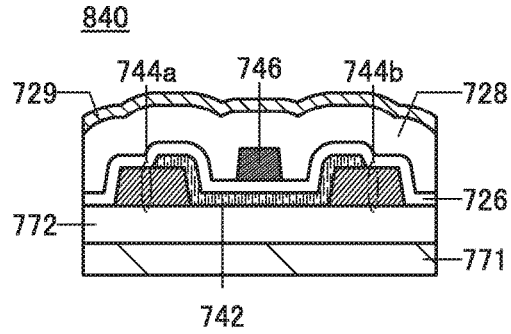
FIG. 34B2
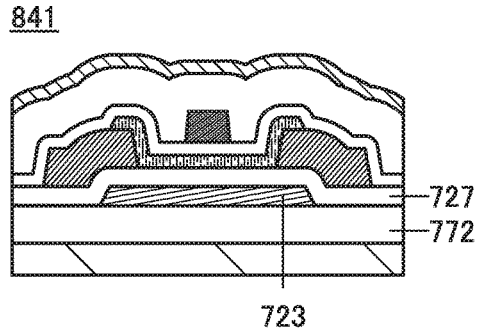

FIG. 35A1
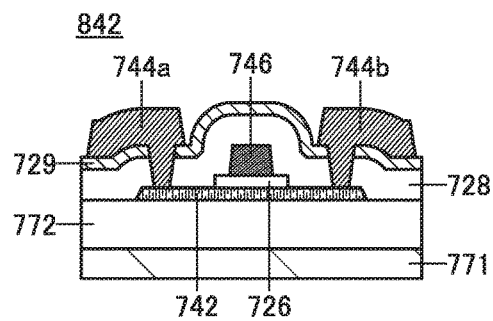
FIG. 35A2
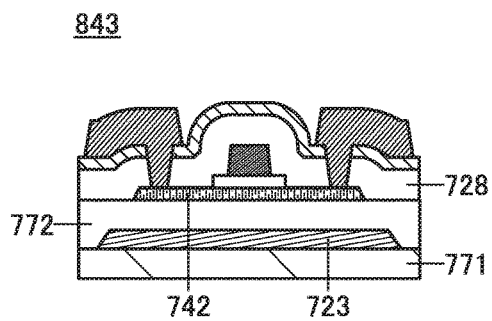
FIG. 35A3
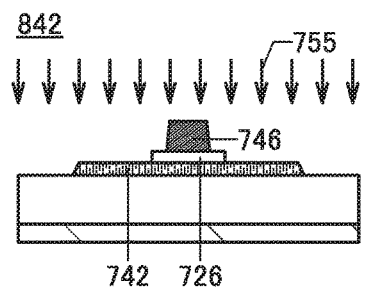
FIG. 35B1
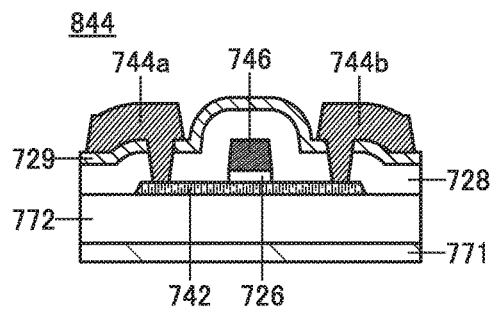
FIG. 35B2
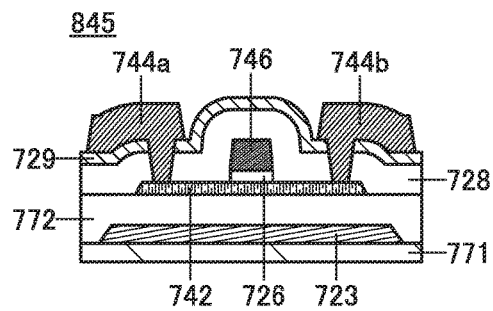
FIG. 35C1
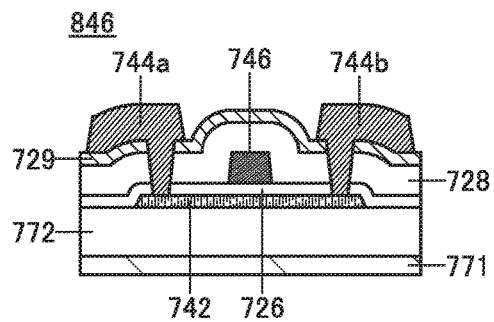
FIG. 35C2
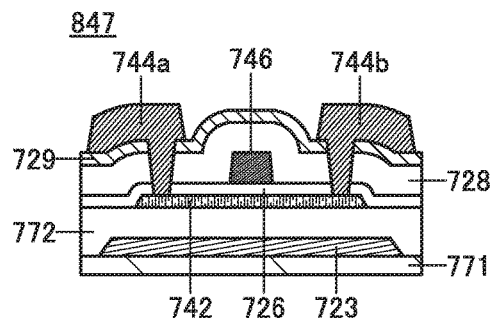

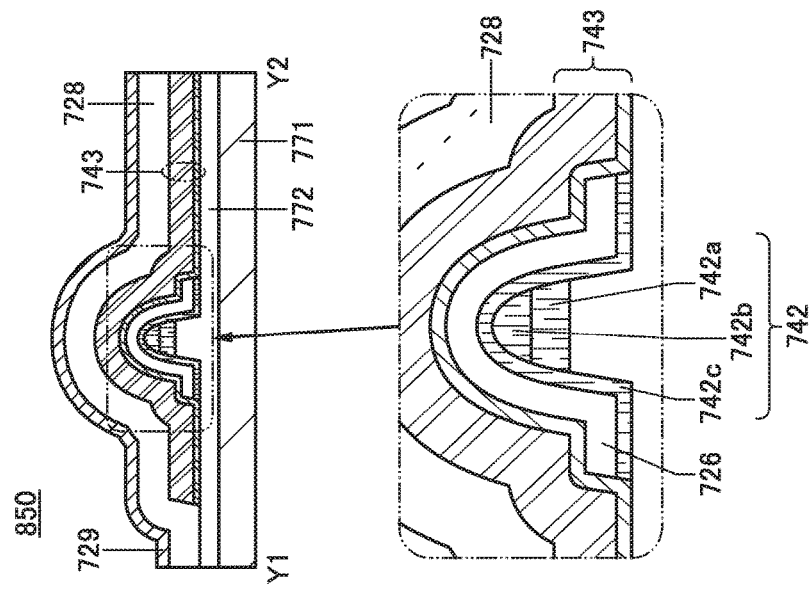
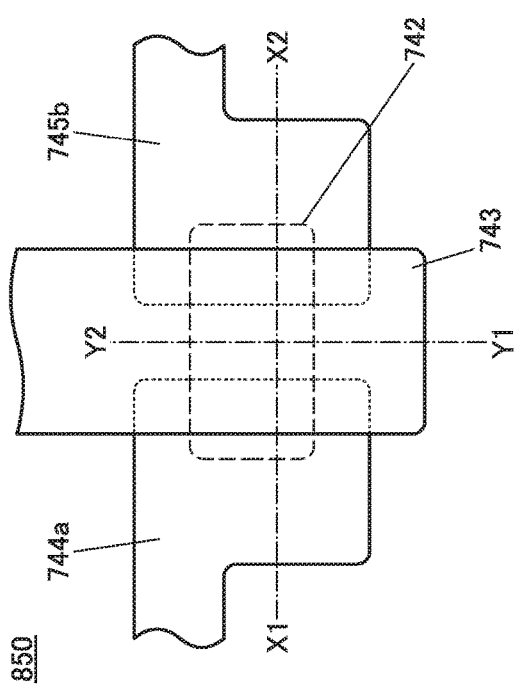
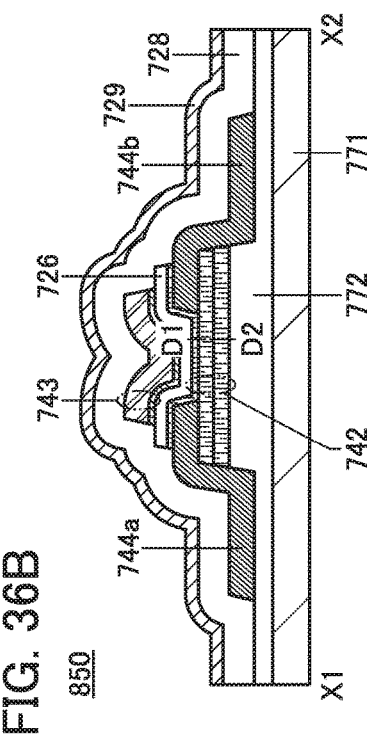

Cross sectional view taken along
the channel length direction

Cross sectional view taken along
the channel width direction

Cross sectional view taken along the channel width direction

Cross sectional view taken along the channel length direction

Cross sectional view taken along the channel width direction

Cross sectional view taken along the channel length direction

Cross sectional view taken along
the channel width direction

Cross sectional view taken along
the channel length direction

FIG. 46A
FIG. 46C
Cross sectional view taken along the channel width direction
FIG. 46B
Cross sectional view taken along the channel length direction
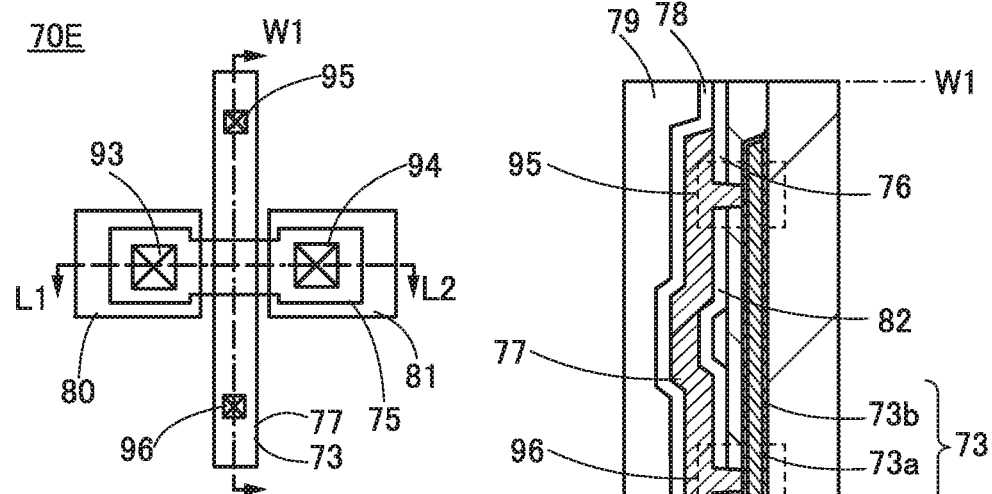
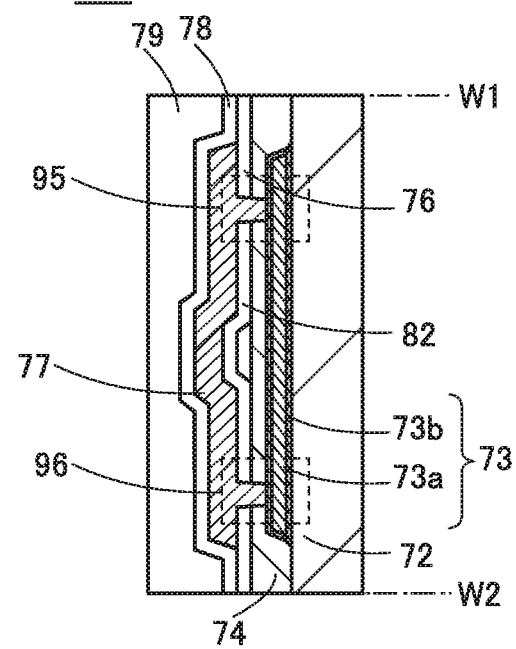
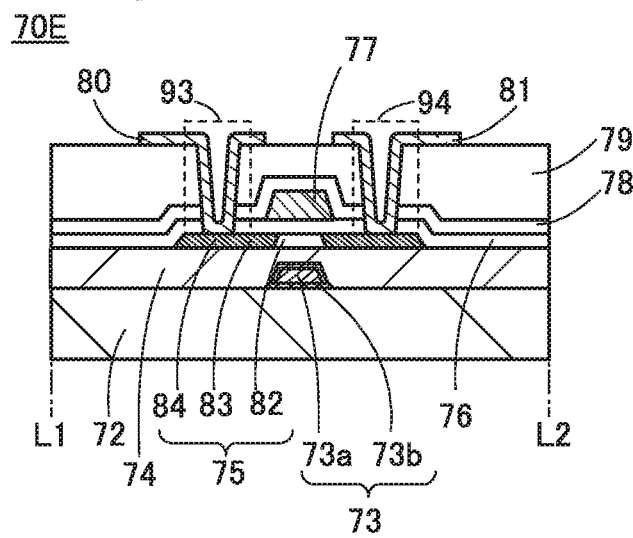

TOUCH PANEL

BACKGROUND OF THE INVENTION

1. Field of the Invention

One embodiment of the present invention relates to an input device. One embodiment of the present invention relates to a display device. One embodiment of the present invention relates to an input/output device. One embodiment of the present invention relates to a touch panel.

Note that one embodiment of the present invention is not limited to the above technical field. One embodiment of the invention disclosed in this specification and the like relates to an object, a method, or a manufacturing method. Examples of the technical field of one embodiment of the present invention disclosed in this specification include a semiconductor device, a display device, a light-emitting device, a power storage device, a memory device, an electronic device, a lighting device, an input device, an input/output device, a driving method thereof, and a manufacturing method thereof.

In this specification and the like, a semiconductor device generally means a device that can function by utilizing semiconductor characteristics. A semiconductor element such as a transistor, a semiconductor circuit, an arithmetic device, and a memory device are each an embodiment of a semiconductor device. An imaging device, a display device, a liquid crystal display device, a light-emitting device, an input device, an input/output device, an electro-optical device, a power generation device (including a thin film solar cell, an organic thin film solar cell, and the like), and an electronic device may each include a semiconductor device.

2. Description of the Related Art

In recent years, a display device provided with a touch sensor as a position-input device has been in practical use. A display device provided with a touch sensor is called a touch panel, a touch screen, or the like (hereinafter also referred to simply as a touch panel). For example, a smartphone and a tablet terminal are examples of a portable information terminal provided with a touch panel.

As one of display devices, there is a liquid crystal display device provided with a liquid crystal element. For example, an active matrix liquid crystal display device, in which pixel electrodes are arranged in a matrix and transistors are used as switching elements connected to respective pixel electrodes, has attracted attention.

For example, an active matrix liquid crystal display device including transistors, in which metal oxide is used for a channel formation region, as switching elements connected to respective pixel electrodes is already known (Patent Documents 1 and 2).

It is known that an active matrix liquid crystal display device is classified into two major types: transmissive type and reflective type.

In a transmissive liquid crystal display device, a backlight such as a cold cathode fluorescent lamp is used, and a state in which light from the backlight is transmitted through liquid crystal and output to the outside of the liquid crystal display device or a state in which light is not output is selected using optical modulation action of liquid crystal, whereby bright and dark images are displayed. Furthermore, those displays are combined to display an image.

In a reflective liquid crystal display device, a state in which external light, that is, incident light is reflected at a pixel electrode and output to the outside of the device or a state in which incident light is not output to the outside of the device is selected using optical modulation action of liquid crystal, whereby bright and dark images are displayed. Furthermore, those displays are combined to display an image. Compared to the transmissive liquid crystal display device, the reflective liquid crystal display device has the advantage of low power consumption since the backlight is not used.

REFERENCE

Patent Document

[Patent Document 1] Japanese Published Patent Application No. 2007-123861
[Patent Document 2] Japanese Published Patent Application No. 2007-096055

SUMMARY OF THE INVENTION

What is desirable is a touch panel in which a display panel is provided with a function of inputting data with a finger, a stylus, or the like touching a screen as a user interface.

Furthermore, it is demanded that an electronic appliance using a touch panel is reduced in thickness and weight. Therefore, a touch panel itself is required to be reduced in thickness and weight.

For example, in a touch panel, a touch sensor can be provided on the viewer side (the display surface side) of a display panel.

In a touch panel where a capacitive touch sensor is provided so as to overlap with the display surface side of a display panel, when the distance between a pixel or a wiring of the display panel and an electrode or a wiring of the touch sensor is reduced, the touch sensor is likely to be influenced by noise caused when the display panel is driven by the touch sensor, which results in a reduction of the detection sensitivity of the touch panel in some cases.

One object of one embodiment of the present invention is to provide a thin touch panel. Another object is to provide a touch panel with high visibility. Another object is to provide a lightweight touch panel. Another object is to provide a touch panel with low power consumption.

Another object is to provide a novel input device. Another object is to provide a novel input/output device.

Note that the descriptions of these objects do not disturb the existence of other objects. In one embodiment of the present invention, there is no need to achieve all the objects. Other objects can be derived from the description of the specification, the drawings, the claims, and the like.

One embodiment of the present invention is a touch panel including a first substrate, a first conductive layer, a second conductive layer, a third conductive layer, a fourth conductive layer, and a liquid crystal layer. The third conductive layer is over the first substrate. The fourth conductive layer is apart from the third conductive layer on the same plane. The liquid crystal layer is positioned above the third conductive layer. The second conductive layer is positioned above the liquid crystal layer. The first conductive layer is positioned above the second conductive layer. The first conductive layer has a mesh shape having a plurality of openings. The second conductive layer has a function of transmitting visible light and includes a portion overlapping with the third conductive layer and a portion overlapping with the fourth conductive layer. The third conductive layer and the fourth conductive layer each have a function of transmitting visible light. The third conductive layer includes a portion overlapping with one of the openings. The fourth conductive layer includes a portion overlapping with another one of the openings. Part of the first conductive layer is between the third conductive layer and the fourth conductive layer in a plan view.

In the above, it is preferable that the second conductive layer function as a common electrode and the third conductive layer and the fourth conductive layer each function as a pixel electrode.

Another embodiment of the present invention is a touch panel including a first substrate, a first conductive layer, a second conductive layer, a third conductive layer, a fourth conductive layer, a fifth conductive layer, and a liquid crystal layer. The fifth conductive layer is over the first substrate. The fifth conductive layer includes a portion overlapping with the third conductive layer and a portion overlapping with the fourth conductive layer. The fourth conductive layer is apart from the third conductive layer on the same plane. The liquid crystal layer is positioned above the third conductive layer and the fifth conductive layer. The second conductive layer is positioned above the liquid crystal layer. The first conductive layer is positioned above the second conductive layer. The first conductive layer has a mesh shape including a plurality of openings. The second conductive layer has a function of transmitting visible light and includes a portion overlapping with the third conductive layer and a portion overlapping with the fourth conductive layer. The third conductive layer includes a portion overlapping with one of the openings. The fourth conductive layer includes a portion overlapping with another one of the openings. The third conductive layer and the fourth conductive layer, or the fifth conductive layer has a function of transmitting visible light. At least part of the first conductive layer is between the third conductive layer and the fourth conductive layer in a plan view. The third conductive layer or the fifth conductive layer has a comb-like shape or includes a slit. The one of the openings, the third conductive layer, and the fifth conductive layer overlap with one another in a region. The one of the openings and one of the third conductive layer and the fifth conductive layer overlap with each other and do not overlap with the other thereof in a region.

In the above, it is preferable that the third conductive layer and the fourth conductive layer each function as a pixel electrode and the fifth conductive layer function as a common electrode.

In the above, the fifth conductive layer is preferably below the third conductive layer and the fourth conductive layer.

In the above, the second conductive layer is preferably electrically connected to a terminal supplied with a constant potential.

In the above, it is preferable that a second substrate be provided above the first conductive layer, and the first conductive layer and the second conductive layer be formed over the second substrate.

In the above, it is preferable that a light-blocking layer be provided above the first conductive layer and a portion where the light-blocking layer and the first conductive layer overlap with each other be provided.

In the above, a circularly polarizing plate is preferably provided above the first conductive layer.

In the above, it is preferable that a first coloring layer and a second coloring layer be positioned above the third conductive layer, the first coloring layer include a region overlapping with the one of the openings, and the second coloring layer include a region overlapping with the another one of the openings. In that case, the first conductive layer preferably includes a portion overlapping with at least one of the first coloring layer and the second coloring layer.

In the above, it is preferable that a spacer be provided above the third conductive layer and below the second conductive layer and include a portion overlapping with the first conductive layer.

In the above, it is preferable that a transistor be between the liquid crystal layer and the first substrate, one of a source and a drain of the transistor be electrically connected to the third conductive layer, and the transistor include a semiconductor layer containing an oxide semiconductor. It is preferable that the transistor include a first gate electrode and a second gate electrode, the first gate electrode be positioned below the semiconductor layer, the second gate electrode be positioned above the semiconductor layer, and the second gate electrode, the semiconductor layer, and the third conductive layer overlap with one another in a region. Moreover, the second gate electrode and the semiconductor layer preferably contain the same metal element.

Alternatively, in the above, it is preferable that a transistor be between the liquid crystal layer and the first substrate, one of a source and a drain of the transistor be electrically connected to the third conductive layer, and the transistor include a semiconductor layer containing amorphous silicon, polycrystalline silicon, or single-crystal silicon. In that case, it is preferable that the transistor include a first gate electrode and a second gate electrode, the first gate electrode be positioned below the semiconductor layer, the second gate electrode be positioned above the semiconductor layer, and the second gate electrode, the semiconductor layer, and the third conductive layer overlap with one another in a region.

According to one embodiment of the present invention, a thin touch panel can be provided. Alternatively, a touch panel with high visibility can be provided. Alternatively, a lightweight touch panel can be provided. Alternatively, a touch panel with low power consumption can be provided.

One embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIGS. 33A1, 33A2, 33B1, 33B2, 33C1, and 33C2 are cross-sectional views each illustrating one embodiment of a transistor.

FIGS. 34A1, 34A2, 34A3, 34B1, and 34B2 are cross-sectional views each illustrating one embodiment of a transistor.

FIGS. 35A1, 35A2, 35A3, 35B1, 35B2, 35C1, and 35C2 are cross-sectional views each illustrating one embodiment of a transistor.

FIGS. 36A to 36C are a plan view and cross-sectional views illustrating one embodiment of a transistor.

FIGS. 46A to 46C are a plan view and cross-sectional views illustrating one embodiment of a transistor.

DETAILED DESCRIPTION OF THE INVENTION

Figure 1A:
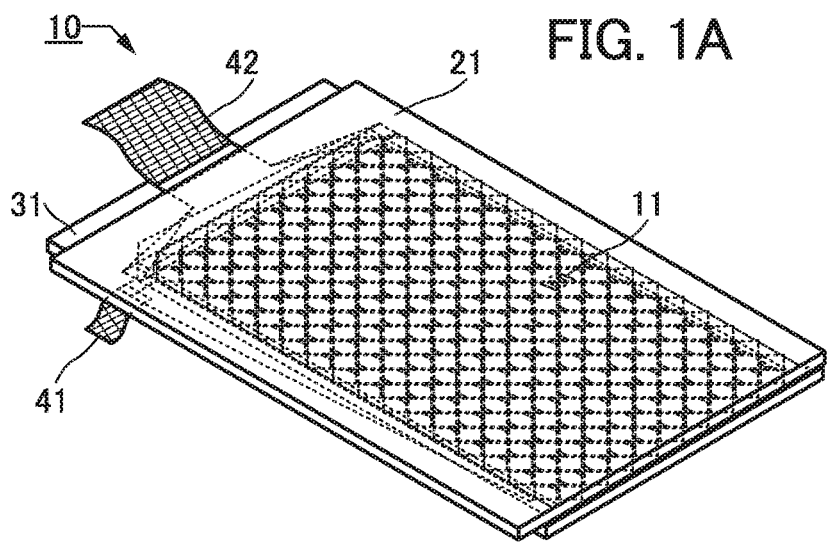
FIGS. 1A and 1B show a structure example of a touch panel module of an embodiment.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. Furthermore, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, embodiments of the present invention are not limited to such a scale.

Note that in this specification and the like, ordinal numbers such as "first", "second", and the like are used in order to avoid confusion among components and do not limit the number.

Note that the terms "film" and "layer" can be interchanged with each other in some cases. For example, in some cases, the term "conductive film" can be used instead of the term "conductive layer," and the term "insulating layer" can be used instead of the term "insulating film."

Embodiment 1

In this embodiment, a structure example of an input device (a touch sensor) of one embodiment of the present invention, and a structure example of an input/output device (a touch panel) including the input device of one embodiment of the present invention and a display device (a display panel) are described with reference to drawings.

In the following description, a capacitive touch sensor is used as the touch sensor of one embodiment of the present invention.

Note that in this specification and the like, a touch panel has a function of displaying or outputting an image or the like on or to a display surface and a function as a touch sensor capable of detecting contact or proximity of an object such as a finger or a stylus on or to the display surface. Therefore, the touch panel is an embodiment of an input/output device.

In this specification and the like, a structure in which a connector such as a flexible printed circuit (FPC) or a tape carrier package (TCP) is attached to a substrate of a touch panel, or a structure in which an integrated circuit (IC) is mounted on a substrate by a chip on glass (COG) method is referred to as a touch panel module or simply referred to as a touch panel in some cases.

A capacitive touch sensor that can be used for one embodiment of the present invention includes a pair of conductive layers. Capacitive coupling is generated between the conductive layers. The capacitance of the pair of conductive layers changes when an object touches or gets close to the pair of conductive layers. Utilizing this effect, detection can be conducted.

Examples of the capacitive touch sensor are a surface capacitive touch sensor and a projected capacitive touch sensor. Examples of a projected capacitive touch sensor are a self-capacitive touch sensor and a mutual capacitive touch sensor, which differ mainly in the driving method. The use of a mutual capacitive touch sensor is preferable because multiple points can be detected simultaneously.

A pair of conductive layers is included in the touch sensor. It is preferable that conductive layers included in the touch sensor each have an opening. It is more preferable that the conductive layers have a mesh shape having a plurality of openings. It is preferable that the opening and a display element overlap with each other. Such a structure enables extraction of light emitted from the display element to the outside through the opening, and therefore, the conductive layers included in the touch sensor do not necessarily have a light-transmitting property. That is, a material such as metal or alloy that has lower resistance than a light-transmitting conductive material can be used as a material for the pair of conductive layers included in the touch sensor. This reduces the influence of detection signal delay or the like and increases the detection sensitivity of the touch panel. Furthermore, such a structure can be applied to large-sized display devices such as televisions as well as portable devices.

Furthermore, it is preferable that the conductive layers included in the touch sensor be provided to overlap with a region between two display elements in a plan view. In this case, it is more preferable that a material blocking visible light be used for the conductive layers. Such a structure allows the pair of conductive layers to function as a light-blocking layer for preventing color mixture between adjacent pixels. Thus, it is not necessary to provide a black matrix or the like as a light-blocking layer and the manufacturing process can be simplified, which leads to high yield, low manufacturing cost, and the like. Moreover, by applying such a touch sensor, a touch panel having high visibility can be obtained.

It is preferable that a light-blocking layer or a circularly polarizing plate be provided closer to the display surface side than the pair of conductive layers included in the touch sensor are. This can reduce or prevent reflection of external light caused by the conductive layers, and the conductive layers are less likely to be recognized by a user.

Furthermore, the conductive layers included in the touch sensor are provided in a region other than an optical path of light from the display element; thus, moire is not generated in principle. Here, moire means interference fringes generated in the case where two or more regular patterns overlap with each other. As a result, a touch panel having extremely high display quality can be obtained.

As a display element in a touch panel of one embodiment of the present invention, a variety of display elements, for example, a liquid crystal element, an optical element utilizing micro electro mechanical systems (MEMS), a light-emitting element such as an organic electroluminescence (EL) element or a light-emitting diode (LED), and an electrophoretic element can be used.

Here, a transmissive liquid crystal display device including a liquid crystal element as a display element is preferably used for the touch panel.

Moreover, it is preferable that the pair of conductive layers included in the touch sensor be provided between two substrates included in the touch panel. In particular, it is preferable that the conductive layer included in the touch sensor have a plurality of openings. Such a conductive layer can have a reduced surface area. Therefore, electrical noise in driving of the display element is hardly transmitted to the conductive layer as compared with the case where a light-transmitting conductive film without openings is used as the conductive layer included in the touch sensor, for example. In other words, even when both a display element and a conductive film included in the touch sensor are provided between the two substrates, high detection sensitivity can be achieved. As a result, a thin touch panel having high detection sensitivity can be provided.

Furthermore, it is more preferable that a conductive layer capable of supplying a constant potential be provided between a circuit for driving a display element and the pair of conductive layers included in the touch sensor. Such a conductive layer can function as a shield layer. Specifically, the conductive layer can prevent transmission of noise from the circuit for driving the display element to the touch sensor. The conductive layer can also prevent transmission of noise in driving of the touch sensor to the display element, the circuit for driving the display element, a wiring included in the circuit, or the like. Therefore, the display element and the touch sensor can be driven at the same time or can be driven not in synchronization without taking measures, for example, without preventing influence of noise by driving the display element and the touch sensor at different timings. As a result, a smooth moving image can be displayed by, for example, increasing the drive frequency (also referred to as frame rate) of the display element. Furthermore, the sensing accuracy can be increased by, for example, increasing the drive frequency of the touch sensor. Moreover, the drive frequency of the display element and the drive frequency of the touch sensor each can be freely set. For example, by providing a period during which one or both of the drive frequencies are low depending on conditions, power consumption can be reduced.

In particular, it is preferable to use a vertical electric field mode liquid crystal element where a first conductive layer functions as one of a common electrode and a pixel electrode of a liquid crystal element while a second conductive layer functions as the other one of the common electrode and the pixel electrode, the pixel electrode being provided on the side of one substrate and the common electrode being provided on the side of the other substrate. In other words, it is preferable that the common electrode be positioned between the pair of conductive layers included in the touch sensor and a transistor or a wiring included in the pixel. With such a structure, the common electrode can function as a shield layer.

A more specific structure example of one embodiment of the present invention is described below with reference to drawings.

Structure Example

Figure 1B:
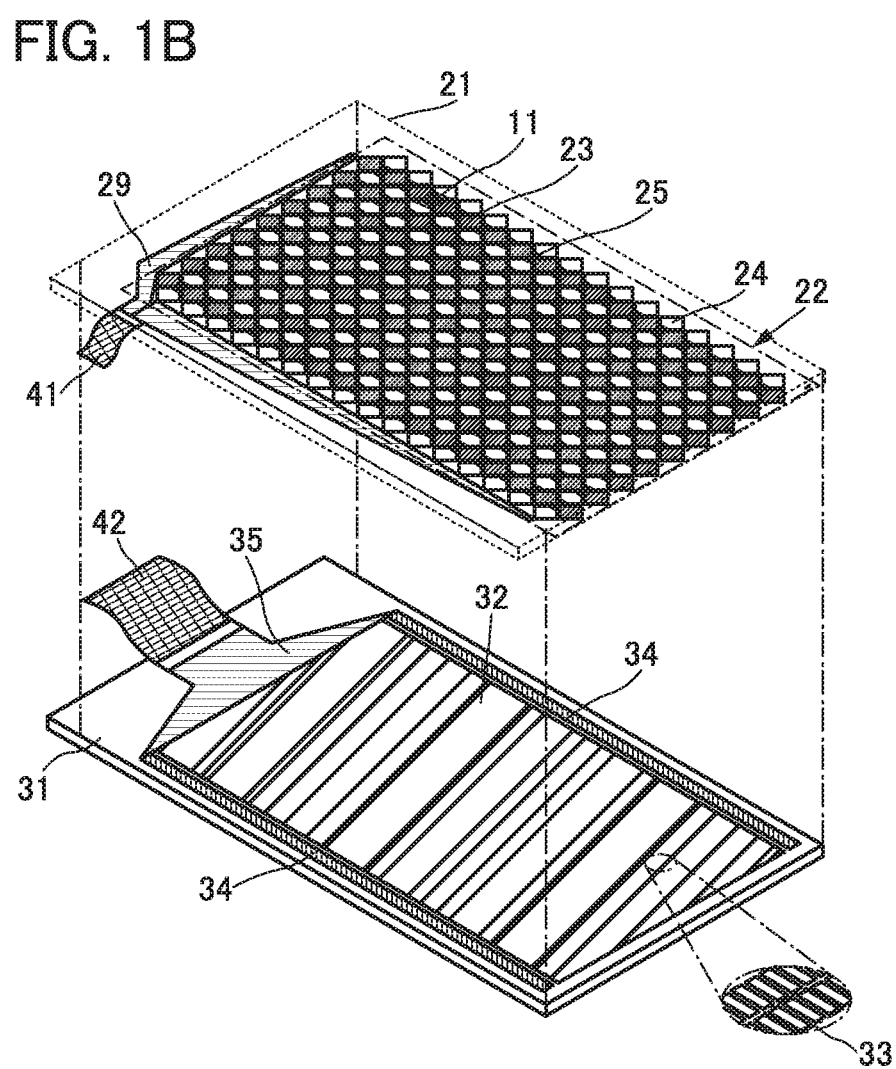

FIG. 1A is a schematic perspective view of a touch panel module 10 of one embodiment of the present invention. FIG. 1B is a schematic perspective view of the touch panel module 10 in which two substrates are separated. In the touch panel module 10, a substrate 31 and a substrate 21 are attached to each other. The touch sensor 22 is provided on the substrate 21 side.

The substrate 21 is provided with an FPC 41. Furthermore, the touch sensor 22 is provided on a surface on the display panel side of the substrate 21. The touch sensor 22 includes a conductive layer 23, a conductive layer 24, a conductive layer 25, and the like. Furthermore, the touch sensor 22 includes a wiring 29 which electrically connects these conductive layers to the FPC 41. The FPC 41 has a function of supplying a signal from the outside to the touch sensor 22. Furthermore, the FPC 41 has a function of outputting a signal from the touch sensor 22 to the outside. Note that the substrate without the FPC 41 is simply referred to as a touch panel in some cases.

Note that the substrate 21 over which the touch sensor 22 is formed also can be used alone as a touch sensor substrate or a touch sensor module. For example, such a substrate can be attached to the display surface side of the display panel to form a touch panel.

The touch sensor 22 includes a plurality of conductive layers 23, a plurality of conductive layers 24, and a plurality of conductive layers 25. Each of the conductive layers 23 has a shape extending in one direction. The plurality of conductive layers 23 are arranged in a direction crossing the extending direction. Each of the conductive layers 24 is positioned between two adjacent conductive layers 23. Each of the conductive layers 25 electrically connects two conductive layers 24 adjacent in the direction crossing the extending direction of the conductive layers 23. That is, the plurality of conductive layers 24 arranged in the direction crossing the extending direction of the conductive layers 23 are electrically connected to each other with the plurality of conductive layers 25.

Here, there is a region where the conductive layer 23 and the conductive layer 25 overlap with each other. An insulating layer is provided between the conductive layer 23 and the conductive layer 25.

Capacitive coupling occurs between the conductive layers 23 and 24 adjacent to each other. That is, a capacitor 11 is formed by the conductive layer 23 and the conductive layer 24. For example, in the case of employing a projected capacitive driving method, one of the conductive layers 23 and 24 can be used as a transmission-side electrode, and the other thereof can be used as a reception-side electrode.

Note that here, the plurality of conductive layers 24 are electrically connected to each other with the conductive layer 25. Alternatively, it is possible to employ a structure in which the conductive layer 24 has a shape extending in one direction like the conductive layer 23, an insulating layer is provided between the conductive layer 23 and the conductive layer 24, and the conductive layer 25 is not provided. In this case, the conductive layer 23 and the conductive layer 24 partly overlap with each other.

Note that, for example, a low-resistance material is preferably used as a material of conductive films such as the conductive layer 23, the conductive layer 24, and the conductive layer 25, i.e., a wiring and an electrode in the touch panel. As an example, metal such as silver, copper, or aluminum may be used. Alternatively, a metal nanowire including a number of conductors with an extremely small width (for example, a diameter of several nanometers) may be used. Examples of such a metal nanowire include an Ag nanowire, a Cu nanowire, and an Al nanowire. In the case of using an Ag nanowire, light transmittance of 89% or more and a sheet resistance of 40 ohm/square or more and 100 ohm/square or less can be achieved. Note that because such a metal nanowire provides high transmittance, the metal nanowire may be used for an electrode of the display element, e.g., a pixel electrode or a common electrode.

Alternatively, conductive oxide can be used for at least one of the conductive layer 23, the conductive layer 24, the conductive layer 25, and the like. For example, a conductive material containing indium oxide, tin oxide, or zinc oxide may be used. In the case where a material that transmits visible light is used for the conductive layer 23, the conductive layer 24, or the conductive layer 25, the conductive layer and a display element may be provided to overlap with each other and light from the display element may be emitted through the conductive layer. In other words, in the case where a material that transmits visible light is used, the conductive layer does not necessarily have a mesh-like top surface.

A display portion 32 is provided over the substrate 31. The display portion 32 includes a plurality of pixels 33 arranged in a matrix. Each pixel 33 preferably includes a plurality of sub-pixel circuits. Each sub-pixel circuit is electrically connected to a display element. A circuit 34 electrically connected to the pixel 33 in the display portion 32 is preferably provided over the substrate 31. For example, a circuit functioning as a gate driver circuit can be used as the circuit 34. An FPC 42 has a function of supplying a signal from the outside to at least one of the display portion 32 and the circuit 34. An IC functioning as a source driver circuit is preferably mounted on the substrate 31 or the FPC 42. The IC can be mounted on the substrate 31 by a COG method. Alternatively, the FPC 42, a TAB, a TCP, or the like on which an IC is mounted can be attached to the substrate 31.

The touch panel module of one embodiment of the present invention can output positional information based on the change in capacitance by the touch sensor 22 at the time of a touch motion. Furthermore, the display portion 32 can display an image.

CROSS-SECTIONAL STRUCTURE EXAMPLE

A cross-sectional structure example of the touch panel module 10 is described below with reference to drawings. The touch panel module 10 described below as an example is a module in which a vertical alignment (VA) mode transmissive liquid crystal element is used as a display element.

Cross-sectional Structure Example 1

Figure 2:
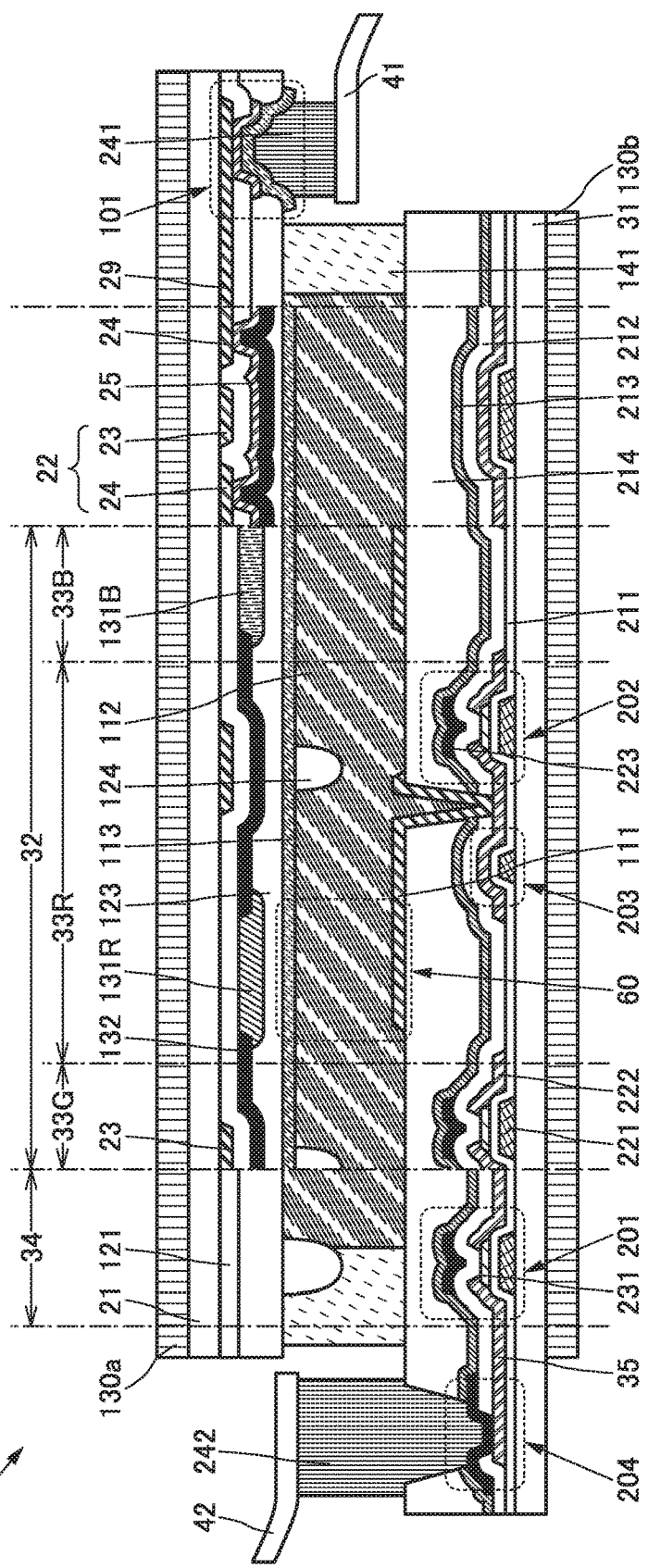
FIG. 2 shows a structure example of a touch panel module of an embodiment.

FIG. 2 is a schematic cross-sectional view of the touch panel module 10. FIG. 2 illustrates an example of cross sections of a region including the FPC 42, a region including the circuit 34, a region including the display portion 32, a region including the FPC 41, and the like in FIG. 1A.

The substrate 21 and the substrate 31 are attached to each other with an adhesive layer 141. A region surrounded by the substrate 21, the substrate 31, and the adhesive layer 141 is filled with a liquid crystal 112. A polarizing plate 130a is provided on an outer surface of the substrate 21. A polarizing plate 130b is provided on an outer surface of the substrate 31.

Although not illustrated, a backlight can be provided outside a region defined by the space comprised between the polarizing plate 130a and the polarizing plate 130b. As the backlight, a direct-below backlight or an edge-light backlight may be used. When a direct-below backlight including an LED is used, local dimming is easily performed; thus, contrast can be preferably increased. When an edge-light type backlight is used, the thickness of a touch panel module including the backlight can be preferably reduced.

The touch sensor 22 including the conductive layer 23 and the conductive layer 24, a connection portion 101, the wiring 29, a display element 60, a transistor 201, a transistor 202, a capacitor 203, a connection portion 204, a wiring 35, and the like are provided between the substrate 31 and the substrate 21.

Insulating layers such as an insulating layer 211, an insulating layer 212, an insulating layer 213, and an insulating layer 214 are provided over the substrate 31. A portion of the insulating layer 211 functions as a gate insulating layer of each transistor, and another portion thereof functions as a dielectric of the capacitor 203. The insulating layer 212, the insulating layer 213, and the insulating layer 214 are provided to cover each transistor, the capacitor 203, and the like. The insulating layer 214 functions as a planarization layer. Note that an example where the three insulating layers, the insulating layers 212, 213, and 214, are provided to cover the transistors and the like is described here; however, the present invention is not limited to this example, and four or more insulating layers, a single insulating layer, or two insulating layers may be provided. The insulating layer 214 functioning as a planarization layer is not necessarily provided when not needed.

A conductive layer 221, a conductive layer 222, a conductive layer 223, a semiconductor layer 231, a conductive layer 111, and the like are provided over the substrate 31. Here, a plurality of layers obtained by processing the same conductive film are denoted by the same reference numeral in some cases.

The conductive layer 221 can be used for one gate electrode of each transistor, one electrode of the capacitor 203, a wiring, or the like. The conductive layer 222 can be used for a source electrode or a drain electrode of each transistor, the other electrode of the capacitor 203, a wiring, or the like. The conductive layer 223 can be used for the other gate electrode of each transistor, a wiring, or the like. The semiconductor layer 231 can be used for a semiconductor layer of each transistor or the like.

FIG. 2 illustrates an example of cross sections of a sub-pixel 33R and parts of a sub-pixel 33G and a sub-pixel 33B which are adjacent to the sub-pixel 33R in the display portion 32. For example, the sub-pixel 33R is a sub-pixel exhibiting a red color, the sub-pixel 33G is a sub-pixel exhibiting a green color, and the sub-pixel 33B is a sub-pixel exhibiting a blue color; thus, full-color display can be achieved. The sub-pixel 33R includes, for example, the transistor 202, the capacitor 203, the display element 60, and a coloring layer 131R. Here, the sub-pixel circuit includes the transistor 202, the capacitor 203, a wiring, and the like.

FIG. 2 illustrates an example of the circuit 34 in which the transistor 201 is provided.

In the example illustrated in FIG. 2, the transistors 201 and 202 each have a structure in which the semiconductor layer 231 where a channel is formed is provided between two gate electrodes (conductive layers 221 and 223). Such a structure enables control of threshold voltages of transistors. The conductive layer 221 and the conductive layer 223 of any transistor may be connected to each other and operation may be performed by two gate electrodes. Such transistors can have higher field-effect mobility and thus have higher on-state current than other transistors. Consequently, a circuit capable of high-speed operation can be obtained. Furthermore, the area occupied by a circuit portion can be reduced. The use of the transistor having high on-state current can reduce signal delay in wirings and can reduce display unevenness even in a display panel or a touch panel in which the number of wirings is increased because of increase in size or resolution.

Figure 3:
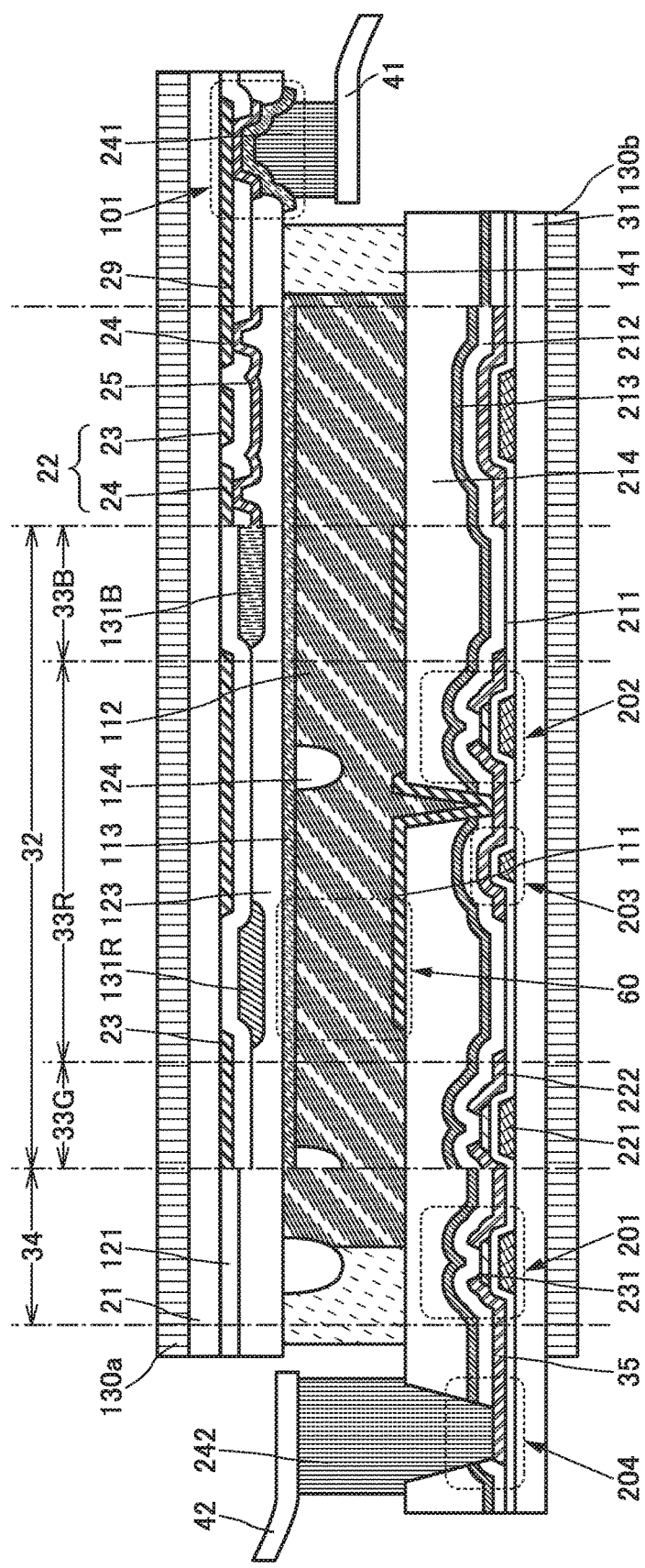
FIG. 3 shows a structure example of a touch panel module of an embodiment.

As illustrated in FIG. 3, a structure without the conductive layers 223 may be employed. When the conductive layer 223 is not provided, a manufacturing process of a touch panel can be simplified and manufacturing cost can be reduced.

Note that the transistor included in the circuit 34 and the transistor included in the display portion 32 may have the same structure. A plurality of transistors included in the circuit 34 may have the same structure or different structures. A plurality of transistors included in the display portion 32 may have the same structure or different structures.

A material through which impurities such as water or hydrogen do not easily diffuse is preferably used for at least one of the insulating layers 212 and 213 which cover the transistors. That is, the insulating layer 212 or the insulating layer 213 can function as a barrier film. Such a structure can effectively suppress diffusion of the impurities into the transistors from the outside, and a highly reliable touch panel can be provided.

The conductive layer 111 is provided over the insulating layer 214. The conductive layer 111 is electrically connected to one of a source and a drain of the transistor 202 through an opening formed in the insulating layer 214, the insulating layer 213, the insulating layer 212, and the like. The conductive layer 111 is also electrically connected to one electrode of the capacitor 203.

The conductive layer 23, the conductive layer 24, the conductive layer 25, the wiring 29, an insulating layer 121, an overcoat 123, a spacer 124, a coloring layer 131G (not illustrated), the coloring layer 131R, a coloring layer 131B, a light-blocking layer 132, a conductive layer 113, and the like are provided on the substrate 31 side of the substrate 21.

In FIG. 2, a cross section of an intersection of the conductive layer 23 and the conductive layer 24 is illustrated. The conductive layer 23 and the conductive layer 24 are provided on the same plane. The conductive layer 25 is provided over the insulating layer 121 covering the conductive layer 23 and the conductive layer 24 and part of the conductive layer 25 overlaps with the conductive layer 23. The two conductive layers 24 between which the conductive layer 23 is provided are electrically connected to the conductive layer 25 through openings provided in the insulating layer 121.

The light-blocking layer 132, the coloring layer 131R, and the like are provided over the insulating layer 121. The overcoat 123 is provided to cover the light-blocking layer 132, the coloring layer 131R, and the like. The conductive layer 113 is provided over the overcoat 123.

In FIG. 2, the display element 60 includes the conductive layer 111, part of the conductive layer 113, and the liquid crystal 112 sandwiched therebetween.

Alignment films for controlling alignment of the liquid crystal 112 may be provided on surfaces of the conductive layers 111 and 113, the insulating layer 214, and the like which are in contact with the liquid crystal 112.

In the structure of FIG. 2, the conductive layer 23 and the like are provided not to overlap with the display element 60. In other words, the conductive layer 23 is provided so that the display element 60 overlaps with an opening in the conductive layer 23. In still other words, the conductive layer 23 is provided to overlap with a region between the two conductive layers 111 of two adjacent sub-pixels. Although an example of the conductive layer 23 is described here, it is preferable that the conductive layer 24 and the conductive layer 25 be also provided not to overlap with the display element 60.

In the display element 60, the conductive layer 111 and the conductive layer 113 each have a function of transmitting visible light. By having such a structure, the display element 60 can be a transmissive liquid crystal element. For example, in the case where a backlight is provided on the substrate 31 side, light from the backlight which is polarized by the polarizing plate 130b passes through the substrate 31, the conductive layer 111, the liquid crystal 112, the conductive layer 113, and the substrate 21, and then reaches the polarizing plate 130a. In this case, alignment of the liquid crystal 112 is controlled with a voltage that is applied between the conductive layers 111 and 113, and thus optical modulation of light can be controlled. That is, the intensity of light emitted through the polarizing plate 130a can be controlled. Light other than one in a particular wavelength region of the incident light is absorbed by the coloring layer 131R, and thus, emitted light is red light, for example.

As the polarizing plate 130a, a linear polarizing plate or a circularly polarizing plate can be used. An example of a circularly polarizing plate is a stack including a linear polarizing plate and a quarter-wave retardation plate. In particular, as illustrated in FIG. 2, in the case where the conductive layer 23 and the conductive layer 24 (and the conductive layer 25) included in the touch sensor are provided in a position closer to the substrate 21 side than the light-blocking layer 132 is, external light is reflected by the conductive layers and the reflected light is visually recognized in some cases. In this case, reflection can be suppressed with a circularly polarizing plate used as the polarizing plate 130a.

In the case where a circularly polarizing plate is used as the polarizing plate 130a, a circularly polarizing plate may be also used as the polarizing plate 130b and a general linear polarizing plate may be used. The cell gap, alignment, driving voltage, and the like of the liquid crystal element used as the display element 60 are controlled depending on the kinds of polarizing plates used as the polarizing plates 130a and 130b so that desirable contrast is obtained.

Here, as for the display element 60, a pair of electrodes is provided in the thickness direction of the touch panel module 10 and an electric field is applied to the liquid crystal 112 in the thickness direction. The arrangement of the electrodes is not limited thereto, and a method in which an electric field is applied in a direction perpendicular to the thickness direction may be employed.

In particular, a normally black liquid crystal display device, for example, a transmissive liquid crystal display device using a vertical alignment (VA) mode is preferably used as the touch panel module 10. Examples of the vertical alignment mode include a multi-domain vertical alignment (MVA) mode, a patterned vertical alignment (PVA) mode, and an advanced super view (ASV) mode.

Liquid crystal elements using a variety of modes can be used as the liquid crystal element which can be used for the display element 60. For example, a liquid crystal element using, instead of a vertical alignment (VA) mode, a twisted nematic (TN) mode, an in-plane switching (IPS) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, or the like can be used.

The liquid crystal element controls transmission or non-transmission of light utilizing an optical modulation action of liquid crystal. Note that optical modulation action of liquid crystal is controlled by an electric field applied to the liquid crystal (including a horizontal electric field, a vertical electric field, or an oblique electric field). As the liquid crystal used for the liquid crystal element, thermotropic liquid crystal, low-molecular liquid crystal, high-molecular liquid crystal, polymer dispersed liquid crystal (PDLC), ferroelectric liquid crystal, anti-ferroelectric liquid crystal, or the like can be used. These liquid crystal materials exhibit a cholesteric phase, a smectic phase, a cubic phase, a chiral nematic phase, an isotropic phase, or the like depending on conditions.

As the liquid crystal material, either of a positive liquid crystal and a negative liquid crystal may be used, and an appropriate liquid crystal material can be used depending on the mode or design to be used.

Here, for example, the conductive layer 113 and the conductive layer 111 can be used as a common electrode and a pixel electrode, respectively.

In FIG. 2, the conductive layer 113 is provided to overlap with the conductive layers 23 to 25 and the like. By applying a common potential, a ground potential, or an arbitrary constant potential to the conductive layer 113, electrical noise generated to the substrate 31 side when the conductive layers 23 to 25 are driven can be blocked. Furthermore, electrical noise generated to the substrate 21 side when the sub-pixel circuit provided on the substrate 31 side is driven can be blocked.

The connection portion 204 is provided in a region near an end portion of the substrate 31. The connection portion 204 is electrically connected to the FPC 42 through a connection layer 242. FIG. 2 illustrates an example of the connection portion 204 formed by stacking part of the wiring 35 and the conductive layer 223. The connection portion 101 is provided in a region near an end portion of the substrate 21. The connection portion 101 is electrically connected to the FPC 41 through a connection layer 241. In the example of the structure illustrated in FIG. 2, the connection portion 101 is formed by stacking part of the wiring 29, a conductive layer formed by processing the conductive film used for forming the conductive layer 25, and a conductive layer formed by processing the conductive film used for forming the conductive layer 113.

In FIG. 2, a cross-sectional structure of an intersection of the conductive layer 221 functioning as a wiring and the conductive layer 222 functioning as a wiring is illustrated as an example. The conductive layer 221 can be used as one or both of a wiring functioning as a scan line and a wiring functioning as a capacitor line, and the conductive layer 222 can be used as a wiring functioning as a signal line, for example.

A substrate with which an object to be sensed, such as a finger or a stylus, is to be in contact may be provided above the polarizing plate 130a. In that case, a protective layer (such as a ceramic coat) is preferably provided over the substrate. The protective layer can be formed using an inorganic insulating material such as silicon oxide, aluminum oxide, yttrium oxide, or yttria-stabilized zirconia (YSZ). Alternatively, tempered glass may be used for the substrate. The tempered glass which can be used here is one that has been subjected to physical or chemical treatment by an ion exchange method, a thermal tempering method, or the like and has a surface to which compressive stress has been added.

The overcoat 123 has a function of preventing impurities such as a pigment included in the coloring layer 131R or the like from diffusing into the liquid crystal 112.

The spacer 124 is provided over the conductive layer 113 and has a function of keeping a certain distance between the substrate 21 and the substrate 31. Although FIG. 2 illustrates an example where the spacer 124 is not in contact with structures (e.g., the conductive layer 111 and the insulating layer 214) on the substrate 31 side, the spacer 124 may be in contact with them. Moreover, FIG. 2 illustrates an example where the spacer 124 is provided on the substrate 21 side; however, the spacer 124 may be provided on the substrate 31 side. For example, the spacer 124 may be provided between the two conductive layers 111 of the two adjacent sub-pixels. Alternatively, a particulate spacer may be used as the spacer 124. Although a material such as silica can be used for the particulate spacer, an elastic material such as an organic resin or rubber is preferably used. In some cases, the particulate spacer may be vertically crushed.

It is preferable that the spacer 124 and the conductive layer 23 (or the conductive layer 24 or 25) be provided to overlap with each other as illustrated in FIG. 2. Alternatively, it is preferable that the spacer 124 and the light-blocking layer 132 be provided to overlap with each other. In such a structure, the spacer 124 is not provided in a portion where the display element 60 is provided, in which case absorption, refraction, or diffusion of light due to the spacer 124 does not occur, for example; thus, the light-extraction efficiency can be improved.

In the touch panel module 10 of one embodiment of the present invention, the conductive layers 23 to 25 also can function as light-blocking layers for suppressing color mixture between adjacent sub-pixels. FIG. 3 illustrates the case where the conductive layers 23 to 25 also function as light-blocking layers and the light-blocking layer 132 is not provided. For that reason, a material which blocks visible light is preferably used for the conductive layers 23 to 25. Alternatively, a material reflecting visible light may be used. A structure in which a stack comprises a layer containing a material which reflects visible light and a layer absorbing at least part of visible light provided in a position closer to the substrate 31 than the layer containing a material which reflects light is preferable. This is because light reaching the conductive layer 23 or the like of light passing through the conductive layer 111 is prevented from being reflected to the substrate 31 side again.

Figure 4:
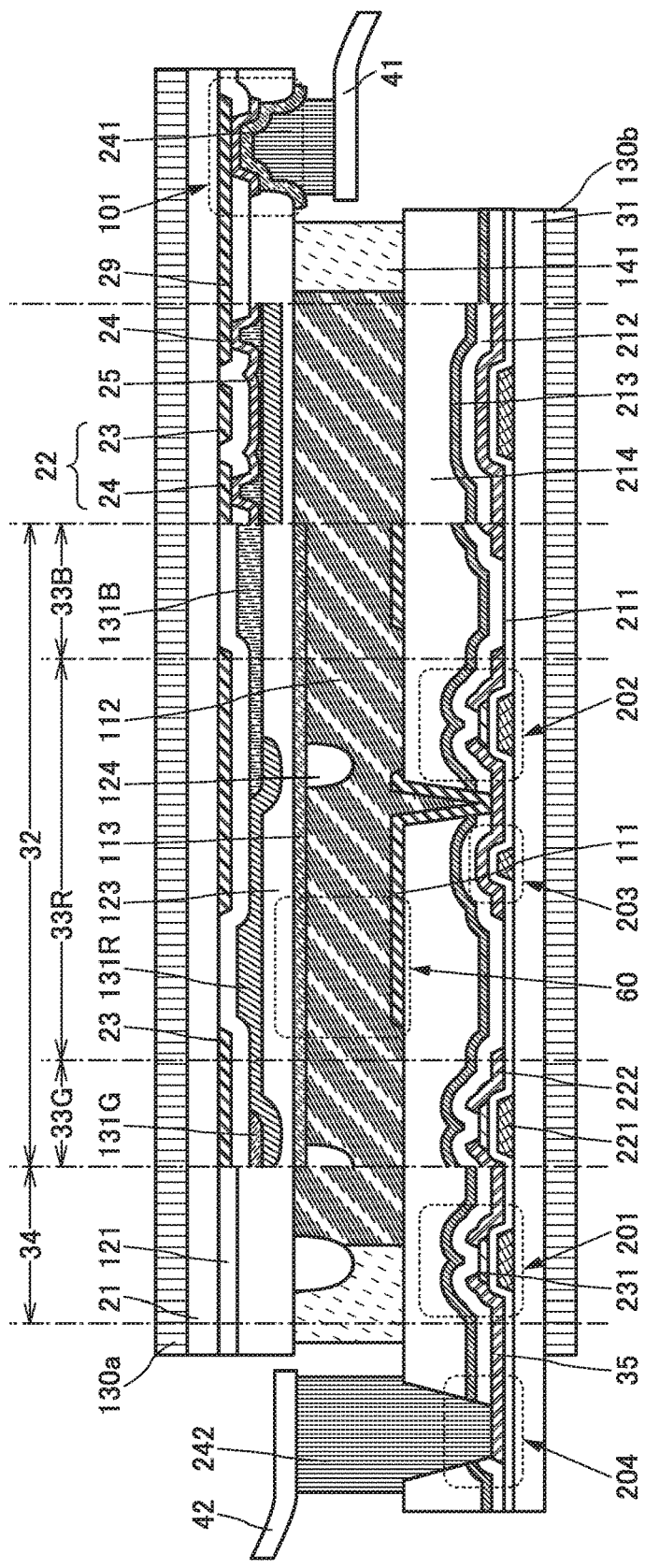
FIG. 4 shows a structure example of a touch panel module of an embodiment.

End portions of two adjacent coloring layers overlap with each other to further overlap with the conductive layer 23 or the like as illustrated in FIG. 4. In FIG. 4, the conductive layer 23, an end portion of the coloring layer 131G, and an end portion of the coloring layer 131R overlap with one another in the vicinity of a boundary between the sub-pixel 33G and the sub-pixel 33R. The conductive layer 23, an end portion of the coloring layer 131R, and an end portion of the coloring layer 131B are provided to overlap with one another in the vicinity of a boundary between the sub-pixel 33R and the sub-pixel 33B. Such a structure does not require additionally providing a layer absorbing visible light, which leads to lower manufacturing cost. Although only one coloring layer may overlap with the conductive layer 23 or the like, visible light can be more effectively absorbed when two or more coloring layers overlap with the conductive layer 23 or the like.

Figure 5:
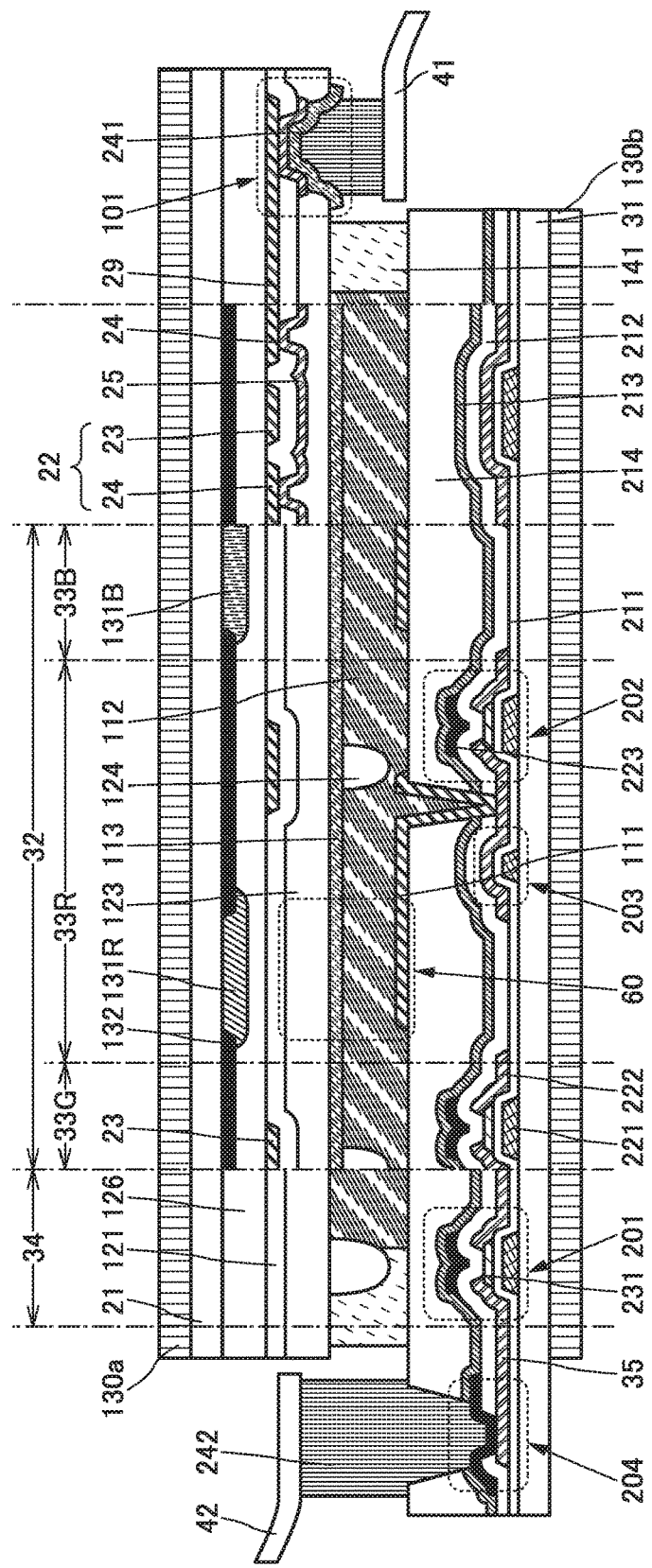
FIG. 5 shows a structure example of a touch panel module of an embodiment.

As illustrated in FIG. 5, the light-blocking layer 132, the coloring layer 131R, and the like may be provided closer to the substrate 21 side than the conductive layers 23 to 25 included in the touch sensor 22 are. With such a structure, external light from the substrate 21 side does not reach the conductive layers 23 to 25; thus, the conductive layers 23 to 25 can be prevented from being visually recognized. In FIG. 5, an insulating layer 126 is provided to cover the light-blocking layer 132, the coloring layer 131R, and the like. The insulating layer 126 is preferably formed using a material serving as a planarization layer.

Figure 6:
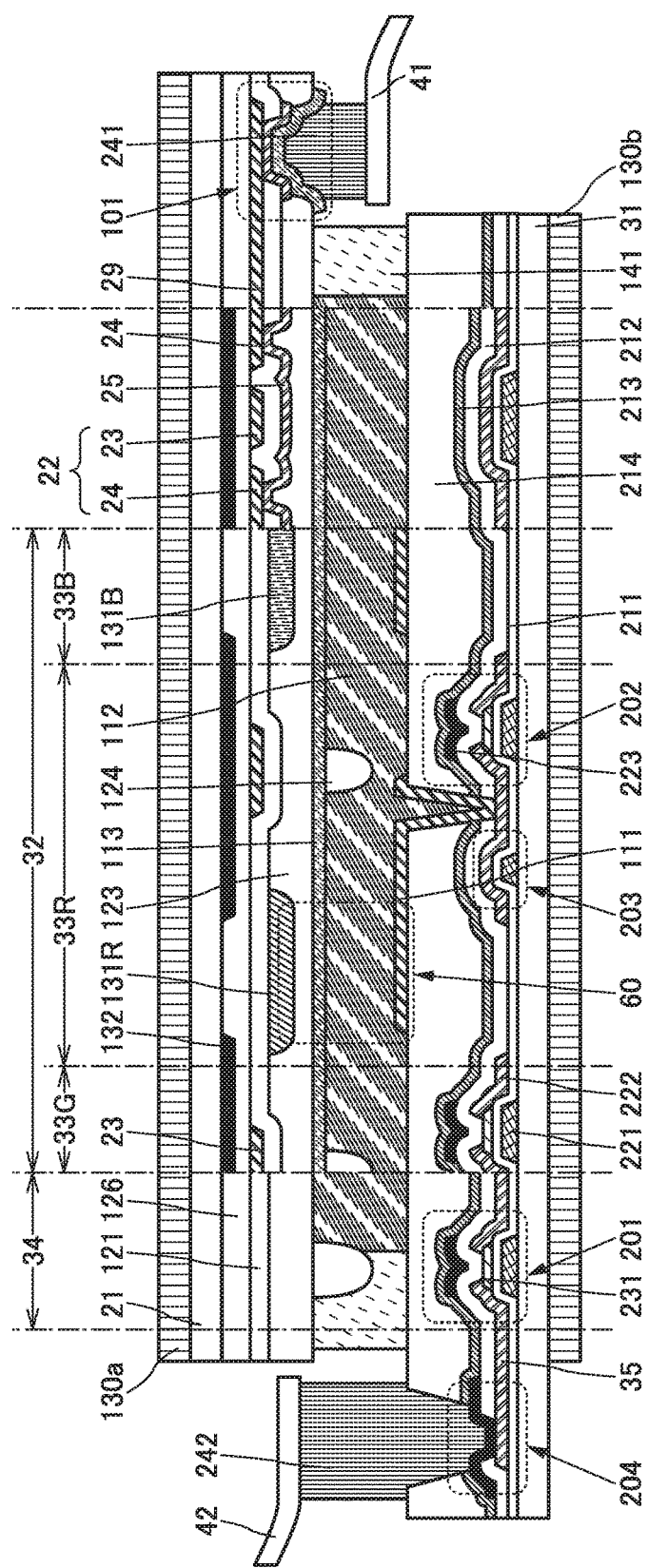
FIG. 6 shows a structure example of a touch panel module of an embodiment.

As illustrated in FIG. 6, the light-blocking layer 132 may be provided closer to the substrate 21 side than the conductive layers 23 to 25 included in the touch sensor 22 are, and the coloring layer 131R and the like may be provided closer to the substrate 31 than the conductive layers 23 to 25 are.

Figure 7:
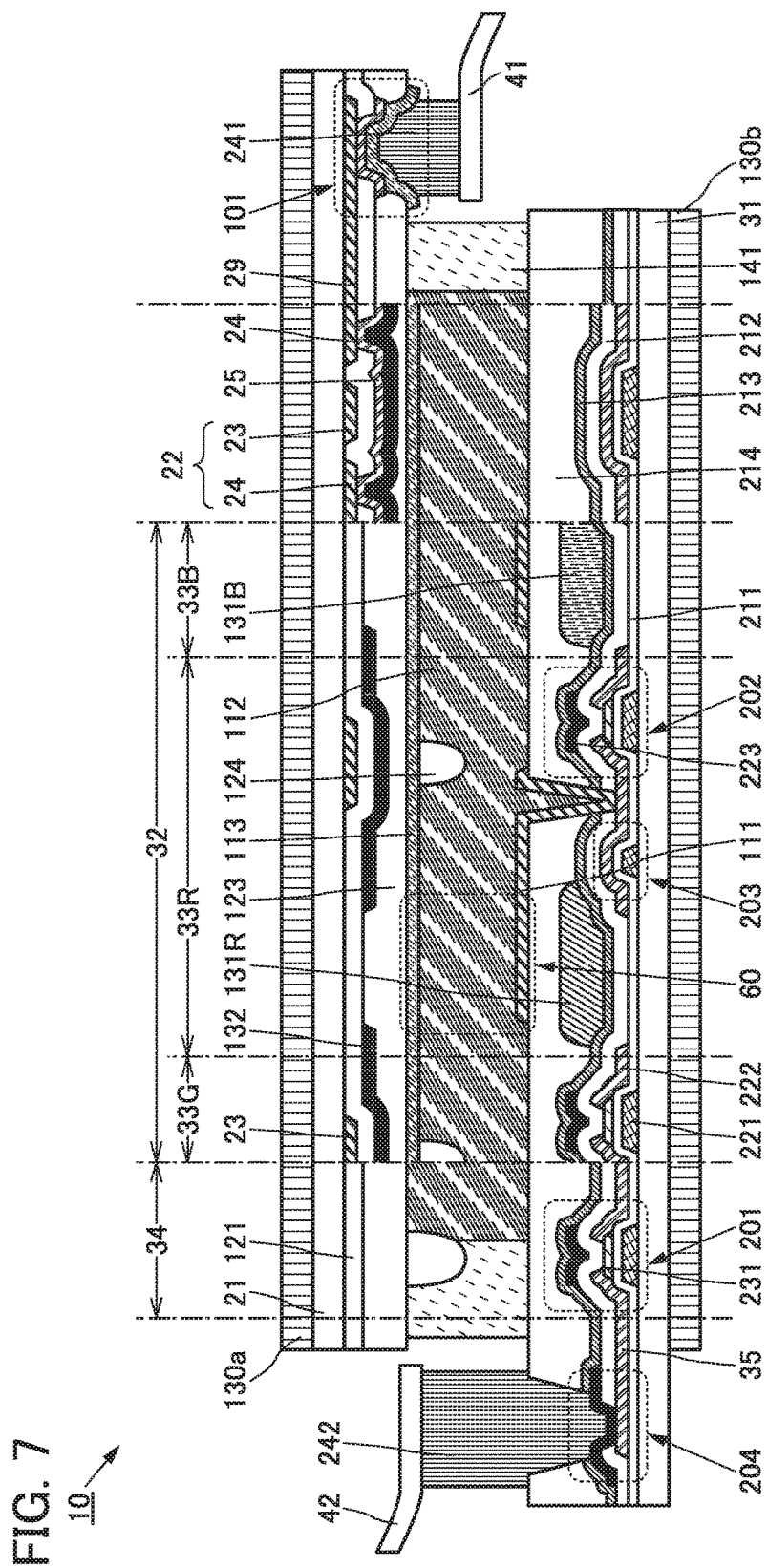
FIG. 7 shows a structure example of a touch panel module of an embodiment.

As illustrated in FIG. 7, the coloring layer 131R and the like may be provided on the substrate 31 side. In that case, the light-blocking layer 132 may be provided on the substrate 21 as illustrated in FIG. 7 or may be provided on the substrate 31 side. Alternatively, a structure without the light-blocking layer 132 may be employed.

Figure 8:
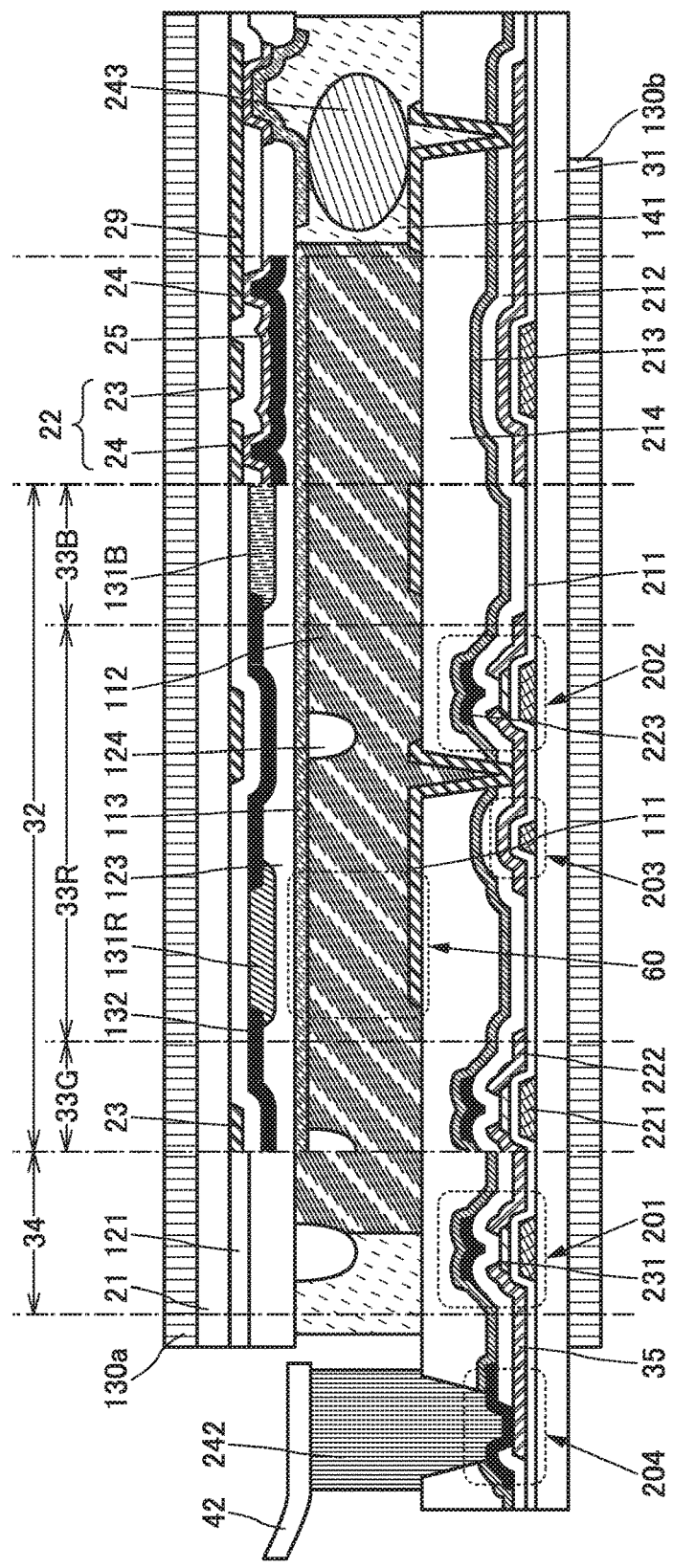
FIG. 8 shows a structure example of a touch panel module of an embodiment.

As illustrated in FIG. 8, a structure where the connection portion 101 is not provided on the substrate 21 side may be employed. FIG. 8 illustrates a structure where a conductive layer provided on the substrate 31 side and a conductive layer provided on the substrate 21 side are electrically connected to each other with a connector 243. Thus, the wiring 29 provided on the substrate 21 side and a wiring provided on the substrate 31 can be electrically connected to each other. A signal can be supplied from an FPC (not illustrated) or an IC (not illustrated) provided on the substrate 31 side to the conductive layer 24, or a signal can be supplied from the conductive layer 24 to an FPC or an IC.

In addition, not only the wiring 29 electrically connected to the conductive layer 23 or the conductive layer 24 included in the touch sensor 22 but also the conductive layer 113 can be electrically connected to the wiring provided on the substrate 31 side with the connector 243. In that case, a potential or a signal can be supplied from an FPC or an IC provided on the substrate 31 side to the conductive layer 113.

As the connector 243, a conductive particle can be used, for example. As the conductive particle, a particle of an organic resin, silica, or the like coated with a metal material can be used. It is preferable to use nickel or gold as the metal material because contact resistance can be decreased. It is also preferable to use a particle coated with layers of two or more kinds of metal materials, such as a particle coated with nickel and further with gold. As the connector 243, a material capable of elastic deformation or plastic deformation is preferably used. As illustrated in FIG. 8, the conductive particle has a shape that is vertically crushed in some cases. With the crushed shape, the contact area between the connector 243 and a conductive layer electrically connected to the connector 243 can be increased, thereby reducing contact resistance and suppressing the generation of problems such as disconnection.

The connector 243 is preferably provided so as to be covered with the adhesive layer 141. For example, a paste or the like for forming the adhesive layer 141 may be applied, and then, the connector 243 may be provided. A structure in which the connector 243 is provided in a region provided with the adhesive layer 141 can be applied to, for example, a structure in which the adhesive layer 141 is provided in the peripheral region, e.g., a display device with a solid sealing structure, a display device with a hollow sealing structure, or the like.

Figure 9:
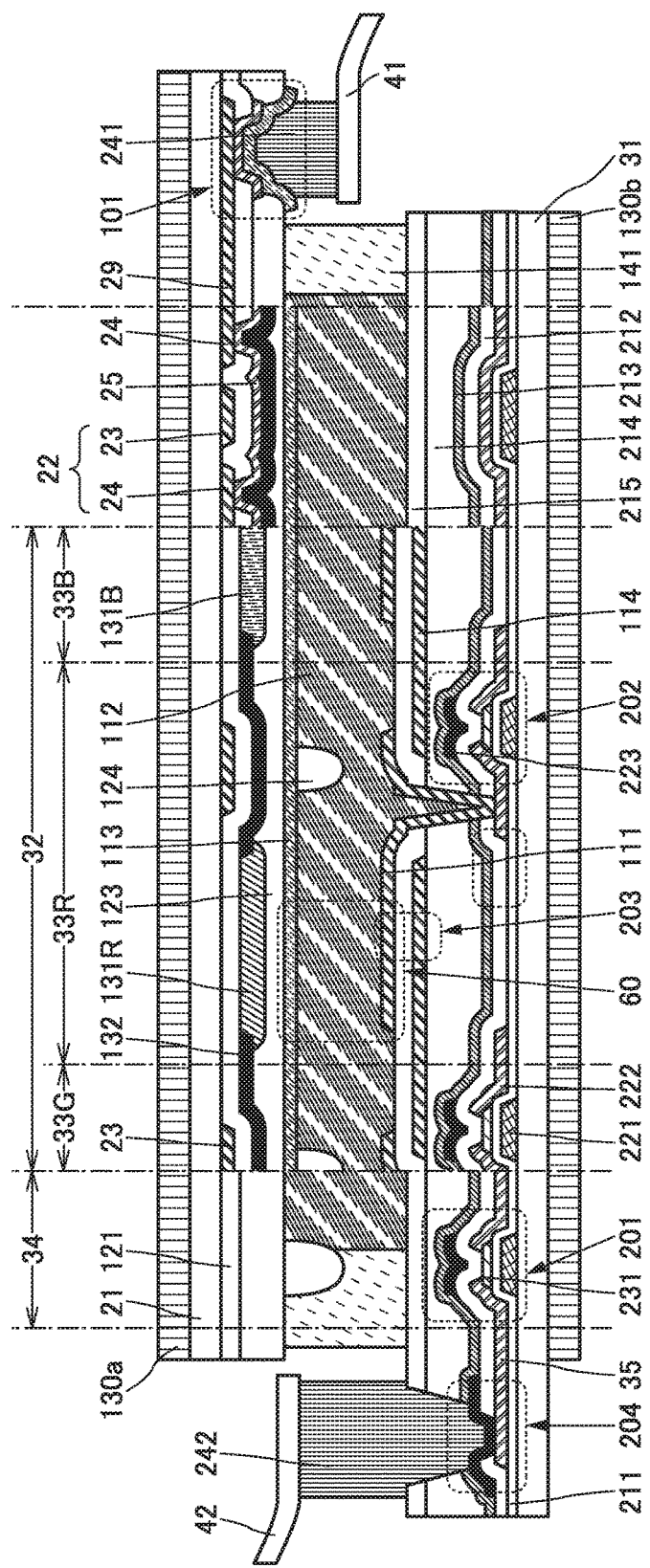
FIG. 9 shows a structure example of a touch panel module of an embodiment.

As illustrated in FIG. 9, the capacitor 203 may be formed using the conductive layer 111, a conductive layer 114, and an insulating layer 215 provided therebetween. In the structure of FIG. 9, the conductive layer 114 is provided over the insulating layer 214, the insulating layer 215 is provided to cover the conductive layer 114, and the conductive layer 111 is provided over the insulating layer 215. Here, in the case where the display element 60 is a transmissive liquid crystal element, the conductive layer 114, as well as the conductive layer 111, can be formed using a light-transmitting material.

The above is the description of Cross-sectional Structure Example 1.

Cross-Sectional Structure Example 2

A cross-sectional structure example of the touch panel module 10 that includes a liquid crystal element having a mode different from that in Cross-sectional Structure Example 1 is described below. Note that descriptions of the portions already described are omitted and different portions are described below.

Figure 10:
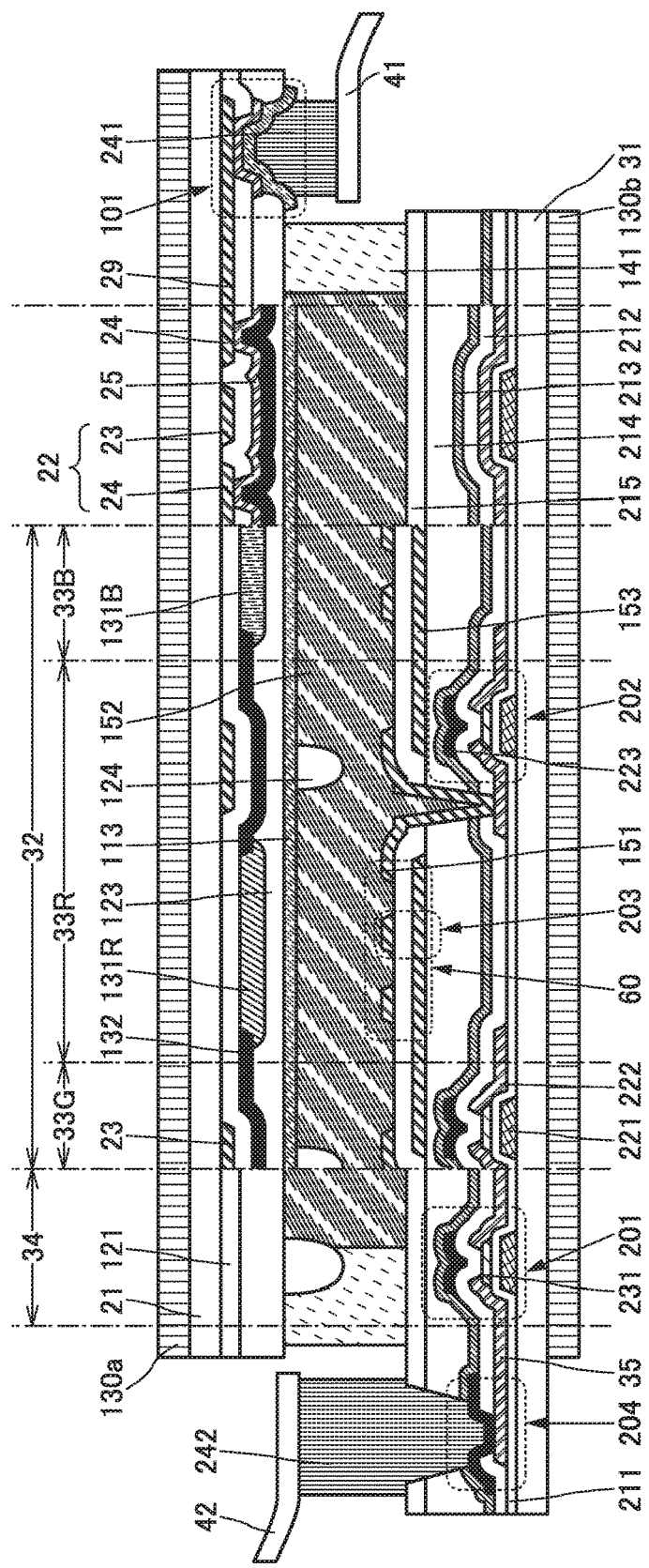
FIG. 10 shows a structure example of a touch panel module of an embodiment.

FIG. 10 illustrates an example where the display element 60 is a liquid crystal element using an FFS mode. The display element 60 includes a conductive layer 151, a liquid crystal 152, and a conductive layer 153.

The conductive layer 153 is provided over the insulating layer 214. The insulating layer 215 is provided to cover the conductive layer 153, and the conductive layer 151 is provided over the insulating layer 215. The conductive layer 151 is electrically connected to one of a source and a drain of the transistor 202 through an opening provided in the insulating layers 212 to 215.

The top surface shape of the conductive layer 151 is a comb-like shape or has a slit. The conductive layer 153 is provided to overlap with the conductive layer 151. There is a portion where the conductive layer 151 is not provided over the conductive layer 153 in a region overlapping with the coloring layer 131R and the like.

In the structure illustrated in FIG. 10, the conductive layer 151 functions as a pixel electrode, and the conductive layer 153 functions as a common electrode. Note that the conductive layer 151 which is provided in an upper layer and whose top surface shape is a comb-like shape or has a slit may function as a common electrode, and the conductive layer 153 provided in a lower layer may function as a pixel electrode. In this case, the conductive layer 153 may be electrically connected to one of the source and the drain of the transistor 202.

The conductive layer 151 and the conductive layer 153 are stacked with the insulating layer 215 positioned therebetween to form the capacitor 203. Therefore, another capacitor is not necessarily provided, and thus the aperture ratio of the pixel can be increased.

Even in the case of a horizontal electric field mode such as an FFS mode or an IPS mode, the conductive layer 113 can function as a shield layer for suppressing the adverse effect of noise. In this case, a constant potential which does not influence switching of the liquid crystal 152 may be supplied to the conductive layer 113. For example, a ground potential, a common potential, or an arbitrary constant potential can be used. The conductive layer 153 and the conductive layer 113 may be set at the same potential, for example.

With the use of a conductive material that transmits visible light for the conductive layer 153, a transmissive liquid crystal element can be obtained. When both of the conductive layers 151 and 153 are formed using a conductive material that transmits visible light, the aperture ratio can be further increased, which is preferable.

In the case where the display element 60 is a reflective liquid crystal element, one or both of the conductive layers 151 and 153 may be formed using a material that reflects visible light. When both of them are formed using a material that reflects visible light, the aperture ratio can be increased. The conductive layer 153 may be formed using a material that reflects visible light and the conductive layer 151 may be formed using a material that transmits visible light.

Alternatively, the conductive layer 151 may be formed using a material that reflects visible light and the conductive layer 153 may be formed using a material that transmits visible light to form a semi-transmissive liquid crystal element. In that case, a reflective mode in which light reflected by the conductive layer 151 is used and a transmissive mode in which light from a backlight which passes through a slit in the conductive layer 151 can be switched.

Alternatively, in the case of employing a horizontal electric field mode, a liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition which includes liquid crystal exhibiting a blue phase and a chiral material has a short response time and optical isotropy. In addition, the liquid crystal composition which includes liquid crystal exhibiting a blue phase and a chiral material does not need alignment treatment and has a small viewing angle dependence. An alignment film does not need to be provided and rubbing treatment is thus not necessary; accordingly, electrostatic discharge damage caused by the rubbing treatment can be prevented and defects and damage of the liquid crystal display device in the manufacturing process can be reduced.

Although FIG. 10 illustrates the case where the light-blocking layer 132 is provided in contact with an upper surface of the conductive layer 25, an insulating layer may be provided therebetween so that they are not in contact with each other.

Figure 11:
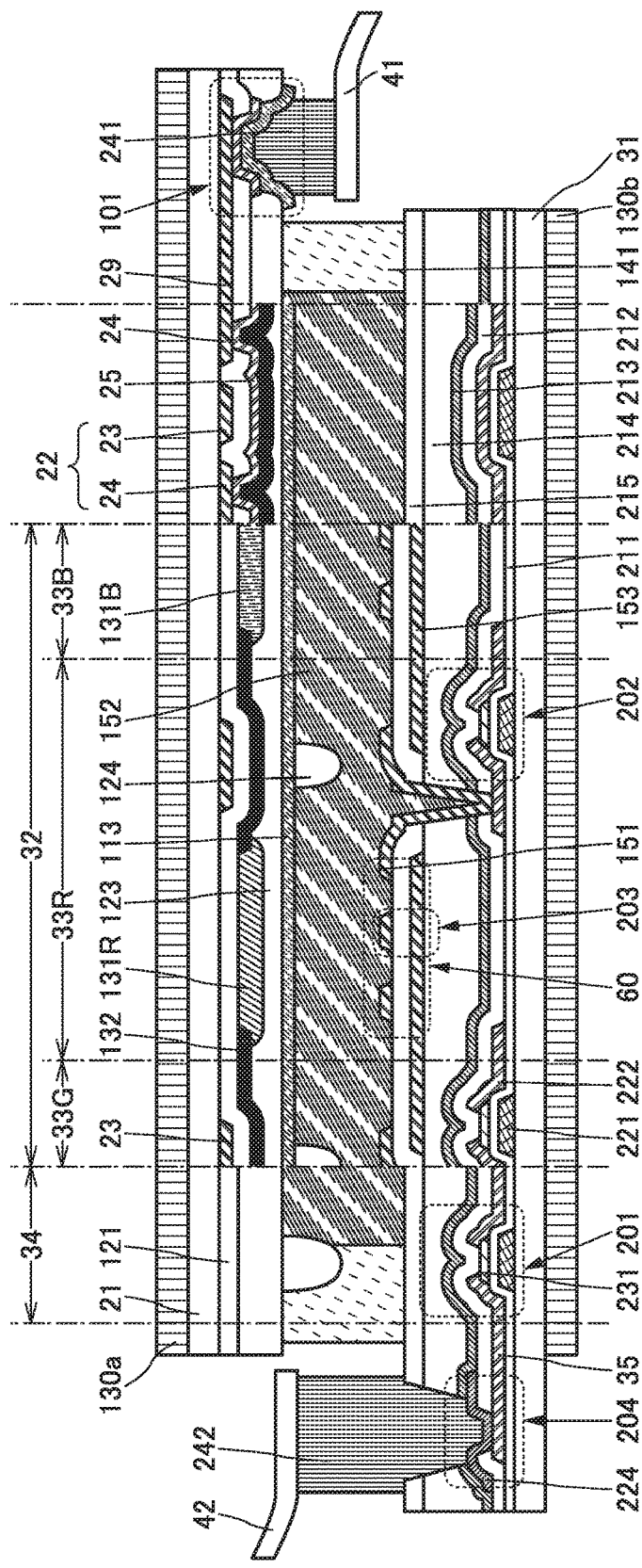
FIG. 11 shows a structure example of a touch panel module of an embodiment.

FIG. 11 illustrates an example where the conductive layer 223 is not provided in the structure in FIG. 10. In the case where the conductive layer 153 is used as a common electrode, the conductive layer 153 is preferably provided between the semiconductor layer 231 of the transistor 202 and the conductive layer 151 as illustrated in FIG. 11. Thus, an electric field of the conductive layer 151 can be prevented from affecting the semiconductor layer 231.

The connection portion 204 is formed by stacking part of the wiring 35 and the conductive layer 224. The conductive layer 224 is preferably formed by a sputtering method in an atmosphere containing an oxygen gas. Thus, oxygen or excess oxygen can be added to the insulating layer 212 over which the conductive layer 224 is formed. In the case where an oxide semiconductor is used for semiconductor layers of the transistors 201 and 202, oxygen vacancies in the semiconductor layers are filled with the excess oxygen, so that the transistors can have high reliability. In the case where excess oxygen is supplied to the insulating layer 212 and/or the oxide semiconductor layer, the insulating layer 213 is preferably formed using a material capable of suppressing penetration of oxygen.

FIG. 11 illustrates an example where the conductive layer 224 in a region other than the connection portion 204 is removed by etching; however, like the conductive layer 223 in FIG. 10 or the like, the conductive layer 224 in the region may be used as another electrode or a wiring, such as the other gate electrode of a transistor.

The example in which among a pair of conductive layers (the conductive layer 151 and the conductive layer 153) included in the display element 60, the conductive layer 153 on the upper side is used as the pixel electrode and the conductive layer 151 on the lower side is used as the common electrode is described here; however, one embodiment of the present invention is not limited thereto. For example, the conductive layer 151 on the lower side can be used as the pixel electrode and the conductive layer 153 on the upper side can be used as the common electrode. In that case, the conductive layer 151 may have an island-shaped top surface and may be electrically connected to the source electrode or the drain electrode of the transistor 202. The conductive layer 153 may have a top surface including a slit or a comb-like top surface and may be provided across two or more adjacent pixels.

The above is the description of Cross-sectional Structure Example 2.

Cross-sectional Structure Example 3

A cross-sectional structure example of the touch panel module 10 including a touch sensor having a structure different from those in Cross-sectional Structure Examples 1 and 2 is described below. Note that descriptions of the portions already described are omitted and different portions are described below.

Figure 12:
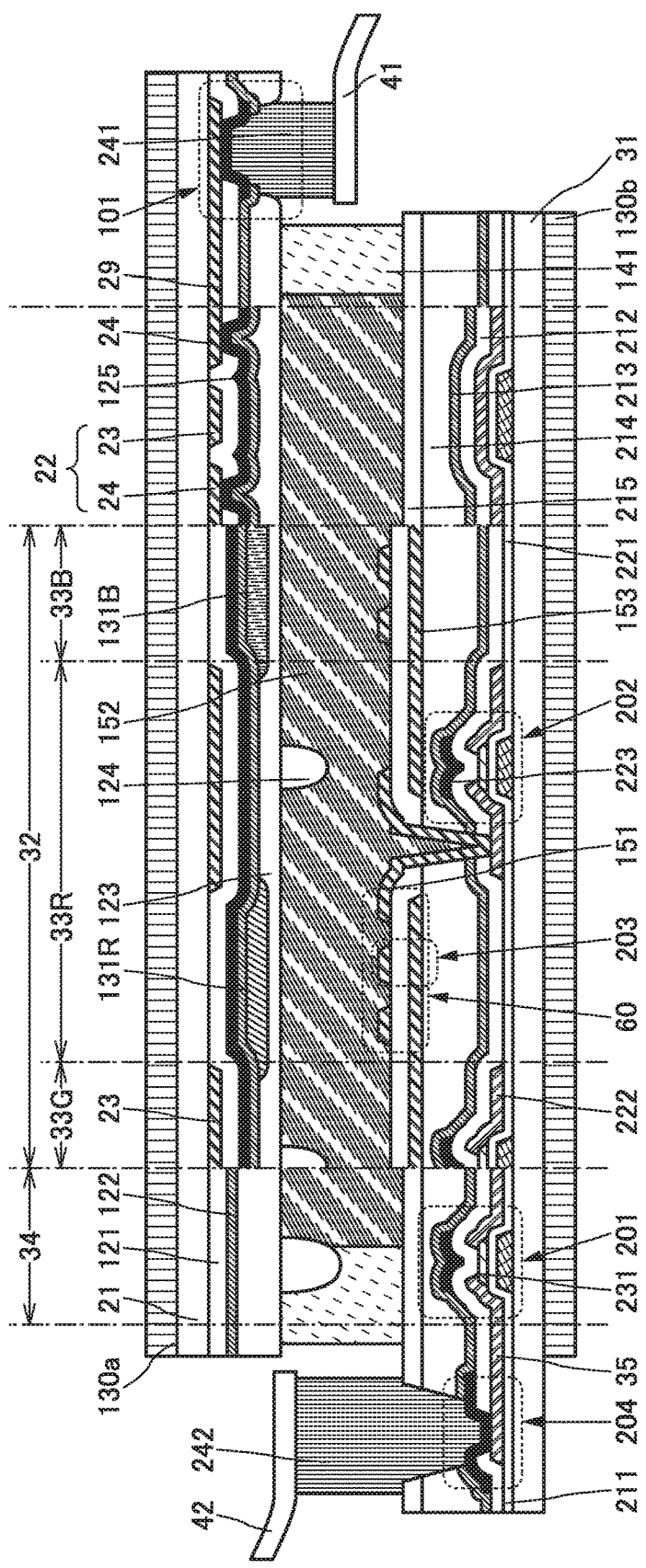
FIG. 12 shows a structure example of a touch panel module of an embodiment.

The touch panel module in FIG. 12 is different from that in FIG. 10 in that a conductive layer 125 is provided instead of the conductive layer 25 and an insulating layer 122 is provided.

The conductive layer 125 in FIG. 12 is formed using a conductive material including a metal oxide.

Among the light-transmitting conductive materials which are described later, metal oxides can be used, for example.

Alternatively, a low-resistance oxide semiconductor is preferably included. In particular, in the case where an oxide semiconductor is used for a semiconductor layer of a transistor in the touch panel module 10, an oxide semiconductor whose resistivity is lower than that of the semiconductor layer is preferably used for the conductive layer 125.

The resistivity of the conductive layer 125 can be reduced, for example, by a method for controlling the resistivity of an oxide semiconductor which is described later.

In this case, an insulating layer containing much hydrogen is preferably used as the insulating layer 122 covering the conductive layer 125. For example, the insulating layer 122 preferably includes an insulating film containing silicon nitride.

The use of a conductive metal oxide or a low-resistance oxide semiconductor for the conductive layer 125 suppresses oxidation of its surface, so that the touch panel module 10 having high reliability can be provided.

Part of the conductive layer 125 overlaps with the display element 60, as with the conductive layer 113 in Cross-sectional Structure Example 2. In other words, the part of the conductive layer 125 can function as a shield layer. The conductive layers in the touch sensor 22 and the conductive layer functioning as a shield layer can be formed at the same time owing to such a structure, so that a manufacturing process can be simplified.

The above is the description of Cross-sectional Structure Example 3.

Cross-sectional Structure Example 4

Figure 13:
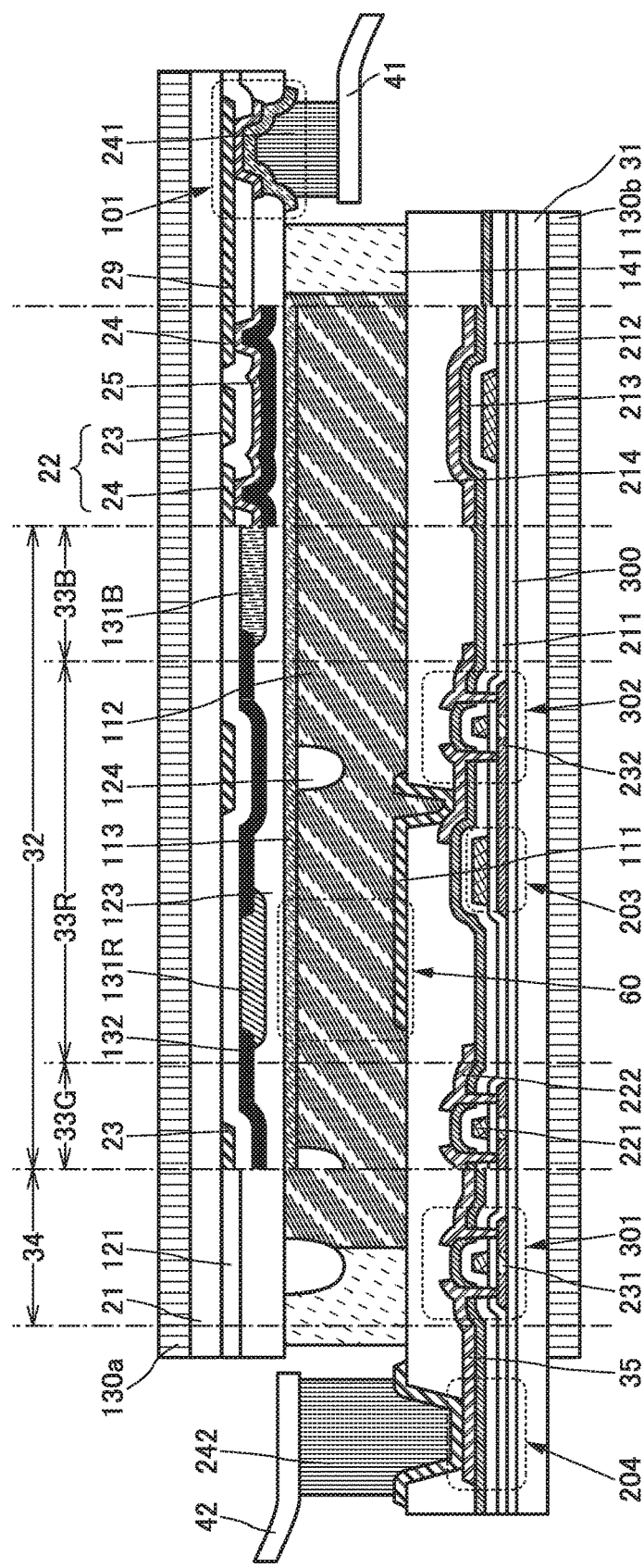
FIG. 13 shows a structure example of a touch panel module of an embodiment.

FIG. 13 illustrates an example of a touch panel that includes a top-gate transistor.

A touch panel module in FIG. 13 is different from that in FIG. 2 mainly in structures of the transistors 301 and 302. Since structures other than the transistor structures are almost the same as those in FIG. 2, the same portions are denoted by the same reference numerals and detailed descriptions of common portions are omitted.

The transistors 301 and 302 each include the semiconductor layer 231 over a buffer layer 300, the insulating layer 211 functioning as a gate insulating layer, the conductive layer 221 functioning as a gate electrode and overlapping with the semiconductor layer 231 with the gate insulating layer provided therebetween, the insulating layer 212 and the insulating layer 213 that cover the conductive layer 221 functioning as the gate electrode, and the conductive layer 222 functioning as a source electrode and a drain electrode. A region (low-resistance region 232) of the semiconductor layer which does not overlap with the gate electrode preferably has lower resistance than a channel formation region overlapping with the gate electrode.

In the Cross-sectional Structure Example 4, in the case of using an oxide semiconductor layer as the semiconductor layer 231, an impurity element (a rare gas, nitrogen, phosphorus, boron, hydrogen, or the like) is preferably added to a region of the semiconductor layer not overlapping with the gate electrode so that the region of the semiconductor layer not overlapping with the gate electrode has lower resistance than the channel formation region. Helium, argon, or the like can be used as the rare gas. To add impurities, a method using plasma, an ion implantation method, or the like can be used. An ion implantation method is preferable because impurity elements can be added using the gate electrode as a mask to reduce the resistance of part of the oxide semiconductor layer.

The capacitor 203 includes the conductive layer 221, the semiconductor layer 231 whose resistance is lowered, and the insulating layer 211 functioning as a dielectric which is positioned therebetween. The capacitor 203 may have a structure in which the conductive layer 221, the conductive layer 222, and the insulating layers 212 and 213 positioned therebetween are provided.

The connection portion 204 is formed by stacking part of the wiring 35 and the conductive layer 111.

The buffer layer 300 is formed using an insulating material such as silicon oxide or metal oxide. As the metal oxide used for the buffer layer 300, an oxide containing one or more of aluminum, indium, gallium, zinc, and the like is used. For the buffer layer 300, a material through which impurities such as water and hydrogen are hardly diffused is preferably used. In other words, the buffer layer 300 can function as a barrier film. Such a structure can effectively suppress diffusion of the impurities into the transistors 301 and 302 from the outside, and thus, a highly reliable touch panel can be provided.

The semiconductor layers 231 of the transistors 301 and 302 may be formed using a semiconductor film other than an oxide semiconductor film. For example, the semiconductor film can be amorphous, microcrystalline, polycrystalline, or single crystal. As examples of a semiconductor material for the semiconductor layers 231, a semiconductor material formed of a Group 14 element (e.g., silicon or germanium) and a compound semiconductor (e.g., silicon carbide or Si—Ge) can be given.

The semiconductor layers 231 can be formed using a polycrystalline silicon film obtained in such a manner that an amorphous silicon film is formed and then crystallized, for example. Examples of a crystallization method of an amorphous silicon film include a laser crystallization method in which a laser having a wavelength of less than or equal to 400 nm is used, a lamp annealing crystallization method using infrared light, a solid phase growth method by heat treatment at 400° C. to 600° C., and a high-temperature annealing crystallization method at approximately 950° C. In a solid phase growth method, a catalytic element such as nickel is added to an amorphous silicon film, and then heat treatment is performed. Alternatively, the amorphous silicon film may be crystallized by any one of a plurality of crystallization methods. For example, a polycrystalline silicon film is obtained in such a manner that a catalytic element such as nickel is added and a solid phase growth is caused by heat treatment, and then this polycrystalline silicon film is irradiated with a laser beam so that defects in the polycrystalline silicon film are decreased.

In order to obtain a single crystal silicon film, a film which is formed of a surface portion separated from a single crystal (or polycrystalline) silicon wafer to which hydrogen ions or the like are injected may be used. The film can be used as the semiconductor layers 231.

In each of the semiconductor layers 231 of the transistors 301 and 302, a channel formation region and low-resistance regions 232 between which the channel formation region is provided are formed. Note that the low-resistance region 232 may include a low-concentration impurity region (lightly doped drain (LDD) region) and a high-concentration impurity region functioning as a source region or a drain region. The low-concentration impurity region has lower impurity concentration than the high-concentration impurity region and has higher impurity concentration than the channel formation region.

In the case where the transistors 301 and 302 are n-channel transistors, the low-resistance region 232 may be a p-type region. For example, the low-resistance region 232 may be a region to which phosphorus (P), arsenic (As), or the like is added. Meanwhile, in the case where the transistors 301 and 302 are p-channel transistors, the low-resistance region 232 may be an n-type region. For example, the low-resistance region 232 may be a region to which boron (B), aluminum (Al), gallium (Ga), or the like is added. The above impurity may be added to the channel formation region of the semiconductor layer 231 at lower concentration than that of the low-resistance region 232 to control the threshold voltage of the transistor.

An impurity element is preferably added to a region of the semiconductor layer 231 that does not overlap with the gate electrode so that the region is a lower resistance region than the channel formation region. To add impurities, a method using plasma, an ion implantation method, or the like can be typically used. An ion implantation method is preferable because impurity elements can be added using the gate electrode as a mask to reduce the resistance of part of the semiconductor layer 231.

The transistors 301 and 302 may have a structure (also referred to as a multi-channel structure or a multi-gate structure) including a plurality of channel formation regions in the semiconductor layer 231. For example, two or more gate electrodes can be provided over the semiconductor layer 231 to be apart from each other. In a region between the two adjacent channel formation regions, the above-described low-resistance region (one or both of a low-concentration impurity region and a high-concentration impurity region) may be provided. When the transistor has a multi-channel structure, leakage current of the transistor in an off state can be reduced.

The capacitor 203 has a structure in which part of the low-resistance region 232 of the semiconductor layer 231, the insulating layer 212, and the conductive layer 221 are stacked. In the capacitor 203, the low-resistance region 232 may have higher impurity concentration than source and drain regions of the transistor 302. The structure of the capacitor 203 is not limited thereto, and a combination of another conductive layer and another insulating layer may be used. For example, the conductive layer 221, the conductive layer 222, and the insulating layers 212 and 213 positioned therebetween may be stacked.

Figure 14:
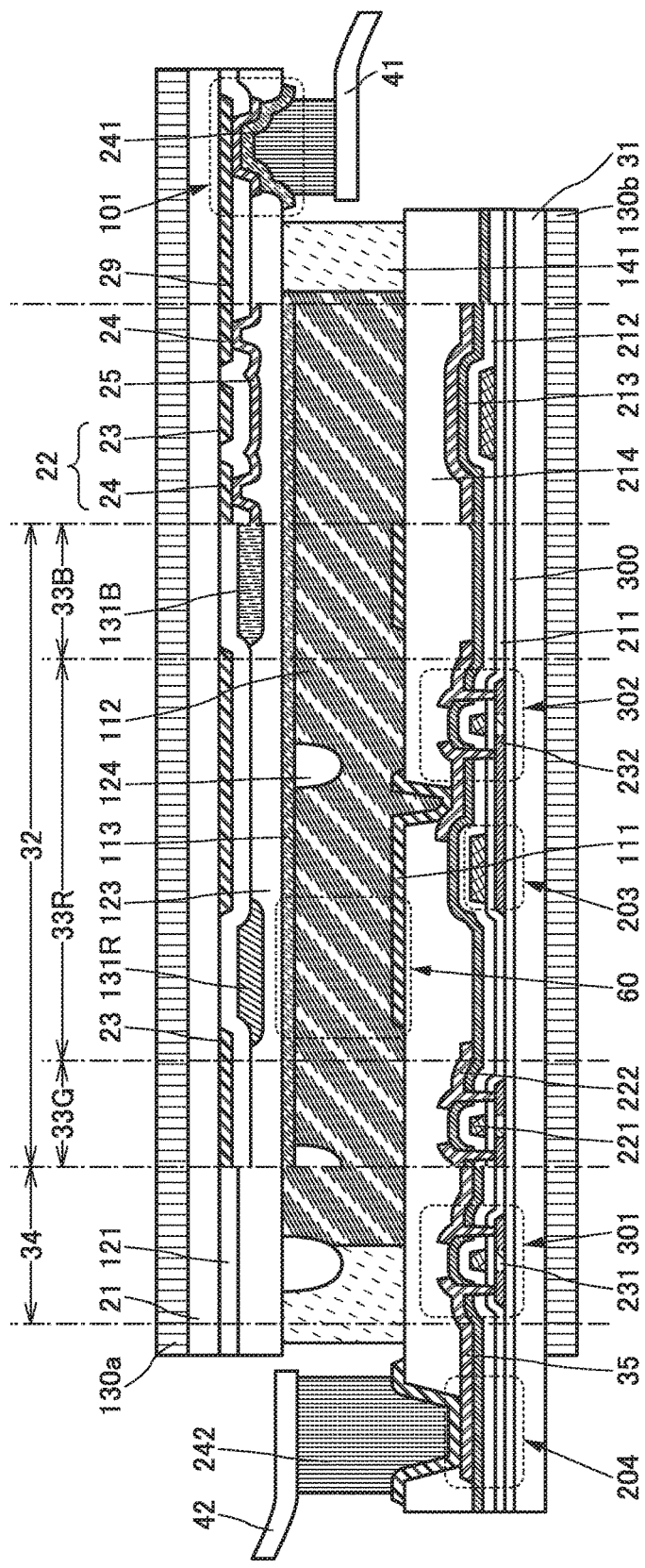
FIG. 14 shows a structure example of a touch panel module of an embodiment.
Figure 15:
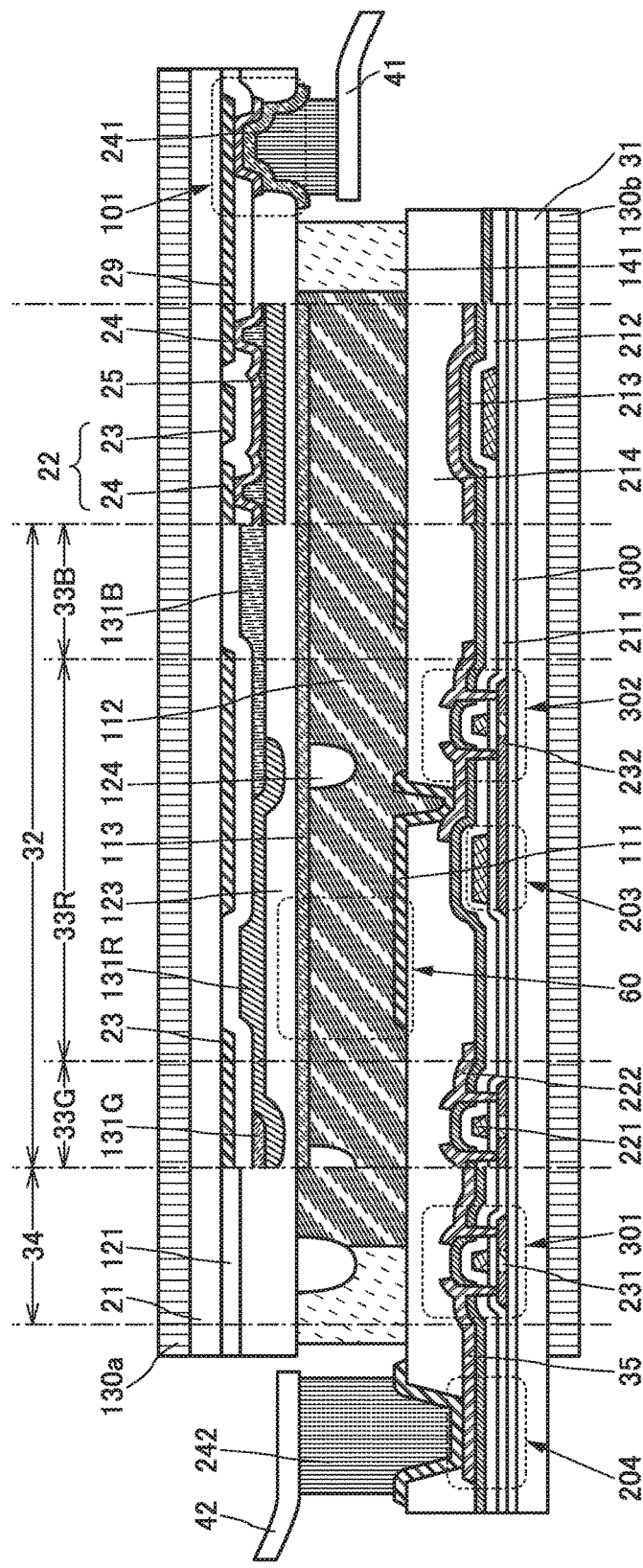
FIG. 15 shows a structure example of a touch panel module of an embodiment.
Figure 16:
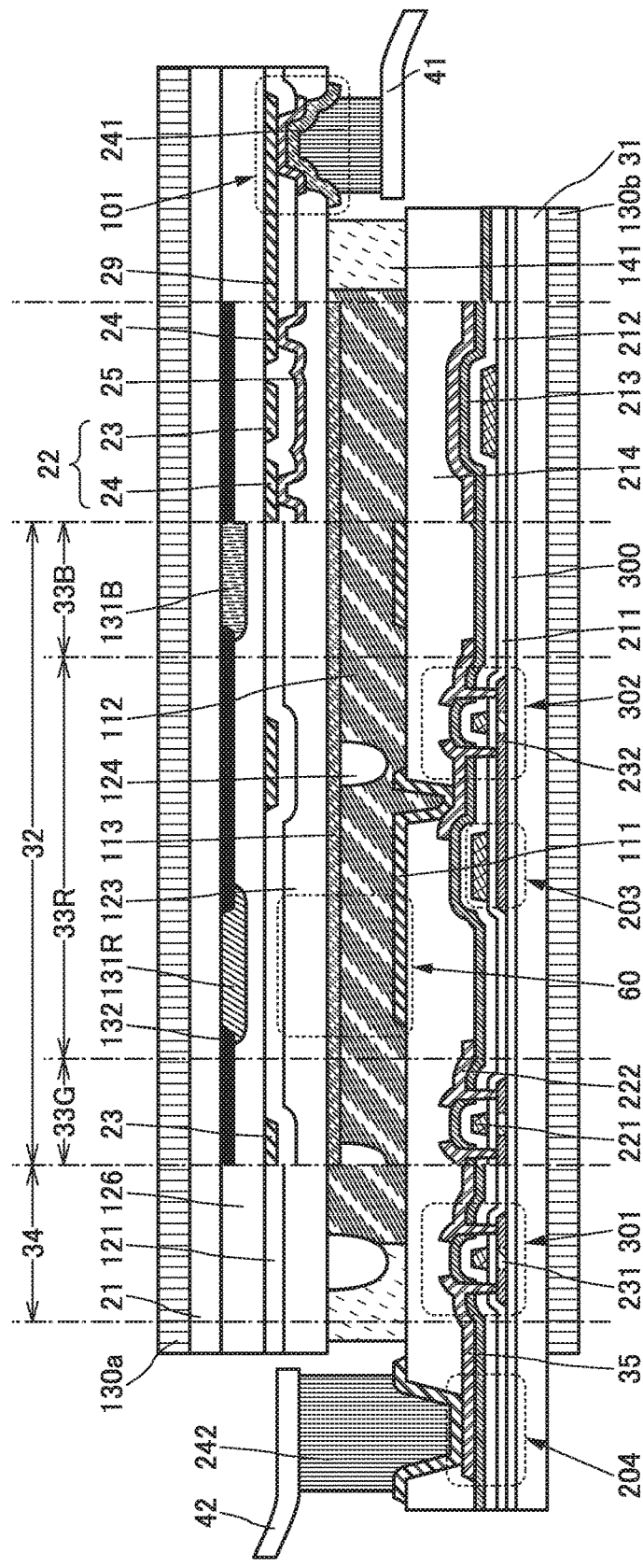
FIG. 16 shows a structure example of a touch panel module of an embodiment.
Figure 17:
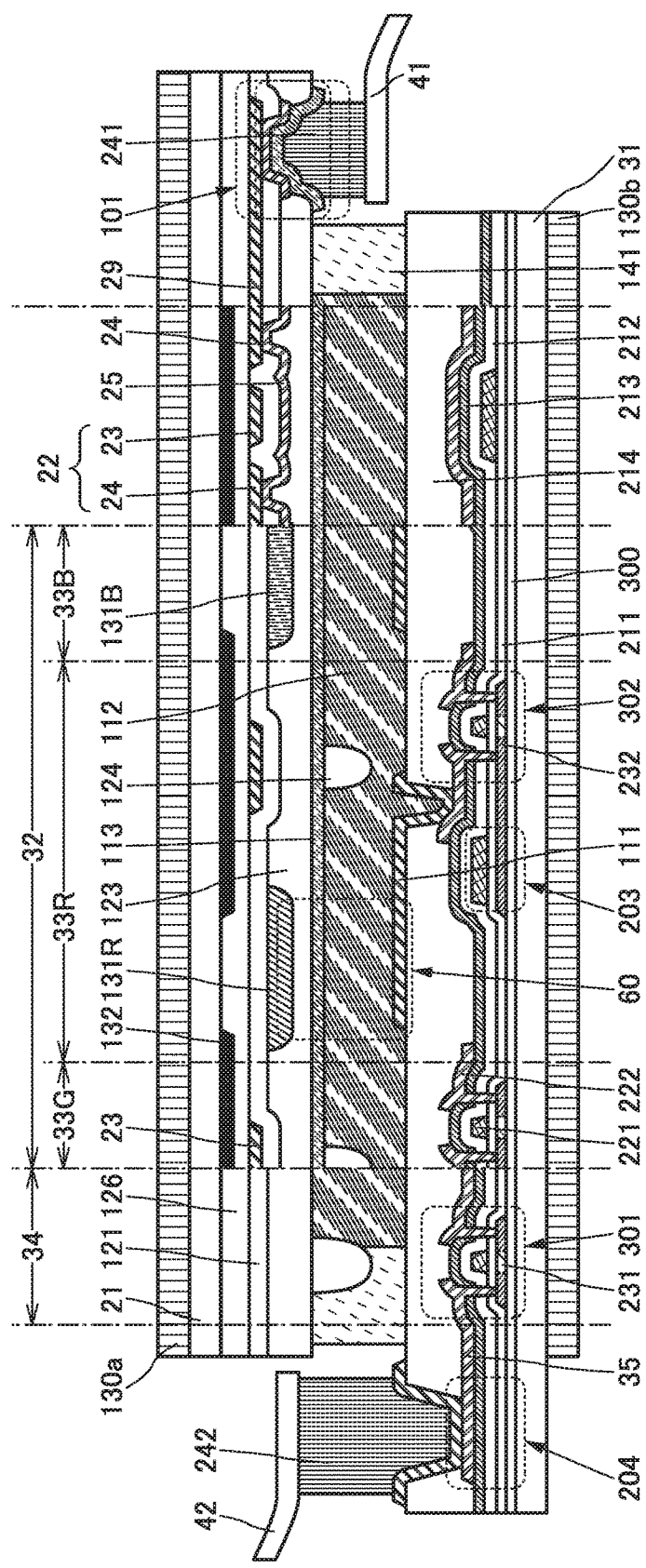
FIG. 17 shows a structure example of a touch panel module of an embodiment.
Figure 18:
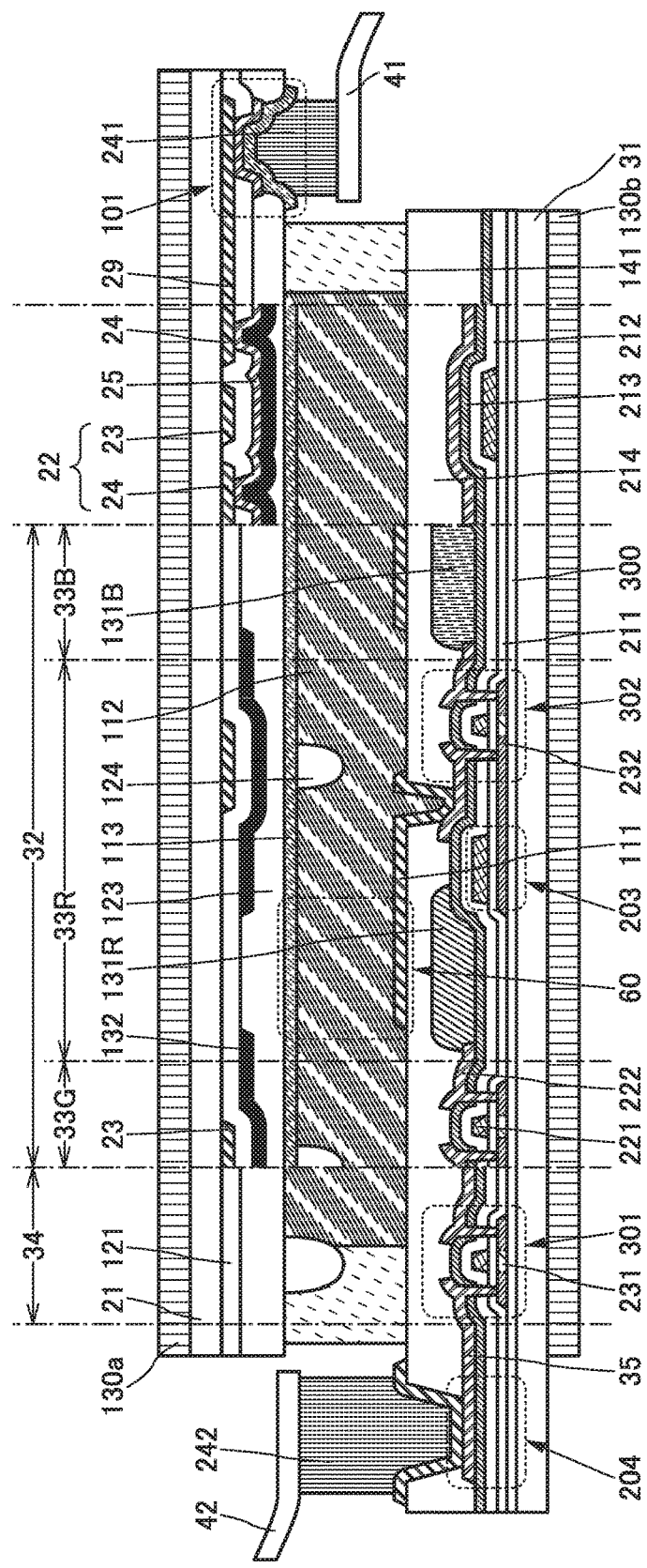
FIG. 18 shows a structure example of a touch panel module of an embodiment.
Figure 19:
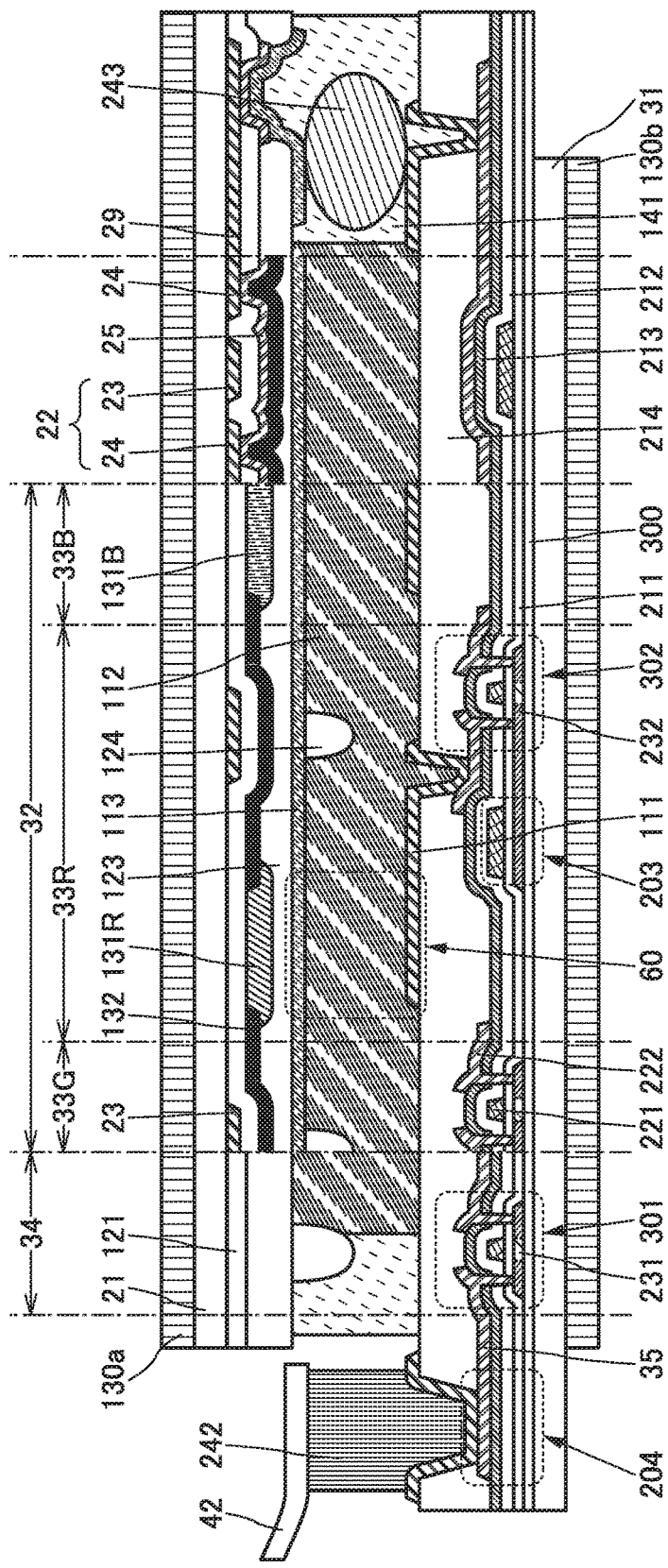
FIG. 19 shows a structure example of a touch panel module of an embodiment.
Figure 20:
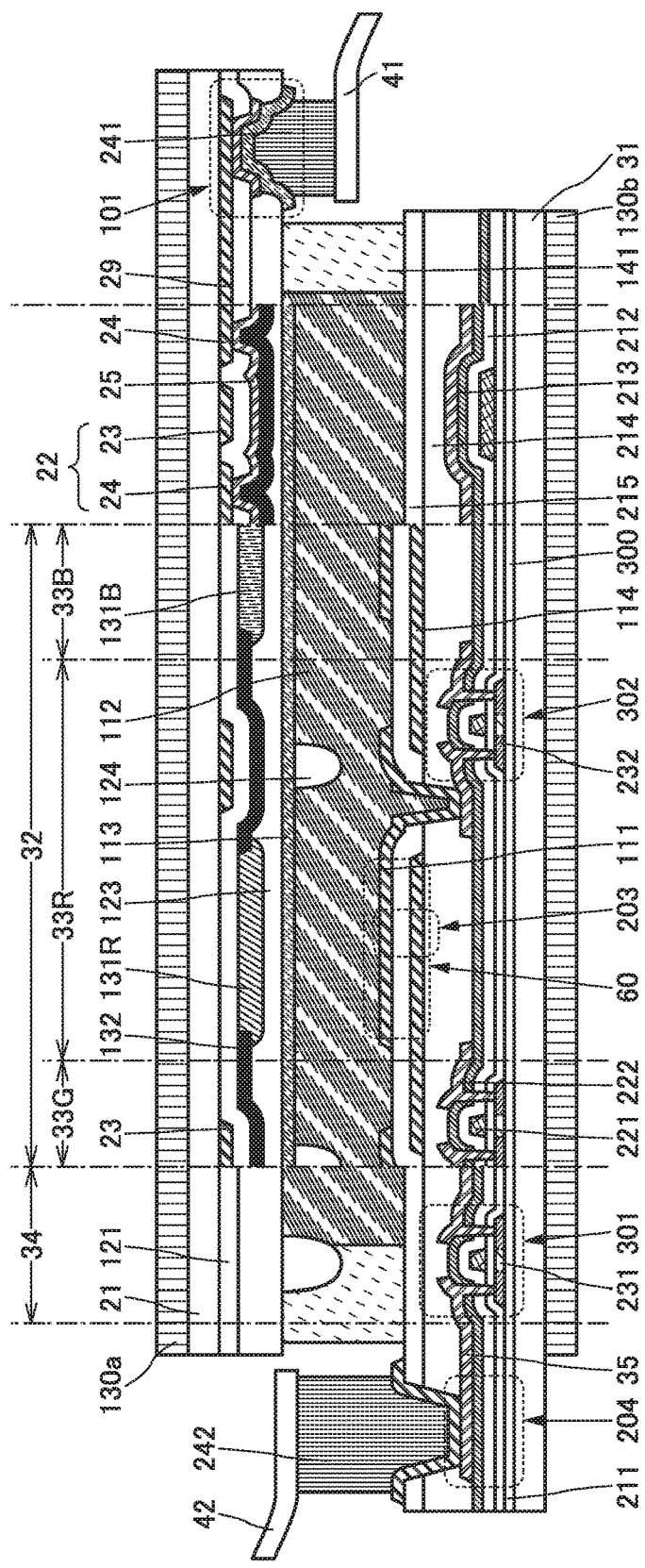
FIG. 20 shows a structure example of a touch panel module of an embodiment.
Figure 21:
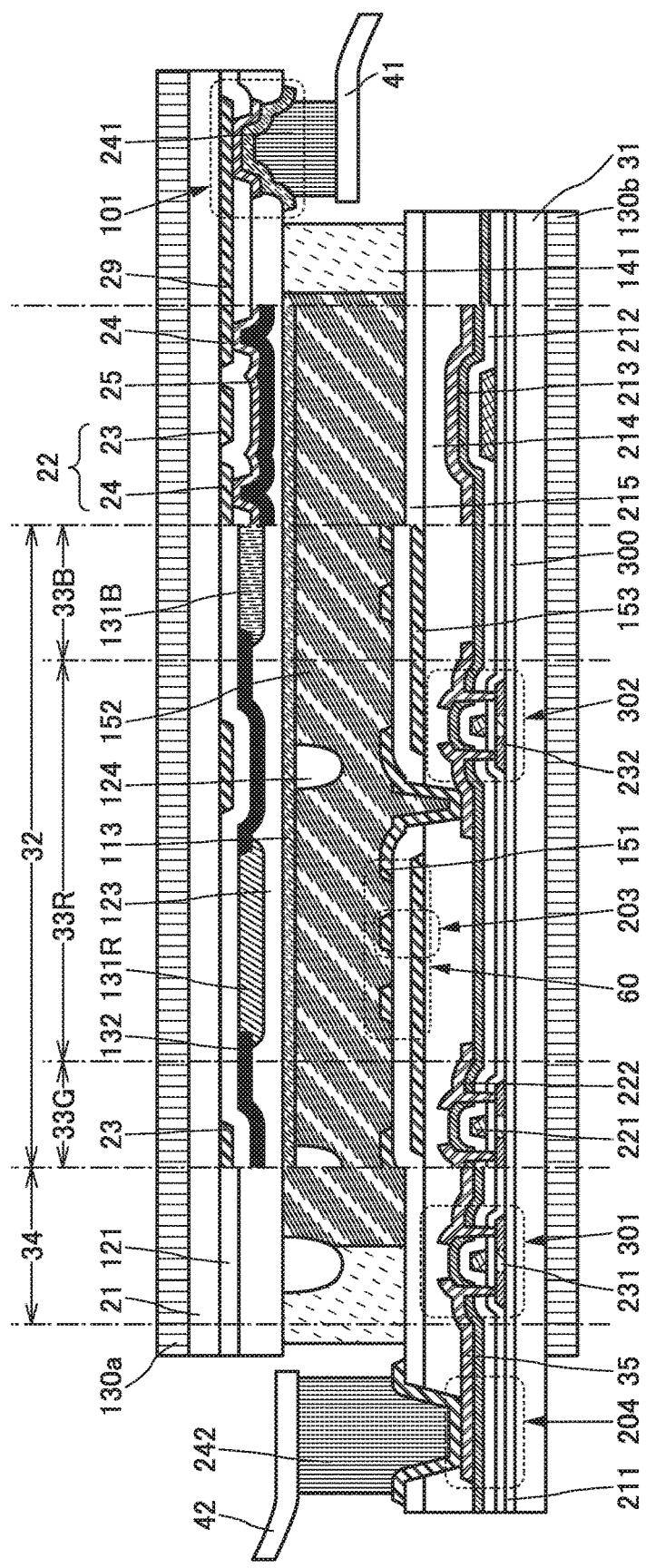
FIG. 21 shows a structure example of a touch panel module of an embodiment.

In FIG. 3, FIG. 4, FIG. 5, FIG. 6, FIG. 7, FIG. 8, FIG. 9, FIG. 10, and FIG. 11, the transistors 201 and 202 can be replaced with the transistors 301 and 302 illustrated in FIG. 13. FIG. 14 is a schematic cross-sectional view of the case where the transistors in FIG. 3 are replaced with the transistors 301 and 302 illustrated in FIG. 13. FIG. 15 is a schematic cross-sectional view of the case where the transistors in FIG. 4 are replaced with the transistors 301 and 302 illustrated in FIG. 13. FIG. 16 is a schematic cross-sectional view of the case where the transistors in FIG. 5 are replaced with the transistors 301 and 302 illustrated in FIG. 13. FIG. 17 is a schematic cross-sectional view of the case where the transistors in FIG. 6 are replaced with the transistors 301 and 302 illustrated in FIG. 13. FIG. 18 is a schematic cross-sectional view of the case where the transistors in FIG. 7 are replaced with the transistors 301 and 302 illustrated in FIG. 13. FIG. 19 is a schematic cross-sectional view of the case where the transistors in FIG. 8 are replaced with the transistors 301 and 302 illustrated in FIG. 13. FIG. 20 is a schematic cross-sectional view of the case where the transistors in FIG. 9 are replaced with the transistors 301 and 302 illustrated in FIG. 13. FIG. 21 is a schematic cross-sectional view of the case where the transistors in FIG. 10 are replaced with the transistors 301 and 302 illustrated in FIG. 13.

Figure 22:
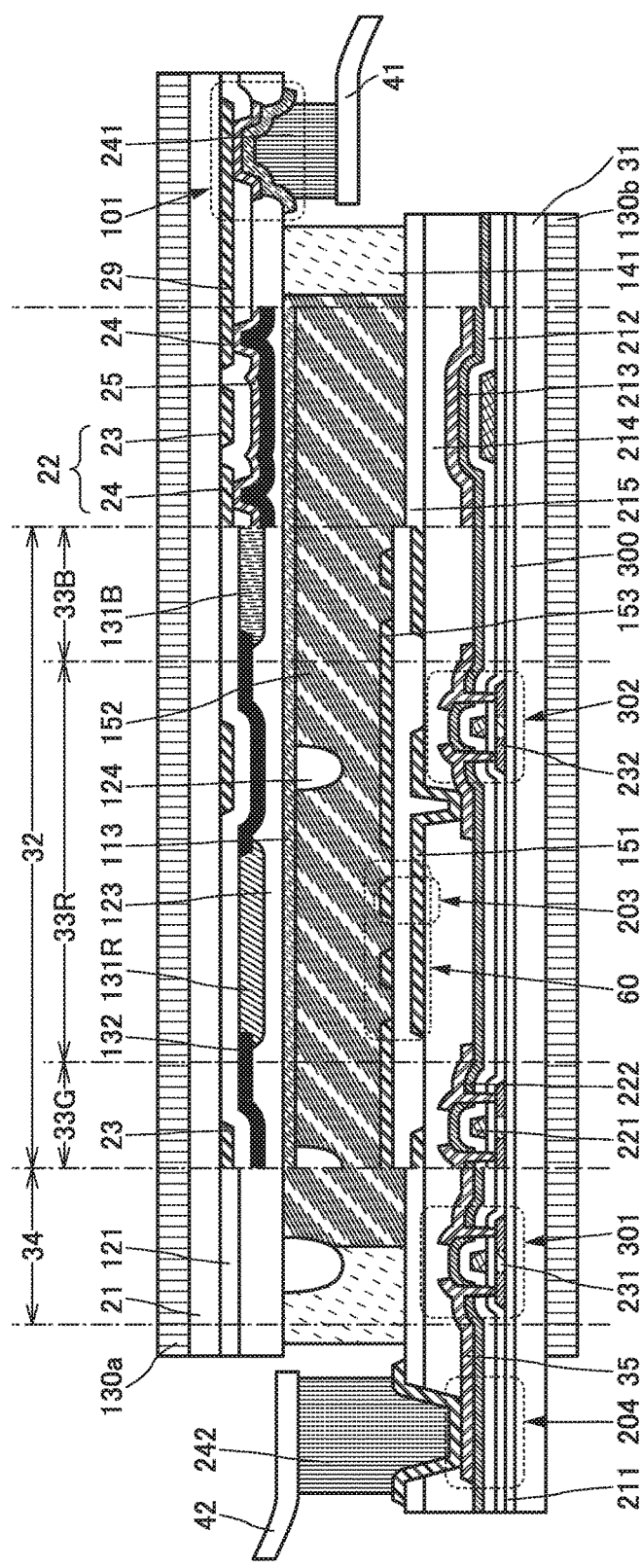
FIG. 22 shows a structure example of a touch panel module of an embodiment.

The example in which among a pair of conductive layers (the conductive layer 151 and the conductive layer 153) included in the display element 60, the conductive layer 151 on the upper side is used as the pixel electrode and the conductive layer 153 on the lower side is used as the common electrode is described in FIG. 21 and the like; however, one embodiment of the present invention is not limited thereto. FIG. 22 illustrates an example where the conductive layer 151 on the lower side is used as the pixel electrode and the conductive layer 153 on the upper side is used as the common electrode. In FIG. 22, the conductive layer 151 has an island-shaped top surface and is electrically connected to a source electrode or a drain electrode of the transistor 202. The conductive layer 153 has a top surface including a slit or a comb-like top surface and is provided across two or more adjacent pixels.

The above is the description of Cross-sectional Structure Example 4.

Cross-Sectional Structure Example 5

Another example of a touch panel that includes a bottom-gate transistor is described below.

Figure 23:
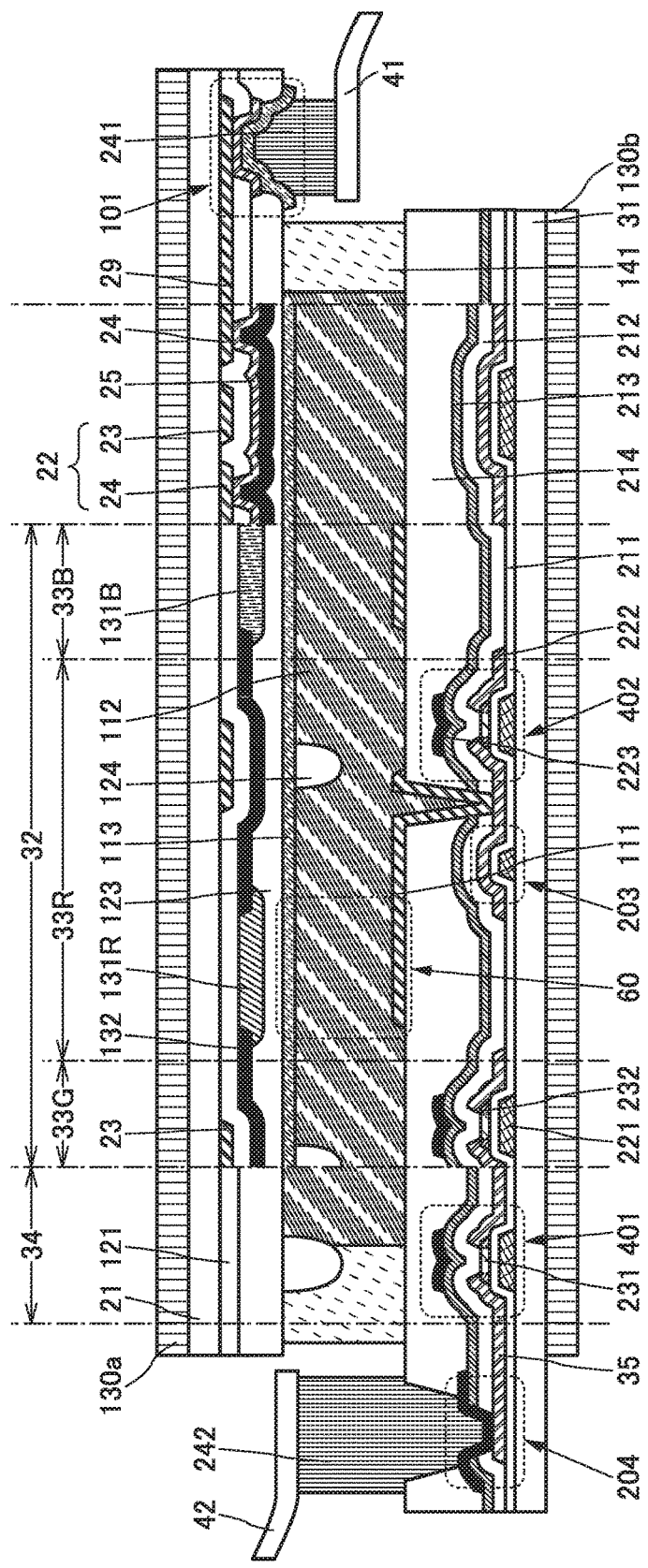
FIG. 23 shows a structure example of a touch panel module of an embodiment.

A touch panel module in FIG. 23 is different from that in FIG. 13 mainly in structures of the transistors 401 and 402. Since structures other than the transistor structures are almost the same as those in FIG. 13, the same portions are denoted by the same reference numerals and detailed descriptions of common portions are omitted.

Each of the transistors 401 and 402 includes the conductive layer 221 functioning as a gate electrode over the substrate 31, the insulating layer 211 functioning as a gate insulating layer and covering the conductive layer 221, the semiconductor layer 231 overlapping with the conductive layer 221 over the insulating layer 211, and the conductive layer 222 functioning as a source electrode or a drain electrode that is in contact with the semiconductor layer 231. The semiconductor layer 231 includes a channel formation region and the low-resistance region 232 having lower electrical resistivity than the channel formation region.

The capacitor 203 includes the conductive layer 221, the conductive layer 222, and the insulating layer 211 which is positioned therebetween and functions as a dielectric. The structure of the capacitor 203 is not limited thereto, and a combination of another conductive layer and another insulating layer may be used. For example, the capacitor 203 may include the conductive layer 221, the low-resistance region 232 of the semiconductor layer 231, and the insulating layer 211 which is positioned therebetween and functions as a dielectric.

In the example illustrated in FIG. 23, the transistors 401 and 402 each have a structure in which the semiconductor layer 231 where a channel is formed is provided between two gate electrodes (conductive layers 221 and 223).

FIG. 23 illustrates an example where the connection portion 204 is formed by stacking part of the wiring 35 and a conductive layer obtained by processing the conductive film used for forming the conductive layer 223.

Figure 24:
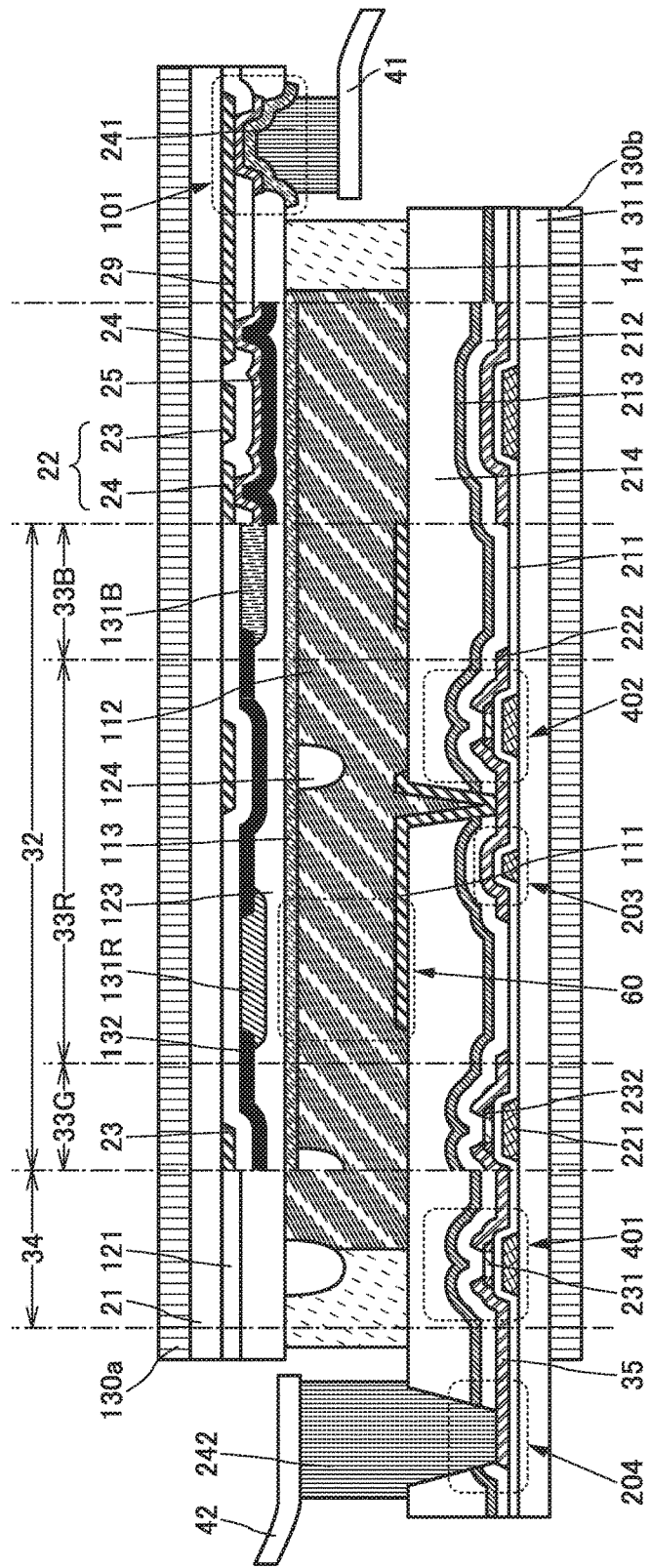
FIG. 24 shows a structure example of a touch panel module of an embodiment.

As illustrated in FIG. 24, a structure without the conductive layer 223 may be employed. When the conductive layer 223 is not provided, a manufacturing process of a touch panel can be simplified and manufacturing cost can be reduced.

At least some of the above examples can be implemented in combination with each other, as appropriate.

At least part of this embodiment can be implemented in combination with any of the other embodiments described in this specification as appropriate.

[Components]

The above-mentioned components are described below.

[Substrate]

A substrate having a flat surface can be used as the substrate included in the touch panel. The substrate on the side from which light from the display element is extracted is formed using a material that transmits the light. For example, a material such as glass, quartz, ceramics, sapphire, or an organic resin can be used.

The weight and thickness of the touch panel can be decreased by using a thin substrate. A flexible touch panel can be obtained by using a substrate that is thin enough to have flexibility.

As the glass, for example, non-alkali glass, barium borosilicate glass, aluminoborosilicate glass, or the like can be used.

Examples of a material that has flexibility and transmits visible light include flexible glass, polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE). In particular, a material whose thermal expansion coefficient is low is preferable, and for example, a polyamide imide resin, a polyimide resin, or PET can be suitably used. A substrate in which a glass fiber is impregnated with an organic resin or a substrate whose thermal expansion coefficient is reduced by mixing an organic resin with an inorganic filler can also be used. A substrate using such a material is lightweight, and accordingly a touch panel using this substrate can also be lightweight.

Since it is not necessary for the substrate through which light is not extracted to have a light-transmitting property, a metal substrate, a ceramic substrate, a semiconductor substrate, or the like can be used as well as the above-described substrates. A metal material and an alloy material, which have high thermal conductivity, is preferable because they can easily conduct heat to the whole sealing substrate and accordingly can prevent a local temperature rise in the touch panel. To obtain flexibility and bendability, the thickness of a metal substrate is preferably greater than or equal to 10 μm and less than or equal to 200 μm, more preferably greater than or equal to 20 μm and less than or equal to 50 μm.

Although there is no particular limitation on a material of a metal substrate, it is favorable to use, for example, a metal such as aluminum, copper, and nickel, an aluminum alloy, or an alloy such as stainless steel.

It is preferable to use a substrate subjected to insulation treatment, e.g., a metal substrate whose surface is oxidized or provided with an insulating film. An insulating film may be formed by, for example, a coating method such as a spin-coating method and a dipping method, an electrodeposition method, an evaporation method, or a sputtering method. An oxide film may be formed over the substrate surface by an anodic oxidation method, exposing to or heating in an oxygen atmosphere, or the like.

The above material layer, and a hard coat layer (e.g., a silicon nitride layer) by which a touch panel surface is protected from damage, a layer (e.g., an aramid resin layer) that can disperse pressure, or the like may be stacked as the flexible substrate. Furthermore, to suppress a decrease in lifetime of the display element due to moisture and the like, an insulating film with low water permeability may be stacked over the flexible substrate. For example, an inorganic insulating material such as silicon nitride, silicon oxynitride, aluminum oxide, or aluminum nitride can be used.

The substrate may be formed by stacking a plurality of layers. When a glass layer is used, a barrier property against water and oxygen can be improved and thus a highly reliable touch panel can be provided.

A substrate in which a glass layer, an adhesive layer, and an organic resin layer are stacked from the side closer to the display element can be used, for example. The thickness of the glass layer is greater than or equal to 20 μm and less than or equal to 200 μm, preferably greater than or equal to 25 μm and less than or equal to 100 μm. With such a thickness, the glass layer can have both a high barrier property against water and oxygen and high flexibility. The thickness of the organic resin layer is greater than or equal to 10 μm and less than or equal to 200 μm, preferably greater than or equal to 20 μm and less than or equal to 50 μm. Providing such an organic resin layer, occurrence of a crack or a break in the glass layer can be suppressed and mechanical strength can be improved. With the substrate that includes such a composite material of a glass material and an organic resin, a highly reliable flexible touch panel can be provided.

[Transistor]

The transistor includes a conductive layer functioning as the gate electrode, the semiconductor layer, a conductive layer functioning as the source electrode, a conductive layer functioning as the drain electrode, and an insulating layer functioning as the gate insulating layer. In the above, a bottom-gate or a top-gate transistor is used.

Note that there is no particular limitation on the structure of the transistor included in the touch panel of one embodiment of the present invention. For example, a forward staggered transistor or an inverted staggered transistor may be used. A top-gate transistor or a bottom-gate transistor may be used. There is no particular limitation on a semiconductor material that is used for the transistor, and for example, an oxide semiconductor, silicon, or germanium can be used.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

As a semiconductor material for the semiconductor layer of the transistor, an element of Group 14, a compound semiconductor, or an oxide semiconductor can be used, for example. Typically, a semiconductor containing silicon, a semiconductor containing gallium arsenide, an oxide semiconductor containing indium, or the like can be used.

In particular, an oxide semiconductor having a wider band gap than silicon is preferably used for the semiconductor of the transistor in which a channel is formed. A semiconductor material having a wider band gap and a lower carrier density than silicon is preferably used because off-state leakage current of the transistor can be reduced.

For example, at least indium (In) or zinc (Zn) is preferably included as the oxide semiconductor. More preferably, an In-M-Zn-based oxide (M is a metal such as Al, Ti, Ga, Ge, Y, Zr, Sn, La, Ce, or Hf) is included.

As the semiconductor layer, it is particularly preferable to use an oxide semiconductor film including a plurality of crystal parts whose c-axes are aligned substantially perpendicular to a surface on which the semiconductor layer is formed or the top surface of the semiconductor layer and in which a grain boundary is not observed between adjacent crystal parts.

There is no grain boundary in such an oxide semiconductor; therefore, generation of a crack in an oxide semiconductor film which is caused by stress when a display panel is bent is prevented. Therefore, such an oxide semiconductor can be preferably used for a flexible touch panel which is used in a bent state, or the like.

Moreover, the use of such an oxide semiconductor with crystallinity for the semiconductor layer makes it possible to provide a highly reliable transistor in which a change in the electrical characteristics is suppressed.

A transistor with an oxide semiconductor whose band gap is larger than the band gap of silicon can hold charges stored in a capacitor that is series-connected to the transistor for a long time, owing to the low off-state current of the transistor. When such a transistor is used for a pixel, operation of a driver circuit can be stopped while a gray scale of an image displayed in each display region is maintained. As a result, a display device with extremely low power consumption can be obtained.

The semiconductor layer preferably includes, for example, a film represented by an In-M-Zn oxide that contains at least indium (In), zinc (Zn), and M (a metal such as Al, Ti, Ga, Y, Zr, La, Ce, Sn, or Hf). In order to reduce variations in electrical characteristics of the transistor including the oxide semiconductor, the oxide semiconductor preferably contains a stabilizer in addition to indium, zinc, and M.

Examples of the stabilizer, including metals that can be used as M, are gallium (Ga), tin (Sn), hafnium (Hf), aluminum (Al), and zirconium (Zr). As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be given.

As an oxide semiconductor included in the semiconductor layer, any of the following can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, for example, an "In—Ga—Zn-based oxide" means an oxide containing In, Ga, and Zn as its main components, and there is no limitation on the ratio of In:Ga:Zn. The In—Ga—Zn-based oxide may contain another metal element in addition to In, Ga, and Zn.

The semiconductor layer and the conductive layer may include the same metal elements contained in the above oxides. The use of the same metal elements for the semiconductor layer and the conductive layer can reduce the manufacturing cost. For example, when metal oxide targets with the same metal composition are used, the manufacturing cost can be reduced, and the same etching gas or the same etchant can be used in processing the semiconductor layer and the conductive layer. Note that even when the semiconductor layer and the conductive layer include the same metal elements, they have different compositions in some cases. For example, a metal element in a film is released during the manufacturing process of the transistor and the capacitor, which might result in different metal compositions.

In the case where the semiconductor layer is an In-M-Zn oxide, the proportions of In and M when the summation of In and M is assumed to be 100 atomic % are preferably as follows: the atomic percentage of In is higher than 25 atomic % and the atomic percentage of M is lower than 75 atomic %, more preferably, the atomic percentage of In is higher than 34 atomic % and the atomic percentage of M is lower than 66 atomic %.

The energy gap of the semiconductor layer is 2 eV or more, preferably 2.5 eV or more, more preferably 3 eV or more. With the use of an oxide semiconductor having such a wide energy gap, the off-state current of the transistor can be reduced.

The thickness of the semiconductor layer is greater than or equal to 3 nm and less than or equal to 200 nm, preferably greater than or equal to 3 nm and less than or equal to 100 nm, more preferably greater than or equal to 3 nm and less than or equal to 50 nm.

In the case where the semiconductor layer contains an In-M-Zn oxide (M represents Al, Ga, Y, Zr, La, Ce, or Nd), it is preferable that the atomic ratio of metal elements of a sputtering target used for forming a film of the In-M-Zn oxide satisfy In≥M and Zn≥M. As the atomic ratio of metal elements of such a sputtering target, In:M:Zn=1:1:1, In:M:Zn=1:1:1.2, and In:M:Zn=3:1:2 are preferable. Note that the atomic ratio of metal elements in the formed semiconductor layer varies from the above atomic ratio of metal elements of the sputtering target within a range of ±40% as an error.

An oxide semiconductor film with low carrier density is used as the semiconductor layer. For example, the semiconductor layer is an oxide semiconductor film whose carrier density is lower than or equal to $1 \times 10^{17}/cm^3$, preferably lower than or equal to $1 \times 10^{15}/cm^3$, more preferably lower than or equal to $1 \times 10^{13}/cm^3$, still more preferably lower than or equal to $1 \times 10^{11}/cm^3$.

Note that, without limitation to those described above, a material with an appropriate composition may be used depending on required semiconductor characteristics and electrical characteristics (e.g., field-effect mobility and threshold voltage) of a transistor. To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

When silicon or carbon that is one of elements belonging to Group 14 is contained in the semiconductor layer, oxygen vacancies are increased in the semiconductor layer, and the semiconductor layer becomes n-type. Thus, the concentration of silicon or carbon (measured by secondary ion mass spectrometry (SIMS)) in the semiconductor layer is lower than or equal to $2 \times 10^{18}$ atoms/cm$^3$, preferably lower than or equal to $2 \times 10^{17}$ atoms/cm$^3$.

Furthermore, the concentration of alkali metal or alkaline earth metal of the semiconductor layer, which is measured by SIMS, is lower than or equal to $1 \times 10^{18}$ atoms/cm$^3$, preferably lower than or equal to $2 \times 10^{16}$ atoms/cm$^3$. An alkali metal and an alkaline earth metal might generate carriers when bonded to an oxide semiconductor, in which case the off-state current of the transistor might be increased. Therefore, it is preferable to reduce the concentration of alkali metal or alkaline earth metal in the semiconductor layer.

When nitrogen is contained in the semiconductor layer, electrons serving as carriers are generated and the carrier density increases, so that the semiconductor layer easily becomes n-type. Thus, a transistor including an oxide semiconductor which contains nitrogen is likely to be normally on. For this reason, nitrogen in the oxide semiconductor film is preferably reduced as much as possible; the concentration of nitrogen which is measured by SIMS is preferably set to, for example, lower than or equal to $5 \times 10^{18}$ atoms/cm$^3$.

An oxide semiconductor is classified into a single crystal oxide semiconductor and a non-single-crystal oxide semiconductor. Examples of a non-single-crystal oxide semiconductor include a c-axis aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

From another perspective, an oxide semiconductor is classified into an amorphous oxide semiconductor and a crystalline oxide semiconductor. Examples of a crystalline oxide semiconductor include a single crystal oxide semiconductor, a CAAC-OS, a polycrystalline oxide semiconductor, and an nc-OS.

An amorphous structure is generally thought to be isotropic and have no non-uniform structure, to be metastable and have no fixed positions of atoms, to have a flexible bond angle, and to have a short-range order but have no long-range order, for example.

In other words, a stable oxide semiconductor cannot be regarded as a completely amorphous oxide semiconductor. Moreover, an oxide semiconductor that is not isotropic (e.g., an oxide semiconductor that has a periodic structure in a microscopic region) cannot be regarded as a completely amorphous oxide semiconductor. In contrast, an a-like OS, which is not isotropic, has an unstable structure that contains a void. Because of its instability, an a-like OS is close to an amorphous oxide semiconductor in terms of physical properties.

First, a CAAC-OS film is described.

The CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, even in the high-resolution TEM image, a boundary between the crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology reflecting a surface over which the CAAC-OS film is formed (hereinafter, a surface over which the CAAC-OS film is formed is referred to as a formation surface) or a top surface of the CAAC-OS film, and is arranged parallel to the formation surface or the top surface of the CAAC-OS film.

On the other hand, according to the high-resolution planar TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

A CAAC-OS film is subjected to structural analysis with an X-ray diffraction (XRD) apparatus. For example, when the CAAC-OS film including InGaZnO$_4$ crystals is analyzed by an out-of-plane method, a peak appears frequently when the diffraction angle (2θ) is around 31°. This peak is derived from the (009) plane of the InGaZnO$_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film with an InGaZnO$_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. A heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Charges trapped by the carrier traps in the oxide semiconductor film take a long time to be released, and might behave like fixed charges. Thus, the transistor which includes the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Next, a microcrystalline oxide semiconductor film is described.

A microcrystalline oxide semiconductor film has a region where a crystal part is observed in a high-resolution TEM image and a region where a crystal part is not clearly observed in a high-resolution TEM image. In most cases, a crystal part in the microcrystalline oxide semiconductor film is greater than or equal to 1 nm and less than or equal to 100 nm, or greater than or equal to 1 nm and less than or equal to 10 nm. A microcrystal with a size greater than or equal to 1 nm and less than or equal to 10 nm, or a size greater than or equal to 1 nm and less than or equal to 3 nm is specifically referred to as nanocrystal (nc). An oxide semiconductor film including nanocrystal is referred to as an nc-OS (nanocrystalline oxide semiconductor) film. In a high-resolution TEM image of the nc-OS film, for example, a grain boundary is not clearly observed in some cases.

In the nc-OS film, a microscopic region (for example, a region with a size greater than or equal to 1 nm and less than or equal to 10 nm, in particular, a region with a size greater than or equal to 1 nm and less than or equal to 3 nm) has a periodic atomic order. Note that there is no regularity of crystal orientation between different crystal parts in the nc-OS film. Thus, the orientation of the whole film is not observed. Accordingly, in some cases, the nc-OS film cannot be distinguished from an amorphous oxide semiconductor film depending on an analysis method. For example, when the nc-OS film is subjected to structural analysis by an out-of-plane method with an XRD apparatus using an X-ray having a diameter larger than that of a crystal part, a peak which shows a crystal plane does not appear. Furthermore, a diffraction pattern like a halo pattern appears in a selected-area electron diffraction pattern of the nc-OS film which is obtained by using an electron beam having a probe diameter (e.g., larger than or equal to 50 nm) larger than the diameter of a crystal part. Meanwhile, spots are shown in a nanobeam electron diffraction pattern of the nc-OS film obtained by using an electron beam having a probe diameter close to, or smaller than the diameter of a crystal part. Furthermore, in a nanobeam electron diffraction pattern of the nc-OS film, regions with high luminance in a circular (ring) pattern are shown in some cases. Also in a nanobeam electron diffraction pattern of the nc-OS film, a plurality of spots is shown in a ring-like region in some cases.

The nc-OS film is an oxide semiconductor film that has high regularity as compared to an amorphous oxide semiconductor film. Therefore, the nc-OS film has a lower density of defect states than an amorphous oxide semiconductor film. However, there is no regularity of crystal orientation between different crystal parts in the nc-OS film; hence, the nc-OS film has a higher density of defect states than the CAAC-OS film.

Next, an amorphous oxide semiconductor film is described.

The amorphous oxide semiconductor film has disordered atomic arrangement and no crystal part. For example, the amorphous oxide semiconductor film does not have a specific state as in quartz.

In the high-resolution TEM image of the amorphous oxide semiconductor film, crystal parts cannot be found.

When the amorphous oxide semiconductor film is subjected to structural analysis by an out-of-plane method with an XRD apparatus, a peak which shows a crystal plane does not appear. A halo pattern is shown in an electron diffraction pattern of the amorphous oxide semiconductor film. Furthermore, a halo pattern is shown but a spot is not shown in a nanobeam electron diffraction pattern of the amorphous oxide semiconductor film.

Note that an oxide semiconductor film may have a structure having physical properties between the nc-OS film and the amorphous oxide semiconductor film. The oxide semiconductor film having such a structure is specifically referred to as an amorphous-like oxide semiconductor film.

In a high-resolution TEM image of the a-like OS film, a void may be seen. Furthermore, in the high-resolution TEM image, there are a region where a crystal part is clearly observed and a region where a crystal part is not observed. In the a-like OS film, crystallization by a slight amount of electron beam used for TEM observation occurs and growth of the crystal part can be found in some cases. In contrast, crystallization by a slight amount of electron beam used for TEM observation is less observed in the nc-OS film having good quality.

Note that the crystal part size in the a-like OS film and the nc-OS film can be measured using high-resolution TEM images. For example, an $InGaZnO_4$ crystal has a layered structure in which two Ga—Zn—O layers are included between In—O layers. A unit cell of the $InGaZnO_4$ crystal has a structure in which nine layers of three In—O layers and six Ga—Zn—O layers are layered in the c-axis direction. Accordingly, the spacing between these adjacent layers is equivalent to the lattice spacing on the (009) plane (also referred to as d value). The value is calculated to 0.29 nm from crystal structure analysis. Thus, each of the lattice fringes having a distance therebetween of from 0.28 nm to 0.30 nm corresponds to the a-b plane of the InGaZnO$_4$ crystal, focusing on the lattice fringes in the high-resolution TEM image.

The density of an oxide semiconductor film might vary depending on its structure. For example, if the composition of an oxide semiconductor film is determined, the structure of the oxide semiconductor film can be estimated from a comparison between the density of the oxide semiconductor film and the density of a single crystal oxide semiconductor film having the same composition as the oxide semiconductor film. For example, the density of the a-like OS film is higher than or equal to 78.6% and lower than 92.3% of the density of the single crystal oxide semiconductor film having the same composition. For example, the density of each of the nc-OS film and the CAAC-OS film is higher than or equal to 92.3% and lower than 100% of the density of the single crystal oxide semiconductor film having the same composition. Note that it is difficult to deposit an oxide semiconductor film whose density is lower than 78% of the density of the single crystal oxide semiconductor film.

Specific examples of the above description are given. For example, in the case of an oxide semiconductor film with an atomic ratio of In:Ga:Zn=1:1:1, the density of single-crystal InGaZnO$_4$ with a rhombohedral crystal structure is 6.357 g/cm$^3$. Thus, for example, in the case of the oxide semiconductor film with an atomic ratio of In:Ga:Zn=1:1:1, the density of an a-like OS film is higher than or equal to 5.0 g/cm$^3$ and lower than 5.9 g/cm$^3$. In addition, for example, in the case of the oxide semiconductor film with an atomic ratio of In:Ga:Zn=1:1:1, the density of an nc-OS film or a CAAC-OS film is higher than or equal to 5.9 g/cm$^3$ and lower than 6.3 g/cm$^3$.

Note that single crystals with the same composition do not exist in some cases. In such a case, by combining single crystals with different compositions at a given proportion, it is possible to calculate density that corresponds to the density of a single crystal with a desired composition. The density of the single crystal with a desired composition may be calculated using weighted average with respect to the combination ratio of the single crystals with different compositions. Note that it is preferable to combine as few kinds of single crystals as possible for density calculation.

Note that the semiconductor layer may be a mixed film including two or more of the following: a region having an amorphous structure, a region having a microcrystalline structure, a region having a polycrystalline structure, a CAAC-OS region, and a region having a single-crystal structure. The mixed film includes, for example, two or more of a region having an amorphous structure, a region having a microcrystalline structure, a region having a polycrystalline structure, a CAAC-OS region, and a region having a single-crystal structure in some cases. The mixed film may have a stacked-layer structure of two or more of the following: a region having an amorphous structure, a region having a microcrystalline structure, a region having a polycrystalline structure, a CAAC-OS region, and a region having a single-crystal structure.

Alternatively, silicon is preferably used as a semiconductor in which a channel of a transistor is formed. Although amorphous silicon may be used as silicon, silicon having crystallinity is particularly preferable. For example, microcrystalline silicon, polycrystalline silicon, single-crystal silicon, or the like is preferably used. In particular, polycrystalline silicon can be formed at a lower temperature than single-crystal silicon and has higher field effect mobility and higher reliability than amorphous silicon. When such a polycrystalline semiconductor is used for a pixel, the aperture ratio of the pixel can be improved. Even in the case of a high-definition display panel, a gate driver circuit and a source driver circuit can be formed over a substrate over which the pixels are formed, and the number of components of an electronic device can be reduced.

The bottom-gate transistor described in this embodiment is preferable because the number of manufacturing steps can be reduced. When an oxide semiconductor or amorphous silicon, which can be formed at a lower temperature than polycrystalline silicon, is used for the semiconductor layer, materials with low heat resistance can be used for a wiring, an electrode, or a substrate below the semiconductor layer, so that the range of choices of materials can be widened. For example, an extremely large glass substrate can be favorably used. Meanwhile, the top-gate transistor is preferable because an impurity region is easily formed in a self-aligned manner and variation in characteristics can be reduced. In that case, the use of an oxide semiconductor, polycrystalline silicon, single-crystal silicon, or the like is particularly preferable.

[Conductive Layer]

As conductive layers such as a gate, a source, and a drain of the transistor and a wiring and an electrode in the touch panel, a single-layer structure or a stacked-layer structure using any of metals such as aluminum, titanium, chromium, nickel, copper, yttrium, zirconium, molybdenum, silver, tantalum, and tungsten, or an alloy containing any of these metals as its main component can be used. For example, the following structures can be given: a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order. Note that a transparent conductive material containing indium oxide, tin oxide, or zinc oxide may be used. Copper containing manganese is preferably used because controllability of a shape by etching is increased.

As a light-transmitting conductive material, a conductive oxide such as indium oxide, indium tin oxide, indium zinc oxide, zinc oxide, or zinc oxide to which gallium is added, or graphene can be used. Alternatively, a metal material such as gold, silver, platinum, magnesium, nickel, tungsten, chromium, molybdenum, iron, cobalt, copper, palladium, or titanium, or an alloy material containing any of these metal materials can be used. Alternatively, a nitride of the metal material (e.g., titanium nitride) or the like may be used. In the case of using the metal material or the alloy material (or the nitride thereof), the thickness is set small enough to be able to transmit light. Alternatively, a stack of any of the above materials can be used as the conductive layer. For example, a stacked film of indium tin oxide and an alloy of silver and magnesium is preferably used because the conductivity can be increased.

Alternatively, for the conductive layer, an oxide semiconductor similar to that of the semiconductor layer is preferably used. In that case, it is preferable that the conductive layer be formed to have a lower electric resistance than a region in the semiconductor layer where a channel is formed.

For example, such a conductive layer can be used as the conductive layer 223 functioning as the second gate electrode of the transistor. Alternatively, it can be used as another light-transmitting conductive layer.

<Method for Controlling Resistivity of Oxide Semiconductor>

An oxide semiconductor film that can be used as each of the semiconductor layer and the conductive layer includes a semiconductor material whose resistivity can be controlled by oxygen vacancies in the film and/or the concentration of impurities such as hydrogen or water in the film. Thus, treatment to be performed on the semiconductor layer and the conductive layer is selected from the following to control the resistivity of each of the oxide semiconductor films: treatment for increasing oxygen vacancies and/or impurity concentration and treatment for reducing oxygen vacancies and/or impurity concentration.

Specifically, plasma treatment is performed on the oxide semiconductor film used as the conductive layer to increase oxygen vacancies and/or impurities such as hydrogen or water in the oxide semiconductor film, so that the oxide semiconductor film can have a high carrier density and low resistivity. Furthermore, an insulating film containing hydrogen is formed in contact with the oxide semiconductor film to diffuse hydrogen from the insulating film containing hydrogen to the oxide semiconductor film, so that the oxide semiconductor film can have a high carrier density and low resistivity.

The semiconductor layer that functions as the channel region of the transistor is not in contact with the insulating films containing hydrogen. With the use of an insulating film containing oxygen, in other words, an insulating film capable of releasing oxygen for at least one of the insulating films in contact with the semiconductor layer, oxygen can be supplied to the semiconductor layer. The semiconductor layer to which oxygen is supplied has high resistivity because oxygen vacancies in the film or at the interface are compensated. Note that as the insulating film capable of releasing oxygen, a silicon oxide film or a silicon oxynitride film can be used, for example.

In order to reduce the resistivity of the oxide semiconductor film, an ion implantation method, an ion doping method, a plasma immersion ion implantation method, or the like can be employed to inject hydrogen, boron, phosphorus, or nitrogen into the oxide semiconductor film.

In order to reduce the resistivity of the oxide semiconductor film, plasma treatment may be performed on the oxide semiconductor film. For the plasma treatment, a gas containing at least one of a rare gas (He, Ne, Ar, Kr, or Xe), hydrogen, and nitrogen is typically used. Specifically, plasma treatment in an Ar atmosphere, plasma treatment in a mixed gas atmosphere of Ar and hydrogen, plasma treatment in an ammonia atmosphere, plasma treatment in a mixed gas atmosphere of Ar and ammonia, plasma treatment in a nitrogen atmosphere, or the like can be employed.

In the oxide semiconductor film subjected to the plasma treatment, an oxygen vacancy is formed in a lattice from which oxygen is released (or in a portion from which oxygen is released). This oxygen vacancy can cause carrier generation. When hydrogen is supplied from an insulating film that is in the vicinity of the oxide semiconductor film (specifically, an insulating film that is in contact with the lower surface or the upper surface of the oxide semiconductor film), and hydrogen is bonded to the oxygen vacancy, an electron serving as a carrier might be generated.

The oxide semiconductor film in which oxygen vacancies are compensated with oxygen and in which the hydrogen concentration is reduced can be referred to as a highly purified intrinsic or substantially highly purified intrinsic oxide semiconductor film. Here, the term "substantially intrinsic" refers to a state where an oxide semiconductor film has a carrier density of lower than $8\times10^{11}/cm^3$, preferably lower than $1\times10^{11}/cm^3$, more preferably lower than $1\times10^{10}/cm^3$. A highly purified intrinsic or substantially highly purified intrinsic oxide semiconductor film has few carrier generation sources and can thus have a low carrier density. The highly purified intrinsic or substantially highly purified intrinsic oxide semiconductor film has a low density of defect states and can accordingly have a low density of trap states.

The highly purified intrinsic or substantially highly purified intrinsic oxide semiconductor film has an extremely low off-state current; even when an element has a channel width of $1\times10^6$ μm and a channel length of 10 μm, the off-state current can be lower than or equal to the measurement limit of a semiconductor parameter analyzer, i.e., lower than or equal to $1\times10^{-13}$ A, at a voltage (drain voltage) between a source electrode and a drain electrode ranging from 1 V to 10 V. Accordingly, the transistor in which the channel region is formed in the semiconductor layer that is a highly purified intrinsic or substantially highly purified intrinsic oxide semiconductor film can have a small variation in electrical characteristics and high reliability.

For example, an insulating film containing hydrogen, in other words, an insulating film capable of releasing hydrogen, typically, a silicon nitride film, is used as the insulating film in contact with the oxide semiconductor film used as the conductive layer, whereby hydrogen can be supplied to the conductive layer. The hydrogen concentration of the insulating film capable of releasing hydrogen is preferably higher than or equal to $1\times10^{22}$ atoms/cm$^3$. Such an insulating film is formed in contact with the conductive layer, whereby hydrogen can be effectively contained in the conductive layer. In this manner, the resistivity of the oxide semiconductor film can be controlled by changing the structure of insulating films in contact with the semiconductor layer and the conductive layer.

Hydrogen contained in the oxide semiconductor film reacts with oxygen bonded to a metal atom to be water, and in addition, an oxygen vacancy is formed in a lattice from which oxygen is released (or in a portion from which oxygen is released). Due to entry of hydrogen into the oxygen vacancy, an electron serving as a carrier is generated in some cases. Furthermore, bonding of part of hydrogen to oxygen bonded to a metal atom causes generation of an electron serving as a carrier in some cases. Accordingly, the conductive layer formed in contact with the insulating film containing hydrogen is an oxide semiconductor film that has a higher carrier density than the semiconductor layer.

In the semiconductor layer where the channel region of the transistor is formed, it is preferable to reduce hydrogen as much as possible. Specifically, in the semiconductor layer, the hydrogen concentration which is measured by SIMS is set to lower than or equal to $2\times10^{20}$ atoms/cm$^3$, preferably lower than or equal to $5\times10^{19}$ atoms/cm$^3$, more preferably lower than or equal to $1\times10^{19}$ atoms/$cm^3$, more preferably lower than $5\times10^{18}$ atoms/$cm^3$, more preferably lower than or equal to $1\times10^{18}$ atoms/$cm^3$, more preferably lower than or equal to $5\times10^{17}$ atoms/$cm^3$, more preferably lower than or equal to $1\times10^{16}$ atoms/$cm^3$.

The conductive layer is an oxide semiconductor film that has a higher hydrogen concentration and/or a larger number of oxygen vacancies (i.e., a lower resistivity) than the semiconductor layer. The hydrogen concentration in the conductive layer is higher than or equal to $8\times10^{19}$ atoms/$cm^3$, preferably higher than or equal to $1\times10^{20}$ atoms/$cm^3$, more preferably higher than or equal to $5\times10^{20}$ atoms/$cm^3$. The hydrogen concentration in the conductive layer is greater than or equal to 2 times, preferably greater than or equal to 10 times the hydrogen concentration in the semiconductor layer. The resistivity of the conductive layer is preferably greater than or equal to $1\times10^{-8}$ times and less than $1\times10^{-1}$ times the resistivity of the semiconductor layer. The resistivity of the conductive layer is typically greater than or equal to $1\times10^{-3}$ $\Omega$cm and less than $1\times10^{4}$ $\Omega$cm, preferably greater than or equal to $1\times10^{-3}$ $\Omega$cm and less than $1\times10^{-1}$ $\Omega$cm.

[Insulating Layer]

Examples of an insulating material that can be used for the insulating layers, the overcoat, the spacer, and the like include a resin such as acrylic or epoxy resin, a resin having a siloxane bond, and an inorganic insulating material such as silicon oxide, silicon oxynitride, silicon nitride oxide, silicon nitride, or aluminum oxide.

[Adhesive Layer]

For the adhesive layers, a curable resin such as a heat curable resin, a photocurable resin, or a two-component type curable resin can be used. For example, an acrylic resin, a urethane resin, an epoxy resin, or a resin having a siloxane bond can be used.

[Connection Layer]

As the connection layers, an anisotropic conductive film (ACF), an anisotropic conductive paste (ACP), or the like can be used.

[Coloring Layer]

As examples of a material that can be used for the coloring layers, a metal material, a resin material, and a resin material containing a pigment or dye can be given.

[Light-Blocking Layer]

The light-blocking layer can be formed using a material that blocks light emitted from the light-emitting element, for example, a resin material containing a metal material, pigment, or dye. Alternatively, a metal thin film, a semiconductor thin film, or the like may be used. Two or more coloring layers may be stacked and function as a light-blocking layer.

The above is the description of each of the components.

[Structural Example of Touch Sensor]

Next, a structure example of the touch sensor 22 which can be used for the touch panel module 10 of one embodiment of the present invention is described with reference to drawings.

Figure 25A:
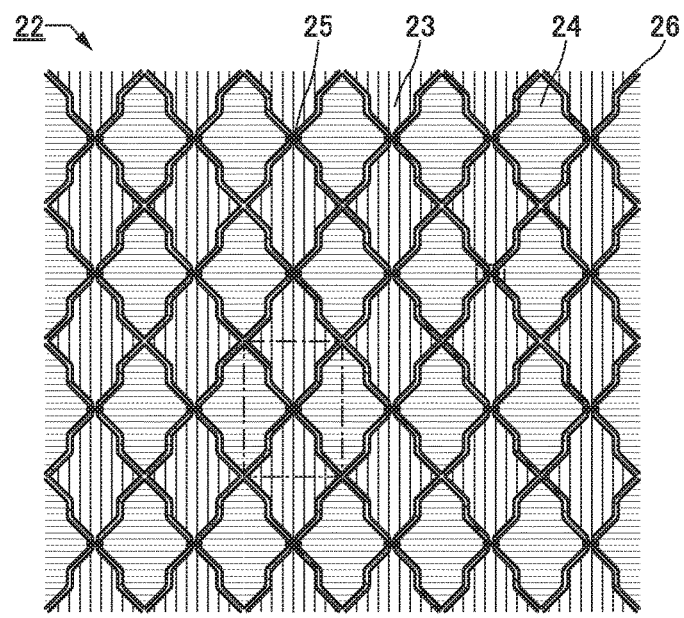
FIGS. 25A to 25C show structure examples of a touch sensor of an embodiment.
Figure 25B:
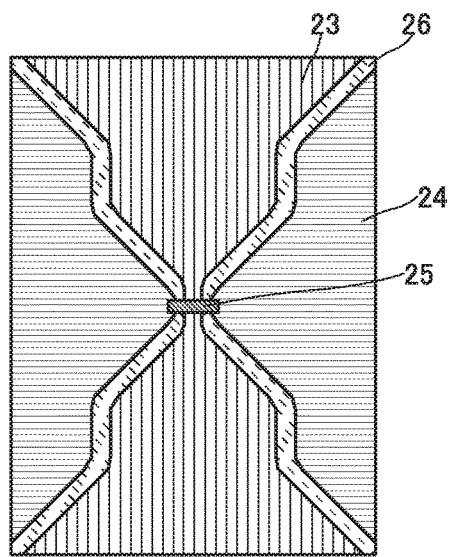

FIG. 25A is a schematic top view (schematic plan view) of part of the touch sensor 22. FIG. 25B is an enlarged schematic top view of a region surrounded by dashed-dotted line in FIG. 25A.

Each of the conductive layers 23 and 24 can have a lattice shape (also referred to as a mesh shape) or include a plurality of openings. In FIG. 25A and the like, the lattice or the openings are omitted to describe the outlines of the conductive layers 23 and 24.

As shown in FIGS. 25A and 25B, it is preferable that the conductive layer 23 be partly narrowed so that the width of a portion crossing the conductive layer 25 is small. Thus, the capacitance formed in a portion where the conductive layers 23 and 25 overlap with each other can be reduced. In the case of using a self-capacitive touch sensor or a mutual capacitive touch sensor, the detection sensitivity can be increased when the capacitance of the capacitor is reduced.

Furthermore, between the conductive layer 23 and the conductive layer 24 which are adjacent to each other, a conductive layer 26 which is electrically insulated from these conductive layers 23 and 24 may be provided. The conductive layer 26 can suppress the formation of a thin portion of the touch sensor 22. For example, in the case where the conductive layer 23 and the conductive layer 24 are formed over the same flat surface, the conductive layer 26 formed in a manner similar to that of the conductive layer 23 and the conductive layer 24 can increase coverage of a thin film formed after the formation of these conductive layers; thus, a surface can be planarized. Furthermore, owing to the uniform thickness of the touch sensor 22, luminance unevenness of light emitted from the pixels through the touch sensor 22 can be reduced, so that the touch panel can achieve high display quality.

Figure 25C:
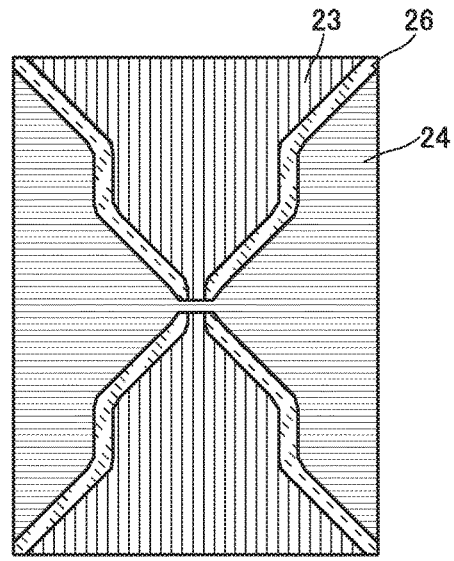

FIG. 25C shows the case where the conductive layer 23 and the conductive layer 24 are formed over different flat surfaces and the conductive layer 25 is not provided. At this time, the conductive layer 26 may be formed over the flat surface over which the conductive layer 23 or the conductive layer 24 is formed, or may be formed over a flat surface different from the flat surface over which the conductive layer 23 or the conductive layer 24 is formed. Note that the conductive layer 26 is not necessarily provided if not necessary.

Figure 26A:
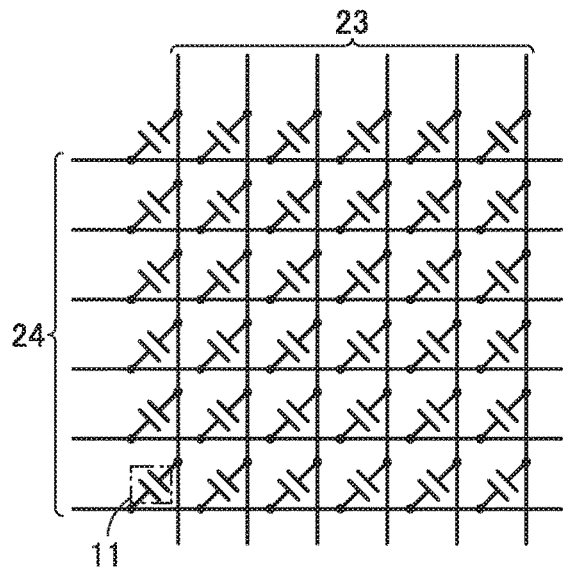
FIGS. 26A to 26C show structure examples of a touch sensor of an embodiment.

FIG. 26A shows an example of a circuit diagram of the touch sensor 22 including a plurality of conductive layers 23 and a plurality of conductive layers 24. In FIG. 26A, six conductive layers 23 and six conductive layers 24 are shown for simplicity, but the number of the conductive layers 23 and the number of the conductive layers 24 are not limited thereto.

One capacitor 11 is formed using one of the conductive layers 23 and one of the conductive layers 24. Therefore, capacitors 11 are arranged in a matrix.

The capacitor 11 is formed by stacking the conductive layers 23 and 24 or providing the conductive layers 23 and 24 to be close to each other.

In the case of a projected self-capacitive type, a pulse voltage is applied to each of the conductive layers 23 and 24 so that the conductive layers 23 and 24 are scanned, and the value of a current flowing in the conductive layer 23 or the conductive layer 24 at this time is sensed. When an object approaches, capacitive coupling is generated between the object and the conductive layer 23 or 24. Thus, the amount of current flowing in the conductive layer 23 or 24 when a pulse voltage is applied is changed by changing the amount of capacitance connected to the conductive layer 23 or 24. Positional information of the object can be obtained by sensing the change in the current.

In the case of a projected mutual-capacitive type, a pulse voltage is applied to one of the conductive layers 23 and 24 so that one of the conductive layers 23 and 24 is scanned, and a current flowing in the other is sensed. By application of a pulse voltage, an electric field is generated between the conductive layers 23 and 24. When the object approaches, the electric field generated between the conductive layers 23 and 24 is changed by block or the like due to the object and therefore, current flowing in the other is changed. By sensing this change in current, positional information of the object can be obtained.

In order to sense a change in current, the total amount of current may be sensed. In that case, an integrator circuit or the like may be used to sense the total amount of current. Alternatively, the peak value of current may be sensed. In that case, current may be converted into voltage, and the peak value of voltage may be sensed.

Figure 26B:
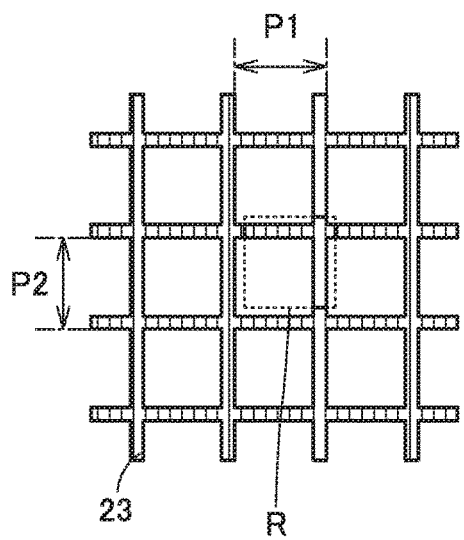

Each of the conductive layers 23 and 24 preferably has a lattice shape or a mesh shape having a plurality of openings. FIG. 26B shows an example of a top surface shape of part of the conductive layer 23.

Figure 26C:
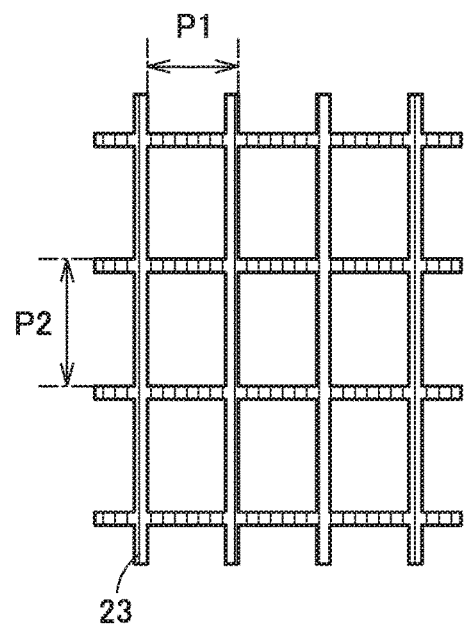

The conductive layer 23 shown in FIG. 26B has a lattice shape in which a distance P1 is provided in a lateral direction and a distance P2 is provided in a longitudinal direction. The distance P1 and the distance P2 are almost the same in FIG. 26B, but may be different from each other. For example, the distance P2 in a longitudinal direction may be larger than the distance P1 in a lateral direction as shown in FIG. 26C, or the distance P2 in a longitudinal direction may be smaller than the distance P1 in a lateral direction. The same can be said for the conductive layer 24.

The aperture ratio of the conductive layer 23 or the conductive layer 24 (the proportion of the opening area in the conductive layer 23 or the conductive layer 24 per unit area) is, for example, preferably higher than or equal to 20% and lower than 100%, more preferably higher than or equal to 30% and lower than 100%, still more preferably higher than or equal to 50% and lower than 100% in a region.

The aperture ratio can be easily calculated from the distance P1, the distance P2, and the width of the conductive layer. Alternatively, when a region R is assumed to be a periodic unit in FIG. 26B, the aperture ratio can be calculated from the ratio of the area of the region R to the area of the conductive layer 23 included in the region R. Here, the region R is a periodic unit of a periodic pattern of the conductive layer 23. By arranging regions R longitudinally and laterally in a periodic manner, the pattern of the conductive layer 23 can be formed.

In each of the conductive layer 23 and the conductive layer 24, the line width of a lattice is preferably greater than or equal to 50 nm and less than or equal to 100 µm, more preferably greater than or equal to 1 µm and less than or equal to 50 µm, still more preferably greater than or equal to 1 µm and less than or equal to 20 µm. The lattice having such a narrow line width allows adjacent pixels to be close to each other in the case where the opening overlaps with the pixel as described later. Consequently, the touch panel can have higher resolution and higher aperture ratio.

Figure 27A:
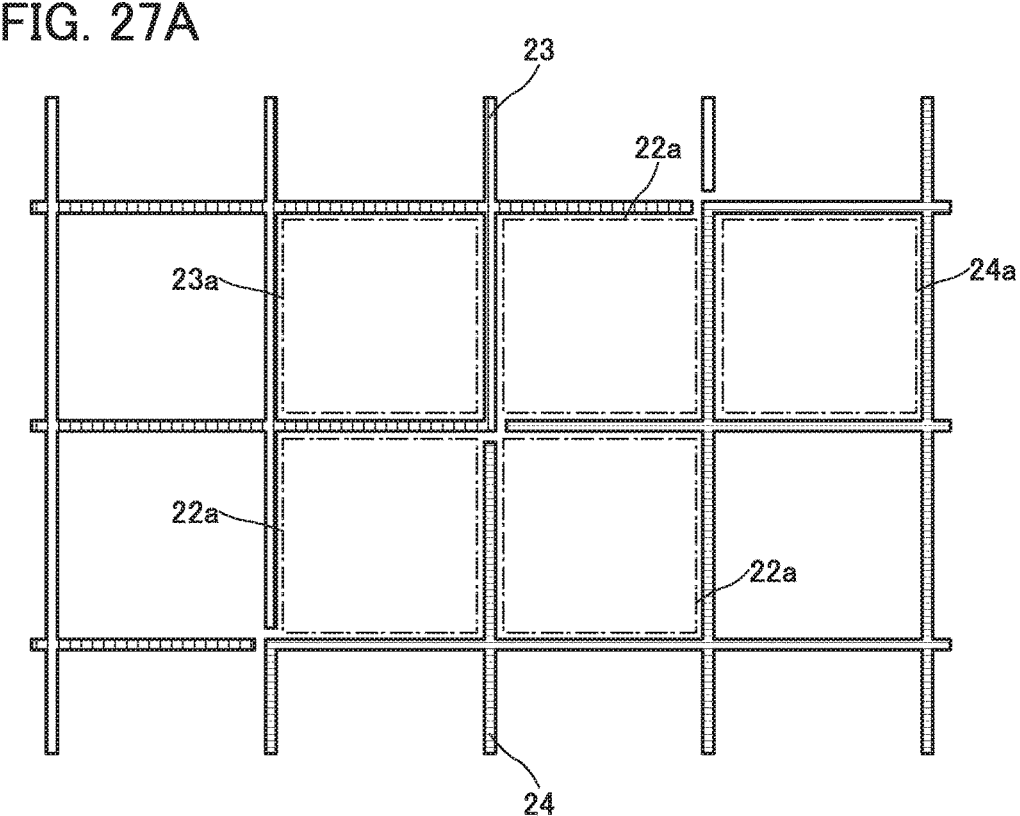
FIGS. 27A and 27B show a structure example of a touch sensor of an embodiment.

FIG. 27A is an enlarged schematic top view of a boundary portion between the conductive layer 23 and the conductive layer 24.

Each of the conductive layers 23 and 24 preferably has a lattice shape or a mesh shape. That is, each of the conductive layers 23 and 24 preferably has a plurality of openings (an opening 23a and an opening 24a). When the opening and the pixel are provided to overlap with each other as described later, light emitted from the display element in the pixel is not blocked by the conductive layer 23 and the conductive layer 24, or a reduction in the luminance of light due to the transmission through the conductive layer 23 and the conductive layer 24 does not occur. As a result, the touch sensor 22 can be used in the touch panel without a reduction in the aperture ratio of the pixel and the light extraction efficiency. It is preferable that the conductive layer 25 similarly have a shape not overlapping with the pixel.

As shown in FIG. 27A, an opening 22a surrounded by part of the conductive layer 23 and part of the conductive layer 24 may be formed in the boundary portion. Such a structure can significantly reduce the distance between the conductive layer 23 and the conductive layer 24 and can increase capacitance therebetween. In particular, in the case of using a mutual capacitive type, the distance between the two conductive layers is preferably reduced to increase electric field intensity between the conductive layer 23 and the conductive layer 24.

Figure 27B:
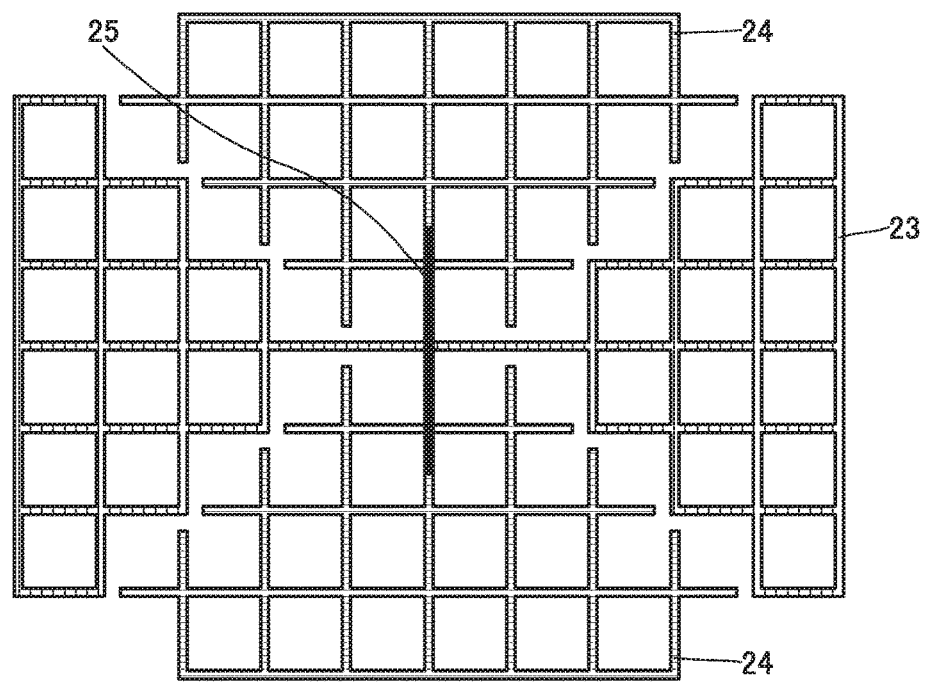

FIG. 27B is an enlarged schematic top view of an intersection of the conductive layers 23 and 24. An example where the two adjacent conductive layers 24 are electrically connected to each other with the conductive layer 25 is shown here. Although not illustrated in the drawing, the insulating layer 121 is provided between the conductive layer 25 and the conductive layers 23 and 24. The conductive layers 24 and 25 are electrically connected to each other through openings provided in the insulating layer 121. The conductive layers 23 and 25 partly overlap with each other with the insulating layer 121 provided therebetween.

[Arrangement Example of Opening of Conductive Layer and Pixel]

FIGS. 28A to 28G are schematic views each showing the positional relationships between a pixel, sub-pixels included in the pixel, and the conductive layer 23 which are seen from the display surface side. Note that although the conductive layer 23 is shown in FIGS. 28A to 28G as an example, the same applies to the conductive layer 24 and the conductive layer 25.

Figure 28A:
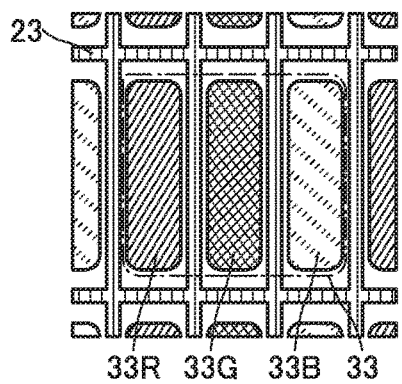
FIGS. 28A to 28G show structure examples of a touch panel of an embodiment.

In the example shown in FIG. 28A, the pixel 33 includes a sub-pixel 33R, a sub-pixel 33G, and a sub-pixel 33B. For example, the sub-pixel 33R, the sub-pixel 33G, and the sub-pixel 33B have a function of expressing red color, green color, and blue color, respectively. Note that the number and the colors of the sub-pixels included in the pixel 33 are not limited thereto.

The sub-pixels included in the pixel 33 each have a display element. The above-described transmissive liquid crystal element can be used as the display element. Besides the transmissive liquid crystal element, examples of the display element include light-emitting elements such as organic EL elements; reflective or semi-transmissive liquid crystal elements; display elements (electronic ink) that perform display by an electrophoretic method, an electronic liquid powder (registered trademark) method, or the like; MEMS shutter display elements; and optical interference type MEMS display elements. The sub-pixel may have a transistor, a capacitor, a wiring that electrically connects the transistor and the capacitor, and the like in addition to the display element.

In the structure shown in FIG. 28A, each of a plurality of openings in the conductive layer 23 is provided to overlap with any one of the three sub-pixels, i.e., the sub-pixel 33R, the sub-pixel 33G, and the sub-pixel 33B. In this manner, the opening in the conductive layer 23 is preferably provided to overlap with one sub-pixel.

Figure 28B:
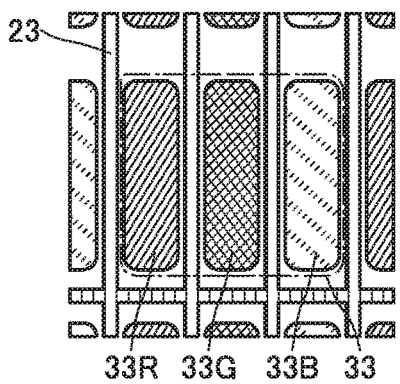

FIG. 28B illustrates a structure where the conductive layer 23 is provided between two adjacent sub-pixels exhibiting different colors. Since color mixture does not occur between two adjacent sub-pixels exhibiting the same color, a structure including a portion where the conductive layer 23 is not provided therebetween as illustrated in FIG. 28B may be employed.

Figure 28C:
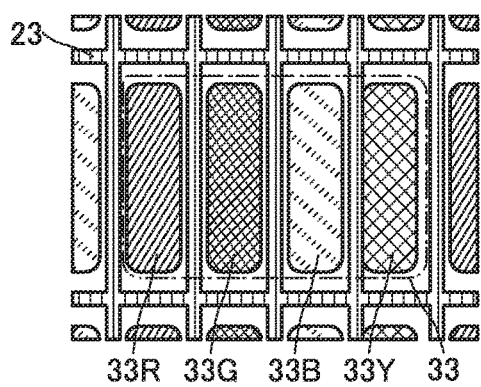
Figure 28D:
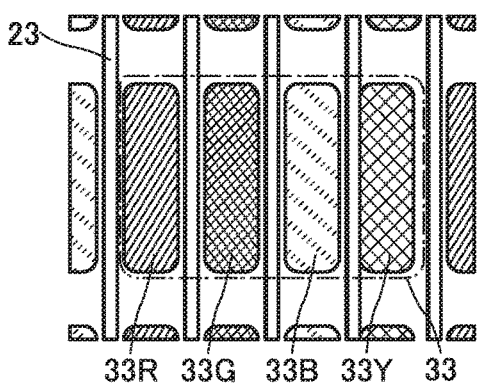

FIGS. 28C and 28D each show an example where the pixel 33 further includes a sub-pixel 33Y in the structure shown in FIGS. 28A and 28B. For example, a pixel capable of expressing yellow color can be used for the sub-pixel 33Y. Instead of the sub-pixel 33Y, a pixel capable of expressing white color may be used. When the pixel 33 includes sub-pixels of more than three colors, power consumption can be reduced.

Figure 28E:
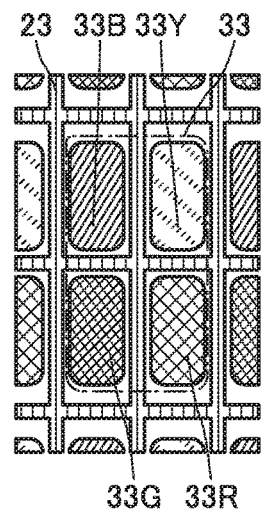

In the examples shown in FIGS. 28A to 28D, sub-pixels of each color are arranged in a stripe pattern. Alternatively, as shown in FIG. 28E, sub-pixels of two colors may be alternated in one direction, for example.

Furthermore, the sub-pixels included in the pixel 33 may differ in size (e.g., the area of a region contributing to display). For example, the size of the sub-pixel of blue color with a relatively low luminosity factor can be set large, whereas the size of the sub-pixel of green or red color with a relatively high luminosity factor can be set small.

Figure 28F:
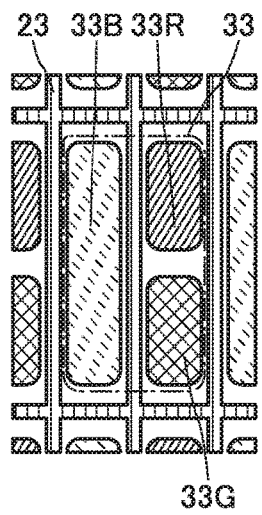
Figure 28G:
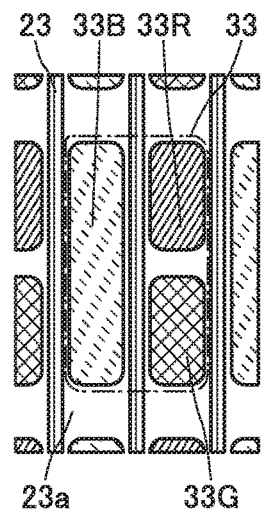
Figure 29A:
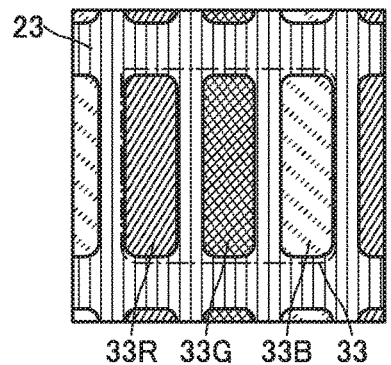
FIGS. 29A to 29G show structure examples of a touch panel of an embodiment.
Figure 29B:
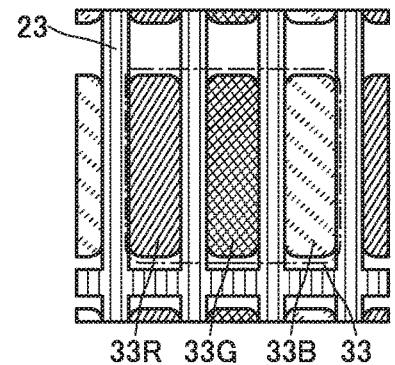
Figure 29C:
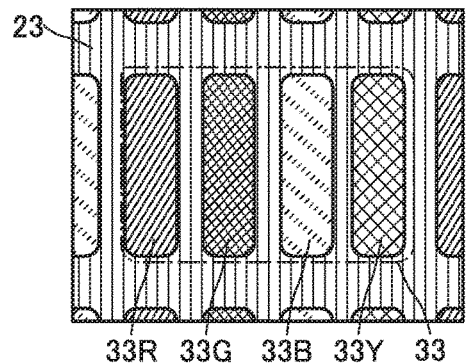
Figure 29D:
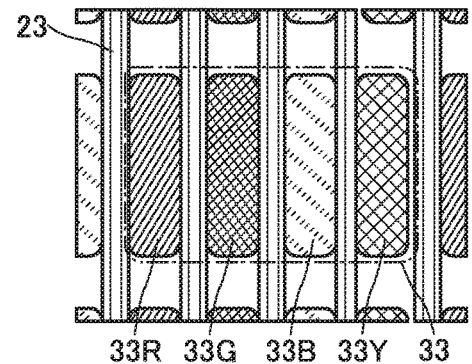
Figure 29E:
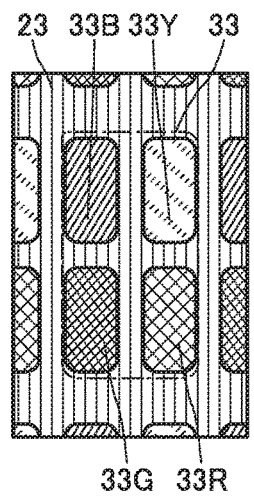
Figure 29F:
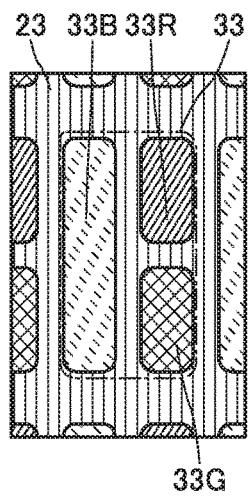
Figure 29G:
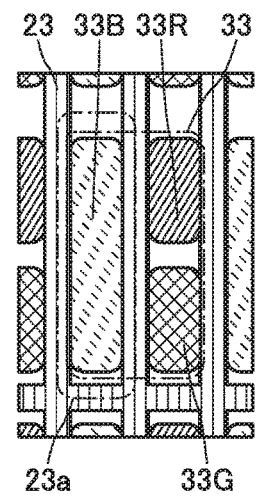

FIGS. 28F and 28G each show an example where the size of the sub-pixel 33B is larger than the size of the sub-pixel 33R and the size of the sub-pixel 33G. In the examples shown here, the sub-pixel 33R and the sub-pixel 33G are alternated. However, sub-pixels of each color may be arranged in a stripe pattern as shown in FIG. 28A and other drawings, and may have different sizes from each other.

Note that although the positional relationships between the conductive layer 23 and the sub-pixels are described here, the same applies to the conductive layer 24 and the conductive layer 25. That is, in the touch panel of one embodiment of the present invention, the opening 23a in the conductive layer 23 overlaps with one or more sub-pixels in a region and the opening 24a in the conductive layer 24 overlaps with one or more of the other sub-pixels in a region. Since each sub-pixel includes the display element as described above, it can be said that the opening 23a and the opening 24a each have a region overlapping with one or more display elements.

As shown in FIGS. 29A to 29G, there may be no gap between the conductive layer 23 and each sub-pixel in a plan view. In the case where the conductive layer 23 and the like function as light-blocking layers, such arrangement can prevent light leakage from the sub-pixels, which is preferable. For example, the conductive layer 23 is provided to overlap with an end portion of the coloring layer of a sub-pixel or an end portion of a pixel electrode; thus, the conductive layer 23 can be provided so that such a gap is not formed. Furthermore, with such a structure, a surface area of the conductive layer 23 can be increased, so that wiring resistance of the conductive layer 23 can be reduced and the detection sensitivity can be increased.

At least part of this embodiment can be implemented in combination with any of the other embodiments described in this specification as appropriate.

Embodiment 2

In this embodiment, examples of a driving method of an input device or an input/output device of one embodiment of the present invention are described with reference to drawings.

[Example of Sensing Method of Sensor]

Figure 30A:
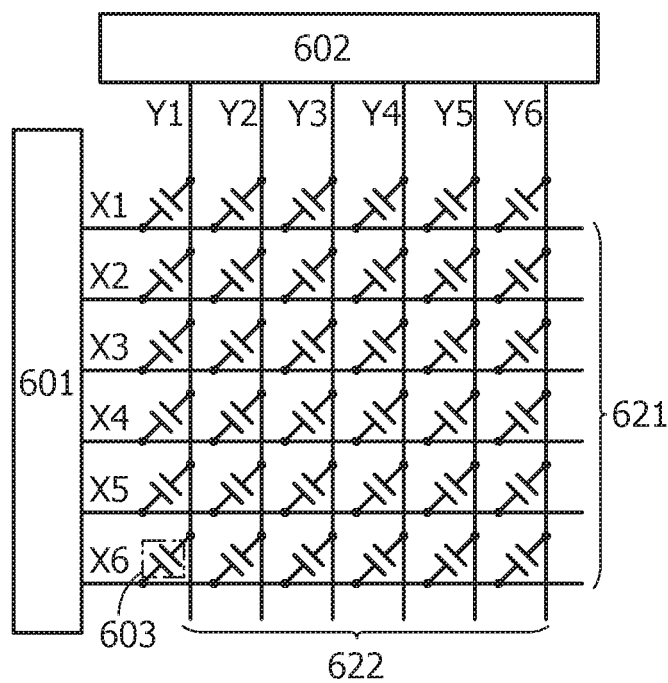
FIGS. 30A and 30B are a circuit diagram and a timing chart of a touch sensor of an embodiment.

FIG. 30A is a block diagram illustrating the structure of a mutual capacitive touch sensor. FIG. 30A illustrates a pulse voltage output circuit 601 and a current sensing circuit 602. Note that in FIG. 30A, six wirings X1 to X6 represent electrodes 621 to which a pulse voltage is applied, and six wirings Y1 to Y6 represent electrodes 622 that sense changes in current. The number of such electrodes is not limited to those illustrated in this example. FIG. 30A also illustrates a capacitor 603 that is formed with the electrodes 621 and 622 overlapping with each other or being provided close to each other. Note that functional replacement between the electrodes 621 and 622 is possible.

The pulse voltage output circuit 601 is, for example, a circuit for sequentially applying a pulse voltage to the wirings X1 to X6. By application of a pulse voltage to the wirings X1 to X6, an electric field is generated between the electrodes 621 and 622 of the capacitor 603, and current flows through the capacitor 603. An electric field generated between the electrodes 621 and 622 is changed by being blocked, for example, when a finger or a stylus touches the touch sensor. That is, for example, by touch with a finger or a stylus, the capacitance of the capacitor 603 is changed. The approach or contact of an object can be sensed by utilizing this change.

The current sensing circuit 602 is a circuit for sensing changes in current flowing through the wirings Y1 to Y6 that are caused by the changes in capacitance of the capacitors 603. No change in the current values of the wirings Y1 to Y6 is sensed when there is no approach or contact of an object, whereas a decrease in the current value is sensed when capacitance is decreased owing to the approach or contact of an object. In order to sense a change in current, the total amount of current may be sensed. In that case, an integrator circuit or the like may be used to sense the total amount of current. Alternatively, the peak value of current may be sensed. In that case, current may be converted into voltage, and the peak value of voltage may be sensed.

Figure 30B:
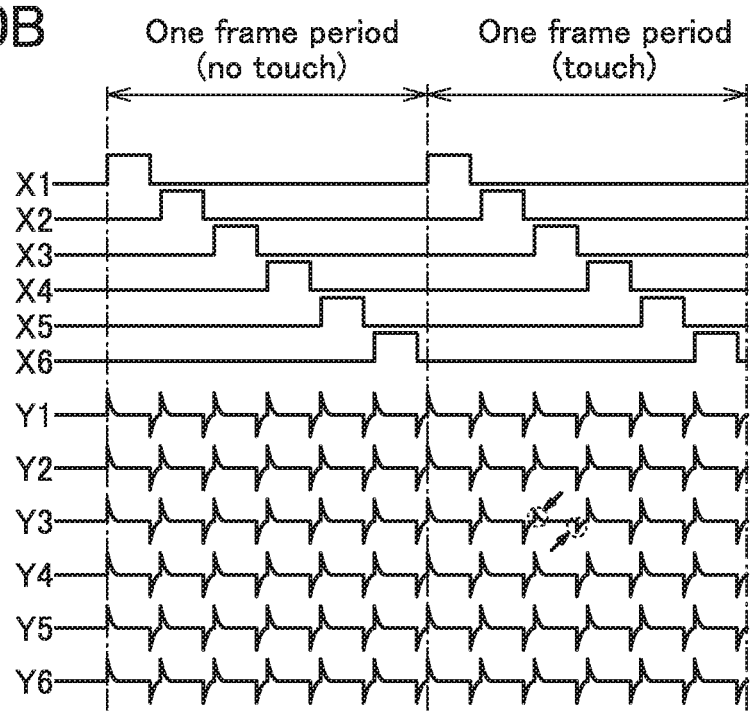

FIG. 30B is a timing chart showing input and output waveforms in the mutual capacitive touch sensor illustrated in FIG. 30A. In FIG. 30B, detection of an object is performed in all the rows and columns in one frame period. FIG. 30B shows a period when an object is not detected (not touched) and a period when an object is detected (touched). Sensed current values of the wirings Y1 to Y6 are shown as waveforms of voltage values. Note that a display panel performs display operation. The timing of the display operation in the display panel is preferably in synchronization with the timing of the sensing operation in the touch sensor. FIG. 30B shows an example in which these timings are not in synchronization.

A pulse voltage is sequentially applied to the wirings X1 to X6, and waveforms of the wirings Y1 to Y6 change in accordance with the pulse voltage. When there is no proximity or contact of an object, the waveforms of the wirings Y1 to Y6 change in accordance with changes in the voltages of the wirings X1 to X6. The current value is decreased at the point of approach or contact of the object and accordingly the waveform of the voltage value changes.

By sensing a capacitance change in this manner, the approach or contact of an object can be sensed. Even when an object such as a finger or a stylus does not touch but only approaches a touch sensor or a touch panel, a signal may be sensed in some cases.

It is preferable that, as an example, the pulse voltage output circuit 601 and the current sensing circuit 602 be formed in one IC chip. For example, the IC is preferably mounted on a touch panel or a substrate in a housing of an electronic device. In the case where the touch panel has flexibility, parasitic capacitance might be increased in a bent portion of the touch panel, and the influence of noise might be increased. In view of this, it is preferable to use an IC to which a driving method less influenced by noise is applied. For example, it is preferable to use an IC to which a driving method capable of increasing a signal-noise ratio (S/N ratio) is applied.

[Structure Example of in-Cell Touch Panel]

Although the examples where the electrodes in the touch sensor are formed over a substrate different from a substrate where the display element and the like are provided are described above, one or both of the two electrodes in the touch sensor may be formed over the substrate where the display element and the like are provided.

A structure example of a touch panel incorporating the touch sensor into a display portion including a plurality of pixels (i.e., an in-cell touch panel) is described below. Here, an example where a liquid crystal element is used as a display element provided in the pixel is shown. However, one embodiment of the present invention is not limited thereto, and any of various display elements can be used.

Figure 31A:
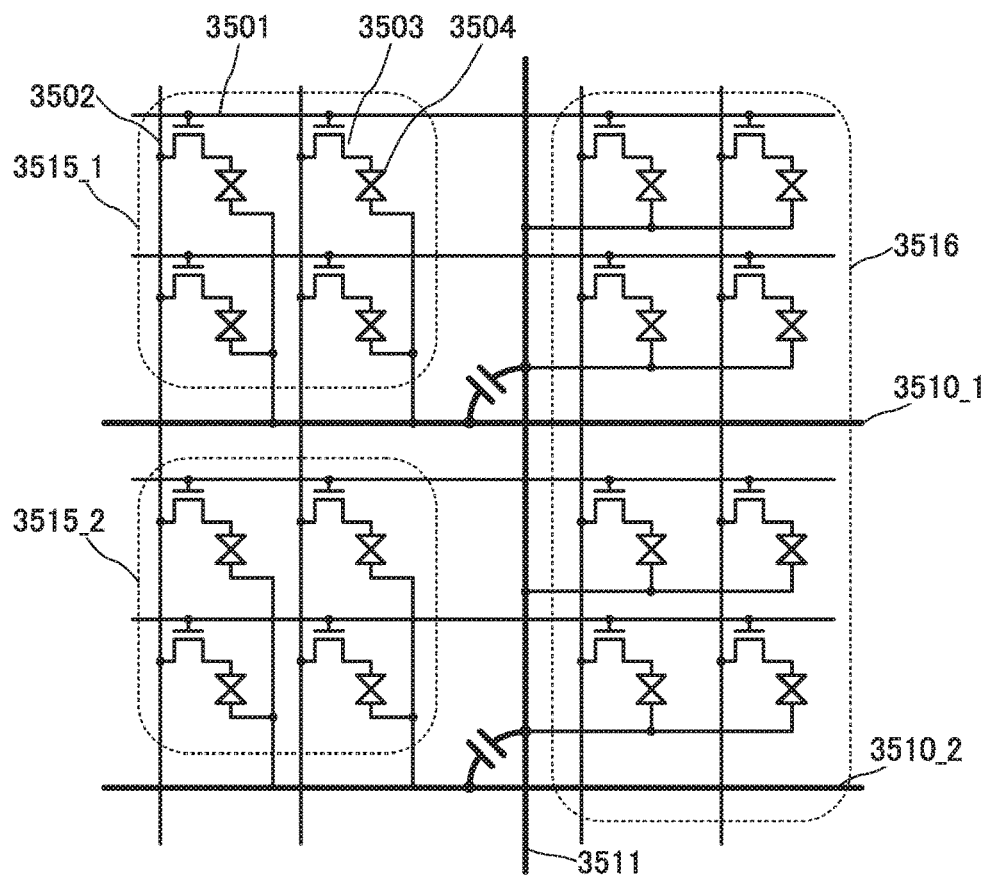
FIGS. 31A and 31B illustrate pixels provided with a touch sensor of an embodiment.

FIG. 31A is an equivalent circuit diagram of part of a pixel circuit provided in the display portion of the touch panel in this structure example.

Each pixel includes at least a transistor 3503 and a liquid crystal element 3504.

Each pixel further includes a storage capacitor in some cases. In addition, a gate of the transistor 3503 is electrically connected to a wiring 3501, and one of a source and a drain of the transistor 3503 is electrically connected to a wiring 3502.

The pixel circuit includes a plurality of wirings extending in the X direction (e.g., a wiring 3510_1 and a wiring 3510_2) and a plurality of wirings extending in the Y direction (e.g., a wiring 3511). These wirings are provided to intersect with each other and are capacitively coupled.

Figure 31B:
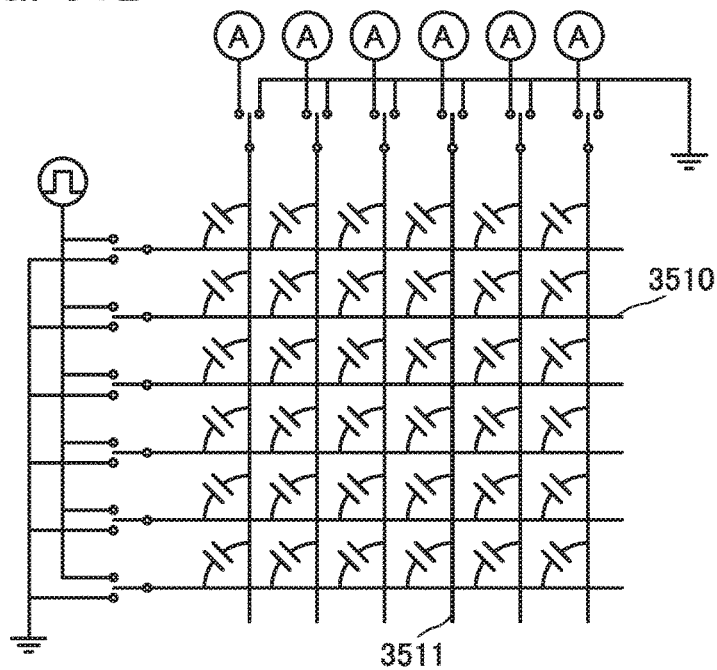

Among the pixels provided in the pixel circuit, electrodes on one side of the liquid crystal elements of some pixels adjacent to each other are electrically connected to each other to form one block. The block is classified into two types: an island-shaped block (e.g., a block 3515_1 or a block 3515_2) and a linear block (e.g., a block 3516) extending in the Y direction. Note that only part of the pixel circuit is illustrated in FIGS. 31A and 31B, but actually, these two kinds of blocks are repeatedly arranged in the X direction and the Y direction. An electrode on one side of the liquid crystal element is a common electrode or a counter electrode, for example. An electrode on the other side of the liquid crystal element is, for example, a pixel electrode.

The wiring 3510_1 (or the wiring 3510_2) extending in the X direction is electrically connected to the island-shaped block 3515_1 (or the block 3515_2). Although not illustrated, the wiring 3510_1 extending in the X direction is electrically connected to a plurality of island-shaped blocks 3515_1 which are provided discontinuously along the X direction with the linear blocks therebetween. Furthermore, the wiring 3511 extending in the Y direction is electrically connected to the linear block 3516.

FIG. 31B is an equivalent circuit diagram illustrating the connection between a plurality of wirings 3510 extending in the X direction and the plurality of wirings 3511 extending in the Y direction. An example of using a projected mutual-capacitive type is described here. An input voltage or a common potential can be input to each of the wirings 3510 extending in the X direction. Furthermore, a ground potential (reference potential) can be input to each of the wirings 3511 extending in the Y direction, or the wirings 3511 can be electrically connected to the sensing circuit. Note that the wirings 3510 and the wirings 3511 can be interchanged with each other.

An example of an operation method of the above-described touch panel is described with reference to FIGS. 32A and 32B.

Here, one frame period is divided into a writing period and a sensing period. The writing period is a period in which image data is written to a pixel, and the wirings 3501 (also referred to as gate lines or scan lines) are sequentially selected. On the other hand, the sensing period is a period in which sensing is performed by a touch sensor, and the wirings 3510 extending in the X direction are sequentially selected and an input voltage is input.

Figure 32A:
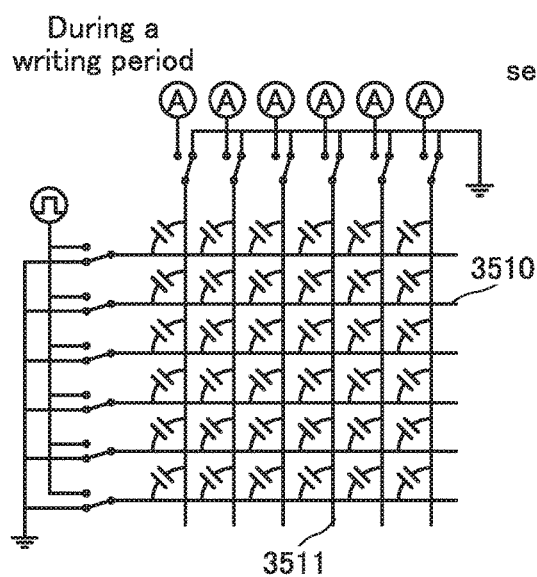
FIGS. 32A and 32B illustrate operations of a touch sensor and pixels of an embodiment.

FIG. 32A is an equivalent circuit diagram in the writing period. In the writing period, a common potential is input to both the wiring 3510 extending in the X direction and the wiring 3511 extending in the Y direction.

Figure 32B:
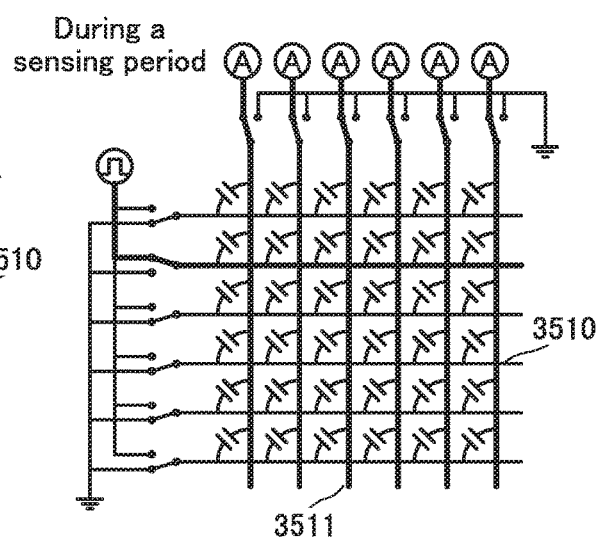

FIG. 32B is an equivalent circuit diagram at a certain point of time in the sensing period. In the sensing period, each of the wirings 3511 extending in the Y direction is electrically connected to the sensing circuit. An input voltage is input to the wirings 3510 extending in the X direction which are selected, and a common potential is input to the wirings 3510 extending in the X direction which are not selected.

Note that the driving method described here can be applied to not only an in-cell touch panel but also the above-described touch panels.

It is preferable that a period in which an image is written and a period in which sensing is performed by a touch sensor be separately provided as described above. Thus, a decrease in sensitivity of the touch sensor caused by noise generated when data is written to a pixel can be suppressed.

At least part of this embodiment can be implemented in combination with any of the other embodiments described in this specification as appropriate.

Embodiment 3

In this embodiment, an example of a transistor which can be used as the transistor 201 and the transistor 202 (and the transistor 301, the transistor 302, the transistor 401, and the transistor 402) described in the above embodiments will be described with reference to drawings.

The touch panel module 10 of one embodiment of the present invention can be fabricated by using a transistor with any of various transistors, such as a bottom-gate transistor or a top-gate transistor. Therefore, a material for a semiconductor layer or the structure of a transistor can be easily changed depending on the existing production line.

[Bottom-Gate Transistor]

FIG. 33A1 is a cross-sectional view of a transistor 810 that is a channel-protective transistor, which is a type of bottom-gate transistor. In FIG. 33A1, the transistor 810 is formed over a substrate 771. The transistor 810 includes an electrode 746 over the substrate 771 with an insulating layer 772 provided therebetween. The transistor 810 includes a semiconductor layer 742 over the electrode 746 with an insulating layer 726 provided therebetween. The electrode 746 can function as a gate electrode. The insulating layer 726 can function as a gate insulating layer.

The transistor 810 includes an insulating layer 741 over a channel formation region in the semiconductor layer 742. The transistor 810 includes an electrode 744a and an electrode 744b which are partly in contact with the semiconductor layer 742 and over the insulating layer 726. The electrode 744a can function as one of a source electrode and a drain electrode. The electrode 744b can function as the other of the source electrode and the drain electrode. Part of the electrode 744a and part of the electrode 744b are formed over the insulating layer 741.

The insulating layer 741 can function as a channel protective layer. With the insulating layer 741 provided over the channel formation region, the semiconductor layer 742 can be prevented from being exposed at the time of forming the electrodes 744a and 744b. Thus, the channel formation region in the semiconductor layer 742 can be prevented from being etched at the time of forming the electrodes 744a and 744b. In accordance with one embodiment of the present invention, a transistor with favorable electrical characteristics can be provided.

The transistor 810 includes an insulating layer 728 over the electrode 744a, the electrode 744b, and the insulating layer 741 and further includes an insulating layer 729 over the insulating layer 728.

The electrode, the semiconductor layer, the insulating layer, and the like used in the transistor disclosed in this embodiment can be formed using a material and a method disclosed in any of the other embodiments.

In the case where an oxide semiconductor is used for the semiconductor layer 742, a material capable of removing oxygen from part of the semiconductor layer 742 to generate oxygen vacancies is preferably used for regions of the electrodes 744a and 744b that are in contact with at least the semiconductor layer 742. The carrier concentration in the regions of the semiconductor layer 742 where oxygen vacancies are generated is increased, so that the regions become n-type regions (n$^+$ layers). Accordingly, the regions can function as a source region and a drain region. When an oxide semiconductor is used for the semiconductor layer 742, examples of the material capable of removing oxygen from the semiconductor layer 742 to generate oxygen vacancies include tungsten and titanium.

Formation of the source region and the drain region in the semiconductor layer 742 makes it possible to reduce contact resistance between the semiconductor layer 742 and each of the electrodes 744a and 744b. Accordingly, the electric characteristics of the transistor, such as the field-effect mobility and the threshold voltage, can be favorable.

In the case where a semiconductor such as silicon is used for the semiconductor layer 742, a layer that functions as an n-type semiconductor or a p-type semiconductor is preferably provided between the semiconductor layer 742 and the electrode 744a and between the semiconductor layer 742 and the electrode 744b. The layer that functions as an n-type semiconductor or a p-type semiconductor can function as the source region or the drain region in the transistor.

The insulating layer 729 is preferably formed using a material that can prevent or reduce diffusion of impurities into the transistor from the outside. The formation of the insulating layer 729 may also be omitted.

When an oxide semiconductor is used for the semiconductor layer 742, heat treatment may be performed before and/or after the insulating layer 729 is formed. The heat treatment can fill oxygen vacancies in the semiconductor layer 742 by diffusing oxygen contained in the insulating layer 729 or other insulating layers into the semiconductor layer 742. Alternatively, the insulating layer 729 may be formed while the heat treatment is performed, so that oxygen vacancies in the semiconductor layer 742 can be filled.

Note that a CVD method can be generally classified into a plasma enhanced CVD (PECVD) method using plasma, a thermal CVD (TCVD) method using heat, and the like. A CVD method can be further classified into a metal CVD (MCVD) method, a metal organic CVD (MOCVD) method, and the like according to a source gas to be used.

Furthermore, an evaporation method can be generally classified into a resistance heating evaporation method, an electron beam evaporation method, a molecular beam epitaxy (MBE) method, a pulsed laser deposition (PLD) method, an ion beam assisted deposition (IBAD) method, an atomic layer deposition (ALD) method, and the like.

By using a PECVD method, a high-quality film can be formed at a relatively low temperature. By using a deposition method that does not use plasma for deposition, such as an MOCVD method or an evaporation method, a film with few defects can be formed because damage is not easily caused on a surface on which the film is deposited.

A sputtering method is generally classified into a DC sputtering method, a magnetron sputtering method, an RF sputtering method, an ion beam sputtering method, an electron cyclotron resonance (ECR) sputtering method, a facing-target sputtering method, and the like.

In a facing-target sputtering method, plasma is confined between targets; thus, plasma damage to a substrate can be reduced. Furthermore, step coverage can be improved because the incident angle of a sputtered particle to a substrate can be made smaller depending on the inclination of a target.

A transistor 811 illustrated in FIG. 33A2 is different from the transistor 810 in that an electrode 723 that can function as a back gate electrode is provided over the insulating layer 729. The electrode 723 can be formed using a material and a method similar to those of the electrode 746.

In general, a back gate electrode is formed using a conductive layer and positioned so that a channel formation region of a semiconductor layer is positioned between a gate electrode and the back gate electrode. Thus, the back gate electrode can function in a manner similar to that of the gate electrode. The potential of the back gate electrode may be the same as that of the gate electrode or may be a ground (GND) potential or a predetermined potential. By changing the potential of the back gate electrode independently of the potential of the gate electrode, the threshold voltage of the transistor can be changed.

The electrode 746 and the electrode 723 can each function as a gate electrode. Thus, the insulating layers 726, 728, and 729 can each function as a gate insulating layer. The electrode 723 may also be provided between the insulating layers 728 and 729.

In the case where one of the electrode 746 and the electrode 723 is simply referred to as a "gate electrode", the other can be referred to as a "back gate electrode". For example, in the transistor 811, in the case where the electrode 723 is referred to as a "gate electrode", the electrode 746 is referred to as a "back gate electrode". In the case where the electrode 723 is used as a "gate electrode", the transistor 811 is a kind of top-gate transistor. Alternatively, one of the electrode 746 and the electrode 723 may be referred to as a "first gate electrode", and the other may be referred to as a "second gate electrode".

By providing the electrode 746 and the electrode 723 with the semiconductor layer 742 provided therebetween and setting the potentials of the electrode 746 and the electrode 723 to be the same, a region of the semiconductor layer 742 through which carriers flow is enlarged in the film thickness direction; thus, the number of transferred carriers is increased. As a result, the on-state current and field-effect mobility of the transistor 811 are increased.

Therefore, the transistor 811 has a comparatively high on-state current for its area. That is, the area of the transistor 811 can be small for a required on-state current. In accordance with one embodiment of the present invention, the area of a transistor can be reduced. Therefore, in accordance with one embodiment of the present invention, a semiconductor device having a high degree of integration can be provided.

The gate electrode and the back gate electrode are formed using conductive layers and thus each have a function of preventing an electric field generated outside the transistor from influencing the semiconductor layer in which the channel is formed (in particular, an electric field blocking function against static electricity and the like). When the back gate electrode is formed larger than the semiconductor layer such that the semiconductor layer is covered with the back gate electrode, the electric field blocking function can be enhanced.

Since the electrode 746 and the electrode 723 each have a function of blocking an electric field generated outside, electric charge of charged particles and the like generated on the insulating layer 772 side or above the electrode 723 do not influence the channel formation region in the semiconductor layer 742. Thus, degradation by a stress test (e.g., a negative gate bias temperature (−GBT) stress test in which negative electric charge is applied to a gate) can be reduced. Furthermore, a change in gate voltage (rising voltage) at which on-state current starts flowing depending on drain voltage can be reduced. Note that this effect is obtained when the electrodes 746 and 723 have the same potential or different potentials.

The BT stress test is one kind of acceleration test and can evaluate, in a short time, a change by long-term use (i.e., a change over time) in characteristics of a transistor. In particular, the amount of change in threshold voltage of a transistor before and after the BT stress test is an important indicator when examining the reliability of the transistor. As the change in the threshold voltage is smaller, the transistor has higher reliability.

By providing the electrodes 746 and 723 and setting the potentials of the electrodes 746 and 723 to be the same, the amount of change in threshold voltage is reduced. Accordingly, variations in electrical characteristics among a plurality of transistors are also reduced.

A transistor including a back gate electrode has a smaller change in threshold voltage before and after a positive GBT stress test, in which positive electric charge is applied to a gate, than a transistor including no back gate electrode.

When the back gate electrode is formed using a light-blocking conductive film, light can be prevented from entering the semiconductor layer from the back gate electrode side. Therefore, photodegradation of the semiconductor layer can be prevented, and deterioration in electrical characteristics of the transistor, such as a shift of the threshold voltage, can be prevented.

In accordance with one embodiment of the present invention, a transistor with high reliability can be provided. Moreover, a semiconductor device with high reliability can be provided.

FIG. 33B1 is a cross-sectional view of a channel-protective transistor 820 that is a type of bottom-gate transistor. The transistor 820 has substantially the same structure as the transistor 810 but is different from the transistor 810 in that the insulating layer 741 covers the semiconductor layer 742. The semiconductor layer 742 is electrically connected to the electrode 744a through an opening formed by selectively removing part of the insulating layer 741 which overlaps with the semiconductor layer 742. The semiconductor layer 742 is electrically connected to the electrode 744b through another opening formed by selectively removing part of the insulating layer 741 which overlaps with the semiconductor layer 742. A region of the insulating layer 741 which overlaps with the channel formation region can function as a channel protective layer.

A transistor 821 illustrated in FIG. 33B2 is different from the transistor 820 in that the electrode 723 that can function as a back gate electrode is provided over the insulating layer 729.

With the insulating layer 741, the semiconductor layer 742 can be prevented from being exposed at the time of forming the electrodes 744a and 744b. Thus, the semiconductor layer 742 can be prevented from being reduced in thickness at the time of forming the electrodes 744a and 744b.

The length between the electrode 744a and the electrode 746 and the length between the electrode 744b and the electrode 746 in the transistors 820 and 821 are larger than those in the transistors 810 and 811. Thus, the parasitic capacitance generated between the electrode 744a and the electrode 746 can be reduced. Moreover, the parasitic capacitance generated between the electrode 744b and the electrode 746 can be reduced. In accordance with one embodiment of the present invention, a transistor with favorable electrical characteristics can be provided.

A transistor 825 illustrated in FIG. 33C1 is a channel-etched transistor that is a type of bottom-gate transistor. In the transistor 825, the electrodes 744a and 744b are formed without providing the insulating layer 741. Thus, part of the semiconductor layer 742 that is exposed at the time forming the electrodes 744a and 744b is etched in some cases. However, since the insulating layer 741 is not provided, the productivity of the transistor can be increased.

A transistor 826 illustrated in FIG. 33C2 is different from the transistor 825 in that the electrode 723 which can function as a back gate electrode is provided over the insulating layer 729.

[Top-Gate Transistor]

FIG. 34A1 is a cross-sectional view of a transistor 830 that is a type of top-gate transistor. The transistor 830 includes the semiconductor layer 742 over the insulating layer 772, the electrodes 744a and 744b that are over the semiconductor layer 742 and the insulating layer 772 and in contact with part of the semiconductor layer 742, the insulating layer 726 over the semiconductor layer 742 and the electrodes 744a and 744b, and the electrode 746 over the insulating layer 726.

Since the electrode 746 overlaps with neither the electrode 744a nor the electrode 744b in the transistor 830, the parasitic capacitance generated between the electrodes 746 and 744a and the parasitic capacitance generated between the electrodes 746 and 744b can be reduced. After the formation of the electrode 746, an impurity 755 is introduced into the semiconductor layer 742 using the electrode 746 as a mask, so that an impurity region can be formed in the semiconductor layer 742 in a self-aligned manner (see FIG. 34A3). In accordance with one embodiment of the present invention, a transistor with favorable electrical characteristics can be provided.

The introduction of the impurity 755 can be performed with an ion implantation apparatus, an ion doping apparatus, or a plasma treatment apparatus.

As the impurity 755, for example, at least one kind of element of Group 13 elements and Group 15 elements can be used. In the case where an oxide semiconductor is used for the semiconductor layer 742, it is possible to use at least one kind of element of a rare gas, hydrogen, and nitrogen as the impurity 755.

A transistor 831 illustrated in FIG. 34A2 is different from the transistor 830 in that the electrode 723 and the insulating layer 727 are included. The transistor 831 includes the electrode 723 formed over the insulating layer 772 and the insulating layer 727 formed over the electrode 723. The electrode 723 can function as a back gate electrode. Thus, the insulating layer 727 can function as a gate insulating layer. The insulating layer 727 can be formed using a material and a method similar to those of the insulating layer 726.

Like the transistor 811, the transistor 831 has a high on-state current for its area. That is, the area of the transistor 831 can be small for a required on-state current. In accordance with one embodiment of the present invention, the area of a transistor can be reduced. Therefore, in accordance with one embodiment of the present invention, a semiconductor device having a high degree of integration can be provided.

A transistor 840 illustrated in FIG. 34B1 is a type of top-gate transistor. The transistor 840 is different from the transistor 830 in that the semiconductor layer 742 is formed after the formation of the electrodes 744a and 744b. A transistor 841 illustrated in FIG. 34B2 is different from the transistor 840 in that the electrode 723 and the insulating layer 727 are included. In the transistors 840 and 841, part of the semiconductor layer 742 is formed over the electrode 744a and another part of the semiconductor layer 742 is formed over the electrode 744b.

Like the transistor 811, the transistor 841 has a high on-state current for its area. That is, the area of the transistor 841 can be small for a required on-state current. In accordance with one embodiment of the present invention, the area of a transistor can be reduced. Therefore, in accordance with one embodiment of the present invention, a semiconductor device having a high degree of integration can be provided.

A transistor 842 illustrated in FIG. 35A1 is a type of top-gate transistor. The transistor 842 is different from the transistor 830 or 840 in that the electrodes 744a and 744b are formed after the formation of the insulating layer 729. The electrodes 744a and 744b are electrically connected to the semiconductor layer 742 through openings formed in the insulating layers 728 and 729.

Part of the insulating layer 726 that does not overlap with the electrode 746 is removed, and the impurity 755 is introduced into the semiconductor layer 742 using the electrode 746 and the insulating layer 726 that is left as a mask, so that an impurity region can be formed in the semiconductor layer 742 in a self-aligned manner (see FIG. 35A3). The transistor 842 includes a region where the insulating layer 726 extends beyond an end portion of the electrode 746. The semiconductor layer 742 in a region into which the impurity 755 is introduced through the insulating layer 726 has a lower impurity concentration than the semiconductor layer 742 in a region into which the impurity 755 is introduced without through the insulating layer 726. Thus, an LDD region is formed in a region adjacent to a portion of the semiconductor layer 742 which overlaps with the electrode 746.

A transistor 843 illustrated in FIG. 35A2 is different from the transistor 842 in that the electrode 723 is included. The transistor 843 includes the electrode 723 that is formed over the substrate 771 and overlaps with the semiconductor layer 742 with the insulating layer 772 provided therebetween. The electrode 723 can function as a back gate electrode.

As in a transistor 844 illustrated in FIG. 35B1 and a transistor 845 illustrated in FIG. 35B2, the insulating layer 726 in a region that does not overlap with the electrode 746 may be completely removed. Alternatively, as in a transistor 846 illustrated in FIG. 35C1 and a transistor 847 illustrated in FIG. 35C2, the insulating layer 726 may be left.

In the transistors 842 to 847, after the formation of the electrode 746, the impurity 755 is introduced into the semiconductor layer 742 using the electrode 746 as a mask, so that an impurity region can be formed in the semiconductor layer 742 in a self-aligned manner. In accordance with one embodiment of the present invention, a transistor with favorable electrical characteristics can be provided. Furthermore, in accordance with one embodiment of the present invention, a semiconductor device having a high degree of integration can be provided.

[S-Channel Transistor]

FIGS. 36A to 36C illustrate an example of the structure of a transistor using an oxide semiconductor for the semiconductor layer 742. In a transistor 850 illustrated in FIGS. 36A to 36C, a semiconductor layer 742b is formed over a semiconductor layer 742a, and a semiconductor layer 742c covers a top surface and a side surface of the semiconductor layer 742b and a side surface of the semiconductor layer 742a. FIG. 36A is a top view of the transistor 850. FIG. 36B is a cross-sectional view (in the channel length direction) taken along the dashed-dotted line X1-X2 in FIG. 36A. FIG. 36C is a cross-sectional view (in the channel width direction) taken along the dashed-dotted line Y1-Y2 in FIG. 36A.

The transistor 850 includes an electrode 743 functioning as a gate electrode. The electrode 743 can be formed using a material and a method similar to those of the electrode 746. The electrode 743 is formed of two conductive layers in this embodiment.

Each of the semiconductor layer 742a, the semiconductor layer 742b, and the semiconductor layer 742c is formed using a material containing either In or Ga or both of them. Typical examples are an In—Ga oxide (an oxide containing In and Ga), an In—Zn oxide (an oxide containing In and Zn), and an In-M-Zn oxide (an oxide containing In, an element M, and Zn). The element M is one or more kinds of elements selected from Al, Ti, Ga, Y, Zr, La, Ce, Nd, and Hf and has a higher strength of bonding with oxygen than that of In.

The semiconductor layer 742a and the semiconductor layer 742c are preferably formed using a material containing one or more kinds of metal elements contained in the semiconductor layer 742b. With the use of such a material, interface states are less likely to be generated at the interface between the semiconductor layer 742a and the semiconductor layer 742b and at the interface between the semiconductor layer 742c and the semiconductor layer 742b. Accordingly, carriers are not likely to be scattered or captured at the interfaces, which results in an improvement in field-effect mobility of the transistor. Furthermore, variation in threshold voltage of the transistor can be reduced. Thus, a semiconductor device having favorable electrical characteristics can be obtained.

Each of the thicknesses of the semiconductor layers 742a and 742c is greater than or equal to 3 nm and less than or equal to 100 nm, preferably greater than or equal to 3 nm and less than or equal to 50 nm. The thickness of the semiconductor layer 742b is greater than or equal to 3 nm and less than or equal to 700 nm, preferably greater than or equal to 3 nm and less than or equal to 100 nm, more preferably greater than or equal to 3 nm and less than or equal to 50 nm.

In the case where the semiconductor layer 742b includes an In-M-Zn oxide and the semiconductor layers 742a and 742c each also include an In-M-Zn oxide, the semiconductor layers 742a and 742c each have the atomic ratio where InM:Zn=$x_1$:$y_1$:$z_1$, and the semiconductor layer 742b has an atomic ratio where InM:Zn=$x_2$:$y_2$:$z_2$, for example. In that case, the compositions of the semiconductor layers 742a, 742c, and 742b can be determined so that $y_1/x_1$ is larger than $y_2/x_2$. It is preferable that the compositions of the semiconductor layers 742a, 742c, and 742b be determined so that $y_1/x_1$ is 1.5 times or more as large as $y_2/x_2$. It is more preferable that the compositions of the semiconductor layers 742a, 742c, and 742b be determined so that $y_1/x_1$ is twice or more as large as $y_2/x_2$. It is more preferable that the compositions of the semiconductor layers 742a, 742c, and 742b be determined so that $y_1/x_1$ is three times or more as large as $y_2/x_2$. It is preferable that $y_1$ be greater than or equal to $x_1$ because the transistor can have stable electrical characteristics. However, when $y_1$ is three times or more as large as $x_1$, the field-effect mobility of the transistor is reduced; accordingly, $y_1$ is preferably smaller than three times $x_1$. When the semiconductor layer 742a and the semiconductor layer 742c have the above compositions, the semiconductor layer 742a and the semiconductor layer 742c can each be a layer in which oxygen vacancies are less likely to be generated than in the semiconductor layer 742b.

In the case where the semiconductor layer 742a and the semiconductor layer 742c each include an In-M-Zn oxide, the percentages of In and the element M when the summation of In and M is assumed to be 100 atomic % are preferably as follows: the percentage of In is lower than 50 atomic % and the percentage of the element M is higher than or equal to 50 atomic %. The percentages of In and the element M are more preferably as follows: the percentage of In is lower than 25 atomic % and the percentage of the element M is higher than or equal to 75 atomic %. In the case where the semiconductor layer 742b includes an In-M-Zn oxide, the percentages of In and the element M when the summation of In and M is assumed to be 100 atomic % are preferably as follows: the percentage of In is higher than or equal to 25 atomic % and the percentage of the element M is lower than 75 atomic %. The percentages of In and the element M are more preferably as follows: the percentage of In is higher than or equal to 34 atomic % and the percentage of the element M is lower than 66 atomic %.

For example, an In—Ga—Zn oxide that is formed using a target having an atomic ratio of In:Ga:Zn=1:3:2, 1:3:4, 1:3:6, 1:6:4, or 1:9:6, an In—Ga oxide that is formed using a target having an atomic ratio of In:Ga=1:9, or gallium oxide can be used for each of the semiconductor layers 742a and 742c containing In or Ga. Furthermore, an In—Ga—Zn oxide that is formed using a target having an atomic ratio of In:Ga:Zn=3:1:2, 1:1:1, 5:5:6, or 4:2:4.1 can be used for the semiconductor layer 742b. Note that the atomic ratio of each of the semiconductor layers 742a, 742b, and 742c may vary within a range of ±20% of any of the above-described atomic ratios as an error.

To give stable electrical characteristics to the transistor including the semiconductor layer 742b, it is preferable that impurities and oxygen vacancies in the semiconductor layer 742b be reduced to obtain a highly purified oxide semiconductor layer and accordingly the semiconductor layer 742b can be regarded as an intrinsic or substantially intrinsic oxide semiconductor layer. Furthermore, it is preferable that at least the channel formation region of the semiconductor layer 742b be regarded as an intrinsic or substantially intrinsic oxide semiconductor layer.

Note that the substantially intrinsic oxide semiconductor layer refers to an oxide semiconductor layer in which the carrier density is higher than or equal to $1\times10^{-9}/cm^3$ and lower than $8\times10^{11}/cm^3$, preferably lower than $1\times10^{11}/cm^3$, more preferably lower than $1\times10^{10}/cm^3$.

Figure 37A:
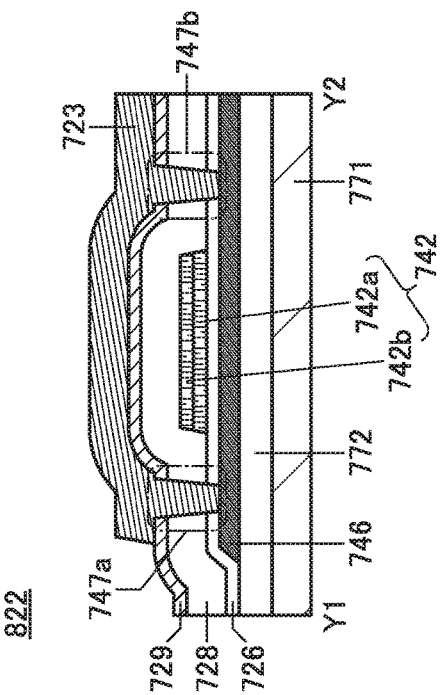
FIGS. 37A to 37C are a plan view and cross-sectional views illustrating one embodiment of a transistor.
Figure 37B:
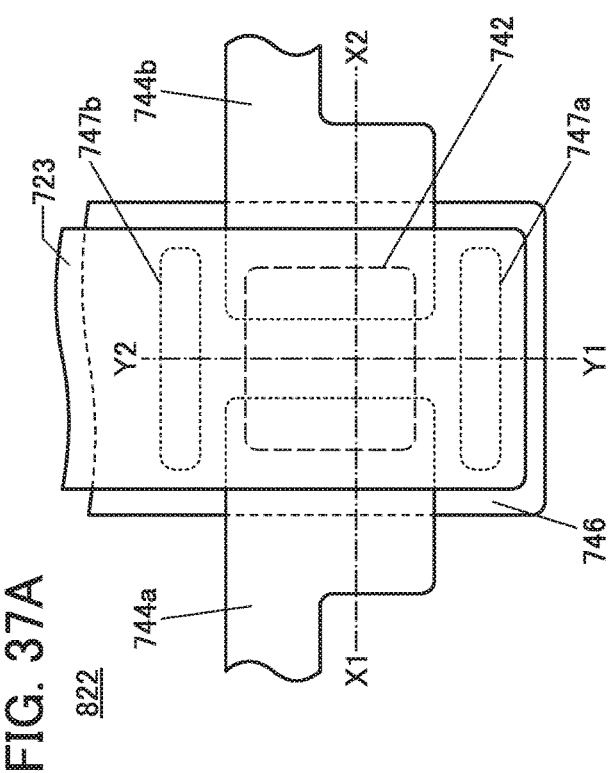
Figure 37C:
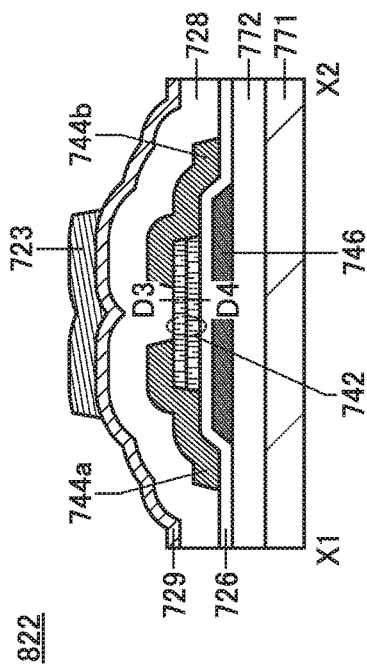

FIGS. 37A to 37C illustrate an example of the structure of a transistor using an oxide semiconductor for the semiconductor layer 742. In a transistor 822 illustrated in FIGS. 37A to 37C, the semiconductor layer 742b is formed over the semiconductor layer 742a. The transistor 822 is a kind of bottom-gate transistor including a back gate electrode. FIG. 37A is a top view of the transistor 822. FIG. 37B is a cross-sectional view (in the channel length direction) taken along the dashed-dotted line X1-X2 in FIG. 37A. FIG. 37C is a cross-sectional view (in the channel width direction) taken along the dashed-dotted line Y1-Y2 in FIG. 37A.

The electrode 723 provided over the insulating layer 729 is electrically connected to the electrode 746 through an opening 747a and an opening 747b provided in the insulating layers 726, 728, and 729. Thus, the same potential is supplied to the electrodes 723 and 746. Furthermore, either or neither of the openings 747a and 747b may be provided. In the case where neither of the openings 747a and 747b is provided, different potentials can be supplied to the electrodes 723 and 746.

[Energy Band Structure of Oxide Semiconductor]

Figure 41A:
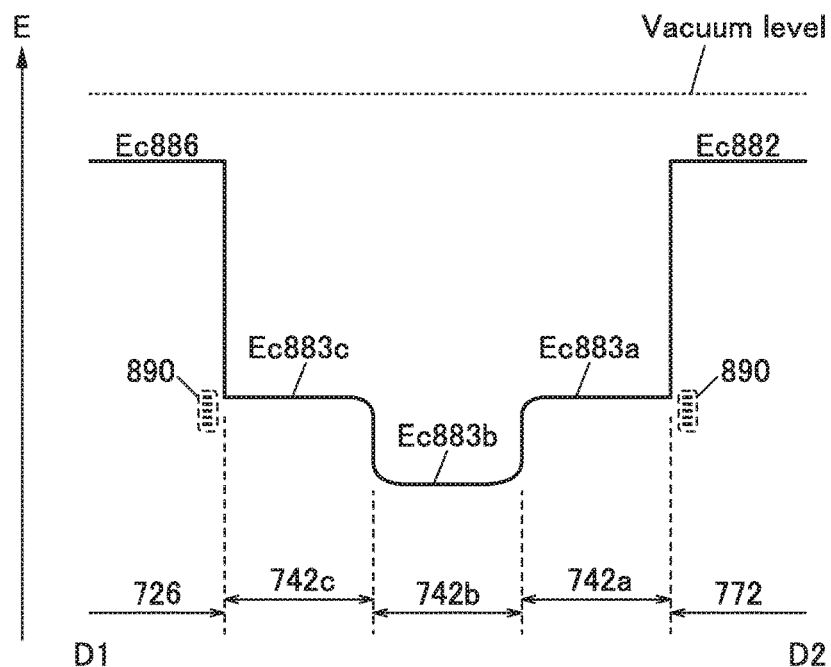
FIGS. 41A and 41B show an energy band structure.
Figure 41B:
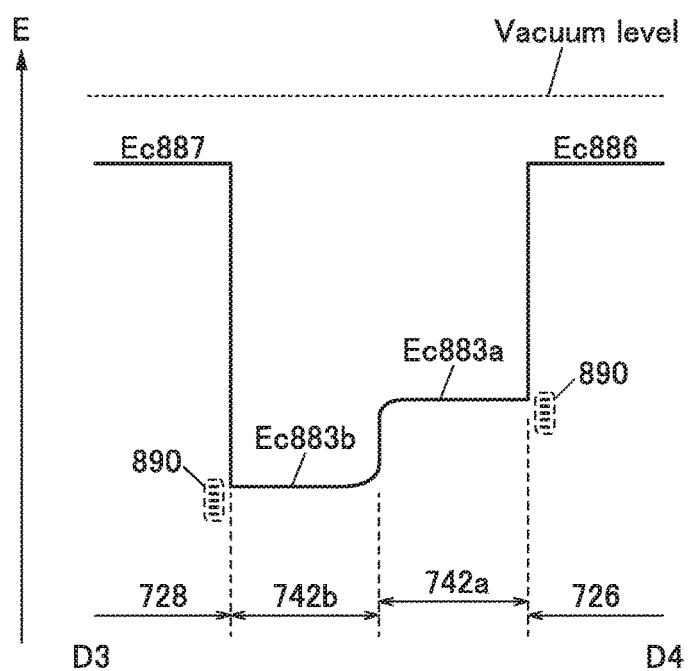

The function and effect of the semiconductor layer 742 that is a stacked layer including the semiconductor layers 742a, 742b, and 742c are described with an energy band structure diagram shown in FIGS. 41A and 41B. FIG. 41A is the energy band structure diagram showing a portion along the dashed-dotted line D1-D2 in FIG. 36B. FIG. 41A illustrates the energy band structure of a channel formation region of the transistor 850.

In FIG. 41A, Ec882, Ec883a, Ec883b, Ec883c, and Ec886 indicate the energy of the conduction band minimum of the insulating layer 772, the semiconductor layer 742a, the semiconductor layer 742b, the semiconductor layer 742c, and the insulating layer 726, respectively.

Here, a difference in energy between the vacuum level and the conduction band minimum (the difference is also referred to as "electron affinity") corresponds to a value obtained by subtracting an energy gap from a difference in energy between the vacuum level and the valence band maximum (the difference is also referred to as an ionization potential). Note that the energy gap can be measured with a spectroscopic ellipsometer (e.g., UT-300 by HORIBA JOBIN YVON S.A.S.). The energy difference between the vacuum level and the valence band maximum can be measured with an ultraviolet photoelectron spectroscopy (UPS) device (e.g., VersaProbe by ULVAC-PHI, Inc.).

Note that an In—Ga—Zn oxide which is formed using a target having an atomic ratio of In:Ga:Zn=1:3:2 has an energy gap of approximately 3.5 eV and an electron affinity of approximately 4.5 eV. An In—Ga—Zn oxide which is formed using a target having an atomic ratio of In:Ga:Zn=1:3:4 has an energy gap of approximately 3.4 eV and an electron affinity of approximately 4.5 eV. An In—Ga—Zn oxide which is formed using a target having an atomic ratio of In:Ga:Zn=1:3:6 has an energy gap of approximately 3.3 eV and an electron affinity of approximately 4.5 eV. An In—Ga—Zn oxide which is formed using a target having an atomic ratio of In:Ga:Zn=1:6:2 has an energy gap of approximately 3.9 eV and an electron affinity of approximately 4.3 eV. An In—Ga—Zn oxide which is formed using a target having an atomic ratio of In:Ga:Zn=1:6:8 has an energy gap of approximately 3.5 eV and an electron affinity of approximately 4.4 eV. An In—Ga—Zn oxide which is formed using a target having an atomic ratio of In:Ga:Zn=1:6:10 has an energy gap of approximately 3.5 eV and an electron affinity of approximately 4.5 eV. An In—Ga—Zn oxide which is formed using a target having an atomic ratio of In:Ga:Zn=1:1:1 has an energy gap of approximately 3.2 eV and an electron affinity of approximately 4.7 eV. An In—Ga—Zn oxide which is formed using a target having an atomic ratio of In:Ga:Zn=3:1:2 has an energy gap of approximately 2.8 eV and an electron affinity of approximately 5.0 eV.

Since the insulating layer 772 and the insulating layer 726 are insulators, Ec882 and Ec886 are closer to the vacuum level (have a smaller electron affinity) than Ec883a, Ec883b, and Ec883c.

Ec883a is closer to the vacuum level than Ec883b. Specifically, Ec833a is preferably closer to the vacuum level than Ec883b by 0.05 eV or more, 0.07 eV or more, 0.1 eV or more, or 0.15 eV or more and 2 eV or less, 1 eV or less, 0.5 eV or less, or 0.4 eV or less.

Ec883c is closer to the vacuum level than Ec883b. Specifically, Ec883c is preferably closer to the vacuum level than Ec883b by 0.05 eV or more, 0.07 eV or more, 0.1 eV or more, or 0.15 eV or more and 2 eV or less, 1 eV or less, 0.5 eV or less, or 0.4 eV or less.

In the vicinity of the interface between the semiconductor layer 742a and the semiconductor layer 742b and the vicinity of the interface between the semiconductor layer 742b and the semiconductor layer 742c, mixed regions are formed; thus, the energy of the conduction band minimum continuously changes. In other words, no state or few states exist at these interfaces.

Accordingly, electrons transfer mainly through the semiconductor layer 742b in the stacked-layer structure having the above energy band structure. Therefore, even when states exist at the interface between the semiconductor layer 742a and the insulating layer 772 or at the interface between the semiconductor layer 742c and the insulating layer 726, the states hardly influence the transfer of the electrons. In addition, the states do not exist or hardly exist at the interface between the semiconductor layer 742a and the semiconductor layer 742b and at the interface between the semiconductor layer 742c and the semiconductor layer 742b; thus, transfer of electrons is not prohibited in the regions. Consequently, a high field-effect mobility can be obtained in the transistor having the stacked-layer structure of the above oxide semiconductors.

Note that although trap states 890 due to impurities or defects might be formed in the vicinity of the interface between the semiconductor layer 742a and the insulating layer 772 and in the vicinity of the interface between the semiconductor layer 742c and the insulating layer 726 as shown in FIG. 41A, the semiconductor layer 742b can be apart from the trap states owing to the existence of the semiconductor layer 742a and the semiconductor layer 742c.

In particular, in the transistor described in this embodiment, an upper surface and a side surface of the semiconductor layer 742b are in contact with the semiconductor layer 742c, and a lower surface of the semiconductor layer 742b is in contact with the semiconductor layer 742a. In this manner, the semiconductor layer 742b is surrounded by the semiconductor layers 742a and 742c, whereby the influence of the trap states can be further reduced.

Note that in the case where the energy difference between Ec883a and Ec883b or between Ec883c and Ec883b is small, electrons in the semiconductor layer 742b might reach the trap states by passing over the energy difference. The electrons are captured by the trap states, which generates negative fixed electric charge at the interface with the insulating layer, causing the threshold voltage of the transistor to be shifted in the positive direction.

Therefore, each of the energy differences between Ec883a and Ec883b and between Ec883c and Ec883b is set to be greater than or equal to 0.1 eV, preferably greater than or equal to 0.15 eV, in which case a variation in the threshold voltage of the transistor can be reduced and the transistor can have favorable electrical characteristics.

Each of the band gaps of the semiconductor layer 742a and the semiconductor layer 742c is preferably wider than that of the semiconductor layer 742b.

FIG. 41B is the energy band structure diagram showing a portion along the dashed-dotted line D3-D4 in FIG. 37B. FIG. 41B shows the energy band structure of a channel formation region of the transistor 822.

In FIG. 41B, Ec887 represents the energy of the conduction band minimum of the insulating layer 728. The semiconductor layer 742 is formed using two layers, the semiconductor layers 742a and 742b; thus, the transistor can be manufactured with improved productivity. Since the semiconductor layer 742c is not provided, the transistor including the two semiconductor layers is easily affected by the trap states 890 but can have a higher field-effect mobility than a transistor including one semiconductor layer as the semiconductor layer 742.

In accordance with one embodiment of the present invention, a transistor with a small variation in electrical characteristics can be provided. Accordingly, a semiconductor device with a small variation in electrical characteristics can be provided. In accordance with one embodiment of the present invention, a transistor with high reliability can be provided. Accordingly, a semiconductor device with high reliability can be provided.

An oxide semiconductor has an energy gap as wide as 3.0 eV or more and a high visible-light transmissivity. In a transistor obtained by processing an oxide semiconductor under appropriate conditions, the off-state current at ambient temperature (e.g., 25° C.) can be lower than or equal to 100 zA ($1 \times 10^{-10}$ A), lower than or equal to 10 zA ($1 \times 10^{-20}$ A), and further lower than or equal to 1 zA ($1 \times 10^{-21}$ A). Therefore, a semiconductor device with low power consumption can be achieved.

In accordance with one embodiment of the present invention, a transistor with low power consumption can be provided. Accordingly, a display element or a semiconductor device such as a display device with low power consumption can be provided. Moreover, a display element or a semiconductor device such as a display device with high reliability can be provided.

The transistor 850 illustrated in FIGS. 36A to 36C is described again. When the semiconductor layer 742b is provided over the projection of the insulating layer 772, the side surface of the semiconductor layer 742b can also be covered with the electrode 743. Thus, the transistor 850 has a structure in which the semiconductor layer 742b can be electrically surrounded by an electric field of the electrode 743. Such a structure of a transistor in which a semiconductor layer in which a channel is formed is electrically surrounded by an electric field of a conductive film is called a surrounded channel (s-channel) structure. A transistor with an s-channel structure is referred to as an s-channel transistor.

In an s-channel structure, a channel can be formed in the whole (bulk) of the semiconductor layer 742b. In an s-channel structure, the drain current of the transistor can be increased, so that a larger amount of on-state current can be obtained. Furthermore, the entire channel formation region of the semiconductor layer 742b can be depleted by an electric field of the electrode 743. Accordingly, the off-state current of the transistor with an s-channel structure can be further reduced.

When the projection of the insulating layer 772 is increased in height and the channel width is shortened, the effects of an s-channel structure to increase the on-state current and reduce the off-state current can be enhanced. Part of the semiconductor layer 742a exposed at the time of forming the semiconductor layer 742b may be removed. In that case, the side surfaces of the semiconductor layer 742a and the semiconductor layer 742b may be aligned with each other.

Figure 38A:
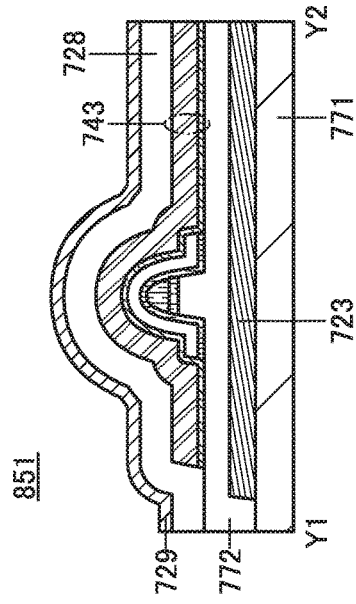
FIGS. 38A to 38C are a plan view and cross-sectional views illustrating one embodiment of a transistor.
Figure 38B:
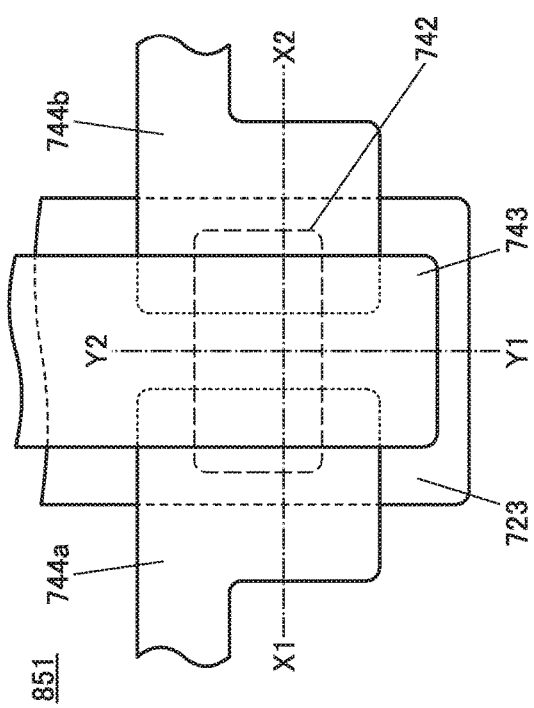
Figure 38C:
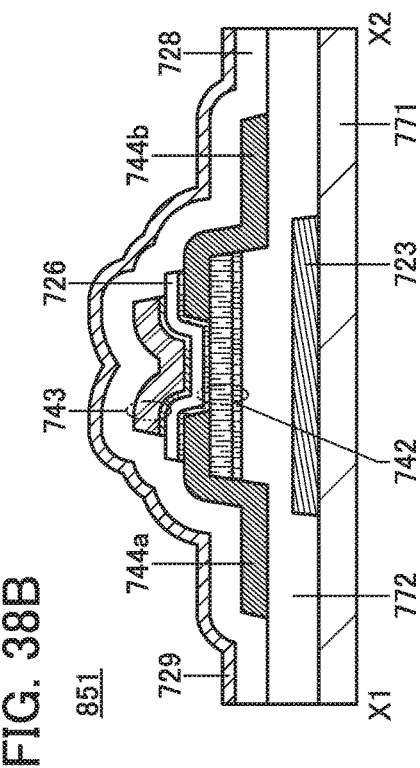

As in a transistor 851 illustrated in FIGS. 38A to 38C, the electrode 723 may be provided below the semiconductor layer 742 with an insulating layer provided therebetween. FIG. 38A is a top view of the transistor 851. FIG. 38B is a cross-sectional view taken along the dashed-dotted line X1-X2 in FIG. 38A. FIG. 38C is a cross-sectional view taken along the dashed-dotted line Y1-Y2 in FIG. 38A.

Figure 39C:
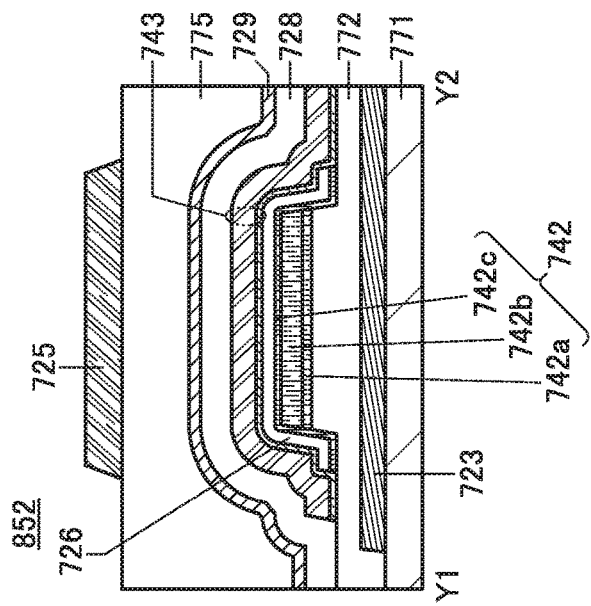
FIGS. 39A to 39C are a plan view and cross-sectional views illustrating one embodiment of a transistor.
Figure 39A:
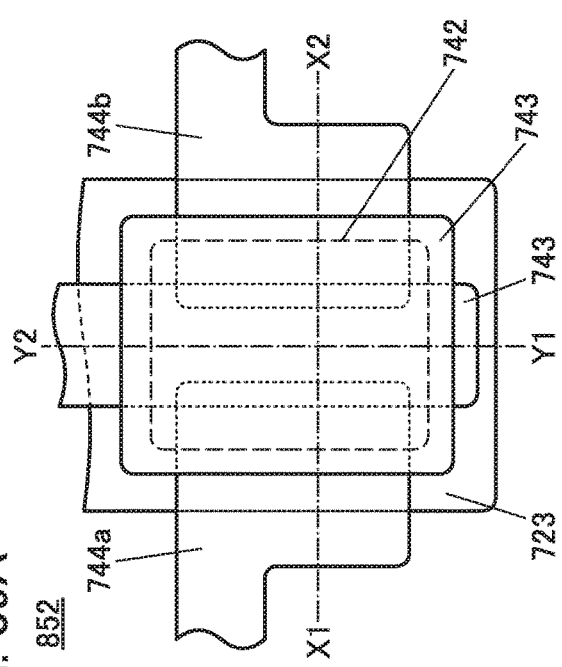
Figure 39B:
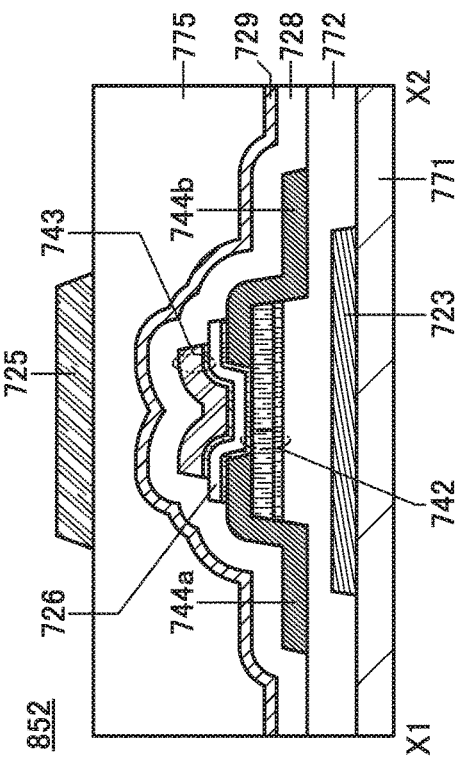

As in a transistor 852 illustrated in FIGS. 39A to 39C, an insulating layer 775 may be provided over the electrode 743, and a layer 725 may be provided over the insulating layer 775. FIG. 39A is a top view of the transistor 852. FIG. 39B is a cross-sectional view taken along the dashed-dotted line X1-X2 in FIG. 39A. FIG. 39C is a cross-sectional view taken along the dashed-dotted line Y1-Y2 in FIG. 39A.

Although the layer 725 is provided over the insulating layer 775 in FIGS. 39A to 39C, the layer 725 may be provided over the insulating layer 728 or 729. The layer 725 formed using a material with a light-blocking property can prevent a variation in characteristics, a decrease in reliability, or the like of the transistor caused by light irradiation. When the layer 725 is formed at least larger than the semiconductor layer 742b such that the semiconductor layer 742b is covered with the layer 725, the above effects can be improved. The layer 725 can be formed using an organic material, an inorganic material, or a metal material. In the case where the layer 725 is formed using a conductive material, voltage can be supplied to the layer 725 or the layer 725 may be brought into an electrically floating state.

Figure 40A:
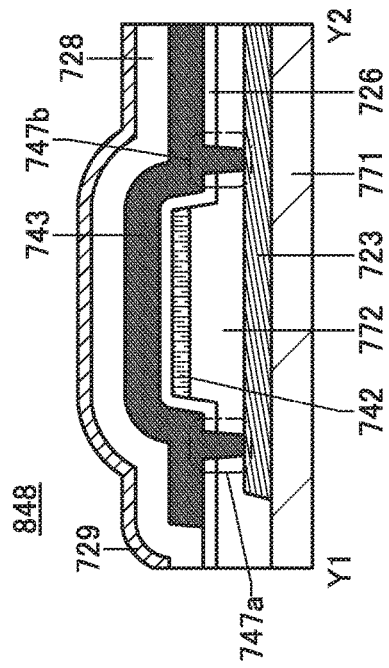
FIGS. 40A to 40C are a plan view and cross-sectional views illustrating one embodiment of a transistor.
Figure 40B:
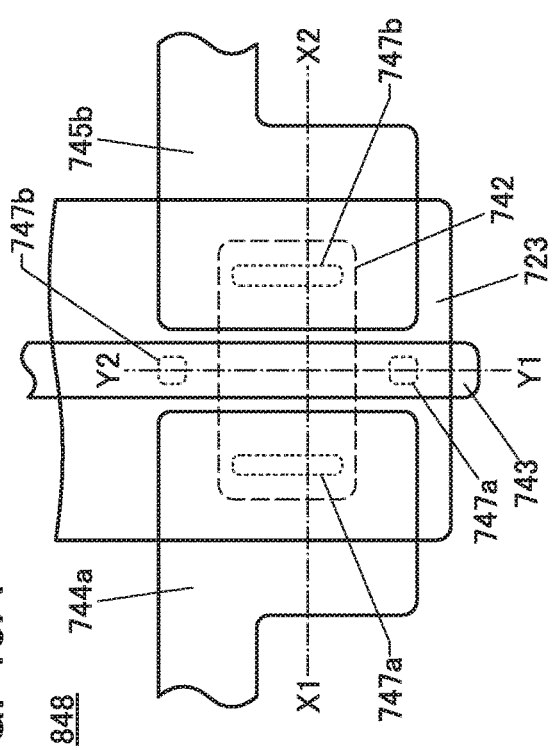
Figure 40C:
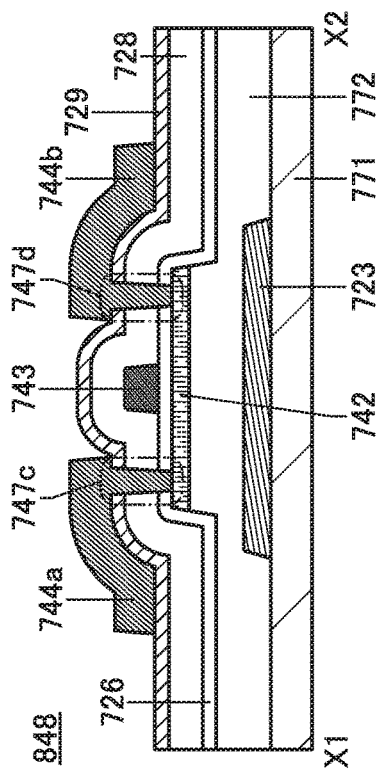

FIGS. 40A to 40C illustrate an example of a transistor with an s-channel structure. A transistor 848 illustrated in FIGS. 40A to 40C has almost the same structure as the transistor 847. In the transistor 848, the semiconductor layer 742 is formed over a projection of the insulating layer 772. The transistor 848 is a type of top-gate transistor including a back gate electrode. FIG. 40A is a top view of the transistor 848. FIG. 40B is a cross-sectional view taken along the dashed-dotted line X1-X2 in FIG. 40A. FIG. 40C is a cross-sectional view taken along the dashed-dotted line Y1-Y2 in FIG. 40A.

The electrode 744a provided over the insulating layer 729 is electrically connected to the semiconductor layer 742 through an opening 747c formed in the insulating layers 726, 728, and 729. The electrode 744b provided over the insulating layer 729 is electrically connected to the semiconductor layer 742 through an opening 747d formed in the insulating layers 726, 728, and 729.

The electrode 743 provided over the insulating layer 726 is electrically connected to the electrode 723 through the opening 747a and the opening 747b formed in the insulating layers 726 and 772. Accordingly, the same potential is supplied to the electrodes 743 and 723. Furthermore, either or neither of the openings 747a and 747b may be provided.

In the case where neither of the openings 747a and 747b is provided, different potentials can be supplied to the electrodes 723 and 743.

Note that the semiconductor layer in the transistor with an s-channel structure is not limited to an oxide semiconductor.

Other Examples

Structure examples of an n-channel transistor using a thin polycrystalline silicon (polysilicon) film is described below with reference to FIGS. 42A to 42C, FIGS. 43A to 43C, FIGS. 44A to 44C, FIGS. 45A to 45C, FIGS. 46A to 46C, and FIGS. 47A and 47B.

Figure 42A:
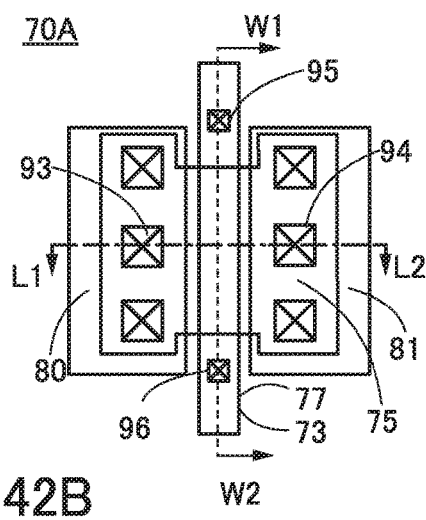
FIGS. 42A to 42C are a plan view and cross-sectional views illustrating one embodiment of a transistor.
Figure 42B:
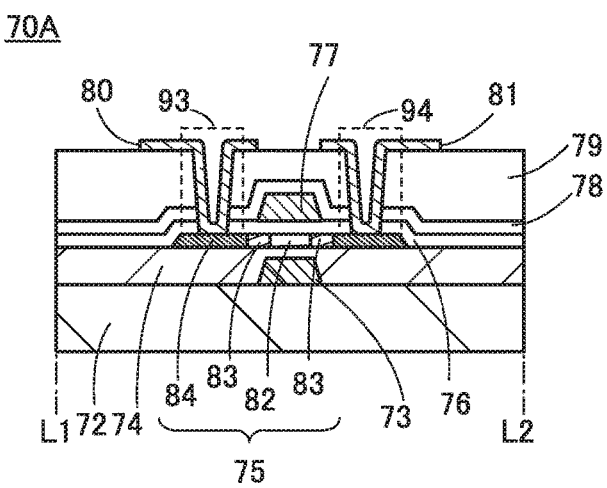
Figure 42C:
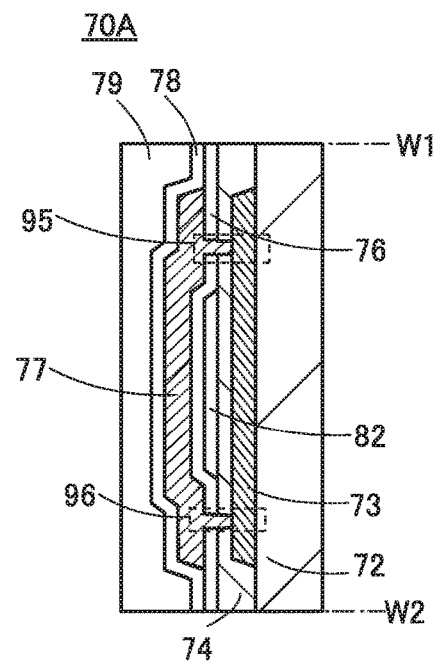

FIG. 42A is a top view of a transistor 70A. FIG. 42B is a cross-sectional view taken along line L1-L2 in FIG. 42A. FIG. 42C is a cross-sectional view taken along line W1-W2 in FIG. 42A. Note that FIG. 42B is a cross-sectional view of the transistor 70A in the channel length L direction. FIG. 42C is a cross-sectional view of the transistor 70A in the channel width W direction.

The transistor 70A includes, over a substrate 72 having an insulating surface, a conductive layer 73 functioning as a gate, an insulating layer 74 over the conductive layer 73, a semiconductor layer 75 overlapping with the conductive layer 73 with the insulating layer 74 provided therebetween, an insulating layer 76 over the semiconductor layer 75, a conductive layer 77 functioning as a gate and overlapping with the semiconductor layer 75 with the insulating layer 76 provided therebetween, an insulating layer 78 over the conductive layer 77, an insulating layer 79 over the insulating layer 78, and a conductive layer 80 and a conductive layer 81 that function as a source and a drain and are electrically connected to the semiconductor layer 75 through openings provided in the insulating layers 76, 78, and 79.

The semiconductor layer 75 includes a channel formation region 82 overlapping with the conductive layer 77, a pair of LDD regions 83 between which the channel formation region 82 is sandwiched, and a pair of impurity regions 84 between which the channel formation region 82 and the LDD regions 83 are sandwiched. The pair of impurity regions 84 functions as a source region and a drain region. An impurity element imparting n-type conductivity to the semiconductor layer 75, such as phosphorus (P) or arsenic (As), is added to the LDD regions 83 and the impurity regions 84.

The transistor 70A includes a first insulating layer (the insulating layer 74) over a first conductive layer (the conductive layer 73), the semiconductor layer 75 including the channel formation region 82 over the first insulating layer (the insulating layer 74), a second insulating layer (the insulating layer 76) over the semiconductor layer 75, and a second conductive layer (the conductive layer 77) over the second insulating layer (the insulating layer 76). The second conductive layer (the conductive layer 77) covers a side of the semiconductor layer 75 with the second insulating layer (the insulating layer 76) provided therebetween. The semiconductor layer 75 is surrounded by the first conductive layer (the conductive layer 73) and the second conductive layer (the conductive layer 77) in a cross section in the channel width direction; that is, the semiconductor layer 75 has an s-channel structure.

In the structure illustrated in FIG. 42C, current flows through the whole (bulk) of the semiconductor layer 75. Since current flows in an inner part of the semiconductor layer 75, the current is hardly affected by interface scattering, and high on-state current can be obtained. Note that as the semiconductor layer 75 is thicker, the on-state current can be increased.

In the transistor 70A, a gate electric field is applied to the semiconductor layer 75 not only in the vertical direction but also from the lateral direction. That is, the gate electric field is applied to the whole of the semiconductor layer 75, whereby current flows in the bulk of the semiconductor layer 75. It is thus possible to increase the field-effect mobility of the transistor 70A.

When the transistor has the s-channel structure, the effect that the influence due to impurities entering the semiconductor layer 75 from above and below can be avoided is provided. The first conductive layer (the conductive layer 73) and the second conductive layer (the conductive layer 77) can block the light irradiation of the semiconductor film from above and below and suppress photoexcitation, so that the off-state current can be prevented from increasing.

Although an example of an n-channel transistor is described here, a p-channel transistor can be fabricated if an impurity element which imparts a p-type conductivity, such as boron (B), aluminum (Al), or gallium (Ga) is added instead of the impurity element which imparts an n-type conductivity to the semiconductor layer 75. A slight amount of the impurity element which imparts a p-type conductivity may be added to the channel formation region 82 of the n-channel transistor 70A.

Note that the semiconductor layer 75 may be crystallized by various techniques. Examples of the various techniques of crystallization are a laser crystallization method using a laser beam and a crystallization method using a catalytic element. Alternatively, a crystallization method using a catalytic element and a laser crystallization method may be combined. In the case of using a high heat resistant substrate such as quartz as the substrate 72, any of the following crystallization methods can be used in combination: a thermal crystallization method with an electrically-heated oven, a lamp annealing crystallization method with infrared light, a crystallization method with a catalytic element, and high temperature annealing at about 950° C.

The amorphous silicon film is irradiated with a laser beam and changed into a polycrystalline silicon film, and the polycrystalline silicon film is used as the channel formation region 82 of the transistor 70A. In this case, a larger amount of current flows through the bulk of the semiconductor film than through the interface of the semiconductor film because grain boundaries formed by the laser beam irradiation reach below the polycrystalline silicon film. Therefore, the influence due to variations of laser beam irradiation energy can be decreased.

A threshold value is conventionally controlled by addition of a low-concentration impurity element to a channel formation region. When a semiconductor layer is sandwiched between a pair of gate electrodes, carriers are likely to be produced at an interface between the semiconductor layer and the insulating layer. The carriers are injected into the insulating film or the interface between the insulating film and the semiconductor layer, and there is a problem in that the threshold value increases. According to the energy band structure of this channel formation region, the carriers have a path only in the vicinity of the interface between the semiconductor layer and the insulating film. Therefore, a decrease in the mobility or the drain current due to injection of hot carriers which are accelerated by voltage applied to the drain into the interface between the insulating film and the semiconductor layer or into the insulating film is a big problem.

In the transistor 70A, a gate electric field is applied to the semiconductor film not only in the vertical direction but also from the lateral direction. That is, the gate electric field is applied to the whole of the semiconductor film, whereby current flows in the bulk of the semiconductor film. Consequently, the field-effect mobility of the transistor can be increased.

Although the transistor 70A includes the conductive layer 77 functioning as a gate and the conductive layer 73 functioning as a back gate in FIG. 42A, another structure can be used. For example, a transistor without the conductive layer 73 functioning as a back gate electrode may be partly provided depending on circuits to be used.

In FIG. 42A, the conductive layer 77 functioning as a gate is tapered. When an impurity region is formed in a self-aligned manner by doping the semiconductor layer with an impurity element with the use of the tapered gate electrode, a semiconductor device in which hot-carrier degradation is not likely to occur can be provided.

Figure 43A:
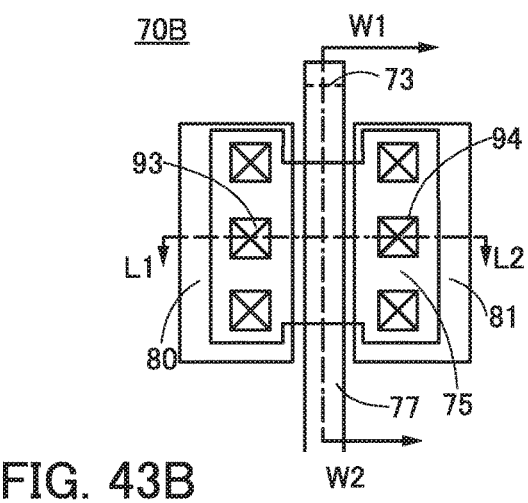
FIGS. 43A to 43C are a plan view and cross-sectional views illustrating one embodiment of a transistor.
Figure 43C:
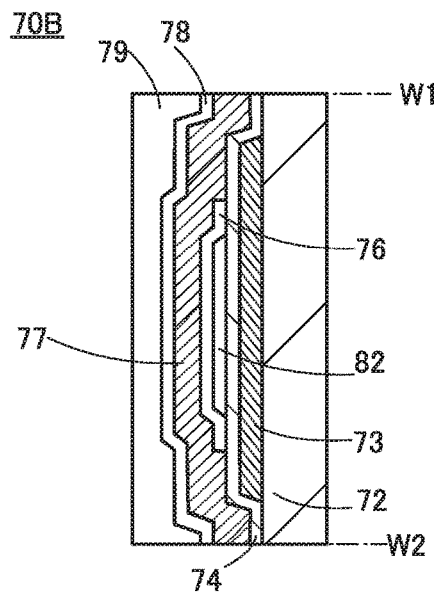
Figure 43B:
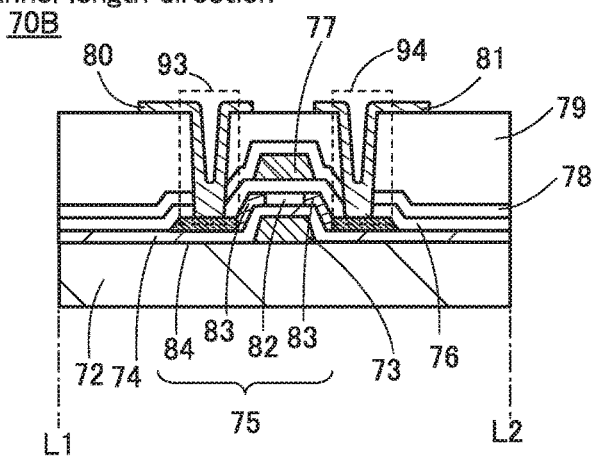

Although the conductive layer 77 functioning as a gate is electrically connected to the conductive layer 73 functioning as a back gate electrode in the transistor 70A, different potentials may be applied to them. Such an example is illustrated in FIGS. 43A to 43C. FIG. 43A is a top view of a transistor 70B. FIG. 43B is a cross-sectional view taken along line L1-L2 in FIG. 43A. FIG. 43C is a cross-sectional view taken along line W1-W2 in FIG. 43A.

The transistor 70B in FIGS. 43A to 43C is different from the transistor 70A in the kind of the insulating layer 74. An insulating film obtained by a plasma CVD method is used as the insulating layer 74 in the transistor 70B. There is a convex portion on the insulating film surface formed due to the existence of the conductive layer 73 functioning as a back gate electrode, and the semiconductor film is formed thereover; thus, the semiconductor film surface also has a convex reflecting the surface shape thereunder.

A channel formation region of the transistor 70B also has an s-channel structure, in which a channel formation region is surrounded by the conductive layer 77 functioning as a gate and the conductive layer 73 functioning as a back gate electrode.

Figure 44A:
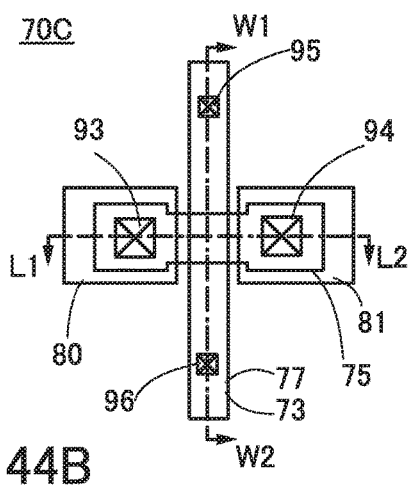
FIGS. 44A to 44C are a plan view and cross-sectional views illustrating one embodiment of a transistor.
Figure 44C:
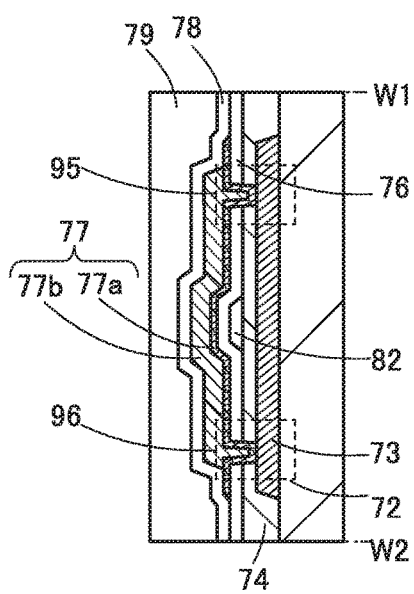
Figure 44B:
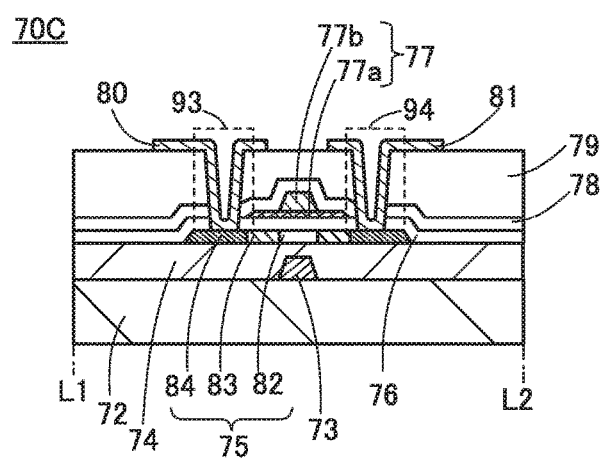

In addition, FIG. 44A is a top view of a transistor 70C. FIG. 44B is a cross-sectional view taken along line L1-L2 in the channel length direction of the transistor 70C. FIG. 44C is a cross-sectional view taken along line W1-W2 in the channel width direction of the transistor 70C.

FIG. 44A shows the conductive layer 77, the conductive layer 73, the semiconductor layer 75, the conductive layer 80, the conductive layer 81, an opening 93, an opening 94, an opening 95, and an opening 96. The conductive layer 77 serves as a gate. The conductive layer 73 serves as a back gate. The openings 93 and 94 are openings for connecting the semiconductor layer 75 and the conductive layers 80 and 81. The openings 95 and 96 are openings for electrically connecting the conductive layers 77 and 73.

In FIG. 44B, the transistor 70C includes, over the substrate 72, the conductive layer 73, the insulating layer 74, the semiconductor layer 75 overlapping with the conductive layer 73 with the insulating layer 74 provided therebetween, the insulating layer 76 over the semiconductor layer 75, a conductive layer 77a and a conductive layer 77b that function as gates and overlap with the semiconductor layer 75 with the insulating layer 76 provided therebetween, the insulating layer 78 over the conductive layer 77a and the conductive layer 77b, the insulating layer 79 over the insulating layer 78, and the conductive layer 80 and the conductive layer 81 that function as a source and a drain and are electrically connected to the semiconductor layer 75 through openings 93 and 94 provided in the insulating layers 76, 78, and 79.

FIG. 44C shows, over the substrate 72, the conductive layer 73, the insulating layer 74, the semiconductor layer 75, the insulating layer 76, the conductive layer 77a and the conductive layer 77b which are electrically connected to the conductive layer 73 in the openings 95 and 96, the insulating layer 78 over the conductive layers 77a and 77b, and the insulating layer 79 over the insulating layer 78. The semiconductor layer 75 includes the channel formation region 82, the LDD region 83, and the impurity region 84. The structure of the conductive layers 77a and 77b allows doping through a region of the conductive layer 77a which does not overlap with the conductive layer 77b, whereby the impurity regions can be formed in a self-aligned manner. The length of the LDD region overlapping with the conductive layer 77a is determined by the conductive layer 77b, which serves as a mask in the ion doping. The conductive layers 77a and 77b can serve as masks in the ion doping, the LDD region overlapping with the conductive layer 77a can be formed in a self-aligned manner, and the length (Lov) can be adjusted to a desired length. In addition, the length of the LDD region overlapping with the conductive layer 77a can be accurately determined and the lifetime against hot-carrier degradation can be extended, so that a highly reliable semiconductor device can be manufactured with high yield.

The transistor 70C has a structure in which the channel formation region 82 of the semiconductor layer 75 is electrically surrounded in the channel width direction by the conductive layer 77 functioning as a gate and the conductive layer 73 functioning as a back gate which is electrically connected to the conductive layer 77. That is, the structure can be a structure in which the channel formation region is wrapped from the upper side, lower side, and side surfaces. Thus, the on-state current can be increased and the size in the channel width direction can be reduced. In addition, the channel formation region is surrounded by the conductive film in this structure, so that light can be easily blocked in the channel formation region. Furthermore, photoexcitation due to unintentional light irradiation of the channel formation region can be suppressed.

The transistor 70C can be prevented from being turned on owing to an unintentional increase of the conductivity of a side edge of the semiconductor layer 75 in the W1-W2 direction. The influence due to distribution variations of the impurity elements added to the LDD region 83 and the impurity region 84 can be reduced.

In addition, the structure shown in FIGS. 44A to 44C can avoid an electrical connection at the side ends of the semiconductor layer 75 in the W1-W2 direction caused by an undesired increase in conductivity. The influence of non-uniform distribution of impurity elements added to the semiconductor layer 75 can be reduced.

Although the structure shown in FIGS. 44A to 44C is a structure in which the gate and the back gate are electrically connected to each other, a structure in which the gate and the back gate are supplied with different potentials as shown in FIGS. 43A to 43C is also effective. This structure is particularly effective in a circuit formed using only n-channel transistors. That is, the threshold voltage of the transistor can be controlled by voltage application to the back gate; thus, a logic circuit such as an inverter circuit can be formed using ED-MOS transistors whose threshold voltages are different from each other. The use of such a logic circuit as a driver circuit for driving pixels can reduce the area occupied by the driver circuit, so that a display device having a narrower frame can be provided. The voltage of the back gate is set to a voltage at which the transistor is turned off, whereby the off-state current can be further decreased when the transistor is turned off. Therefore, even when the display device has a large refresh rate, written voltage can be kept being held. This should reduce power consumption of the display device due to a smaller number of writings.

Note that the top view and the cross-sectional views of FIGS. 44A to 44C show just one example, and another structure can be employed. For example, FIGS. 45A to 45C are a top view and cross-sectional views different from those of FIGS. 44A to 44C.

Figure 45A:
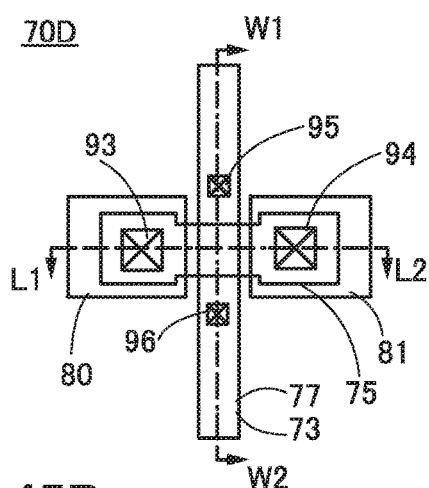
FIGS. 45A to 45C are a plan view and cross-sectional views illustrating one embodiment of a transistor.
Figure 45C:
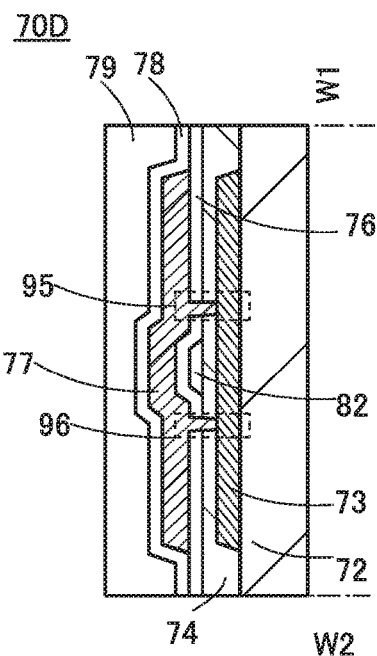
Figure 45B:
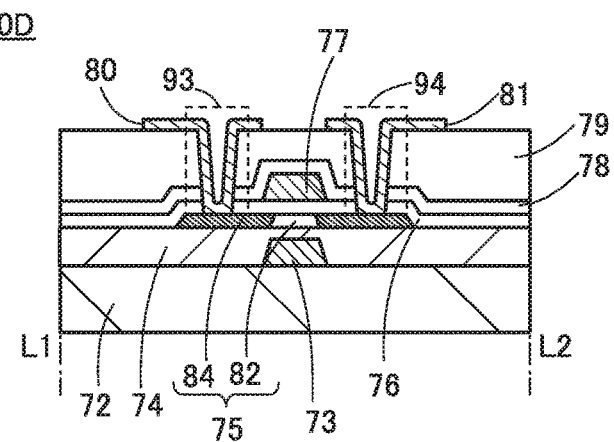

A transistor 70D shown in FIGS. 45A to 45C is different from the transistor 70C shown in FIGS. 44A to 44C in that the conductive layer 77 functioning as a gate is a single layer and the openings 95 and 96 are positioned closer to the channel formation region 82. This can make it easier to apply an electric field to the channel formation region from the upper side, lower side, and side surfaces of the channel formation region in the transistor 70D. In addition, the transistor 70D with this structure also has the s-channel structure like the transistor 70C, and can have the effect thereof. Effects similar to those of the structure in FIGS. 44A to 44C can be obtained from the s-channel structure shown in FIGS. 45A to 45C.

FIGS. 46A to 46C show a top view and cross-sectional views of a structure different from those of FIGS. 44A to 44C and FIGS. 45A to 45C.

A structure shown in FIGS. 46A to 46C is different from the structures shown in FIGS. 44A to 44C and FIGS. 45A to 45C in that the conductive layer 73 functioning as a back gate of the transistor 70E is formed of a conductive layer 73a and a conductive layer 73b and the conductive layer 73b is surrounded by the conductive layer 73a. Effects similar to those of the structure in FIGS. 44A to 44C can be obtained from the s-channel structure shown in FIGS. 46A to 46C.

In addition, even when a metal containing an element having mobility (e.g., copper (Cu)) is used for the conductive layer 73b in the structure shown in FIGS. 46A to 46C, deterioration of the semiconductor film due to entry of the element having mobility into the semiconductor film can be prevented.

Note that, as materials of the conductive layer 73a functioning as a barrier film positioned over a surface on which a wiring is formed, any of tungsten (W), molybdenum (Mo), chromium (Cr), titanium (Ti), and tantalum (Ta), which are high melting point materials, an alloy thereof (e.g., W—Mo, Mo—Cr, or Ta—Mo), a nitride thereof (e.g., tungsten nitride, titanium nitride, tantalum nitride, nitride containing titanium and silicon), or the like can be used. A sputtering method, a CVD method, or the like can be adopted as the formation method. As the materials for the conductive layer 73b, copper (Cu) is preferable; however, there is no particular limitation as long as the materials are low resistance materials. For example, silver (Ag), aluminum (Al), gold (Au), an alloy thereof, or the like can also be used. As the formation method of the conductive layer 73b, a sputtering method is preferable; however, a CVD method can be adopted as long as conditions that do not damage the resist mask are selected.

Figure 47A:
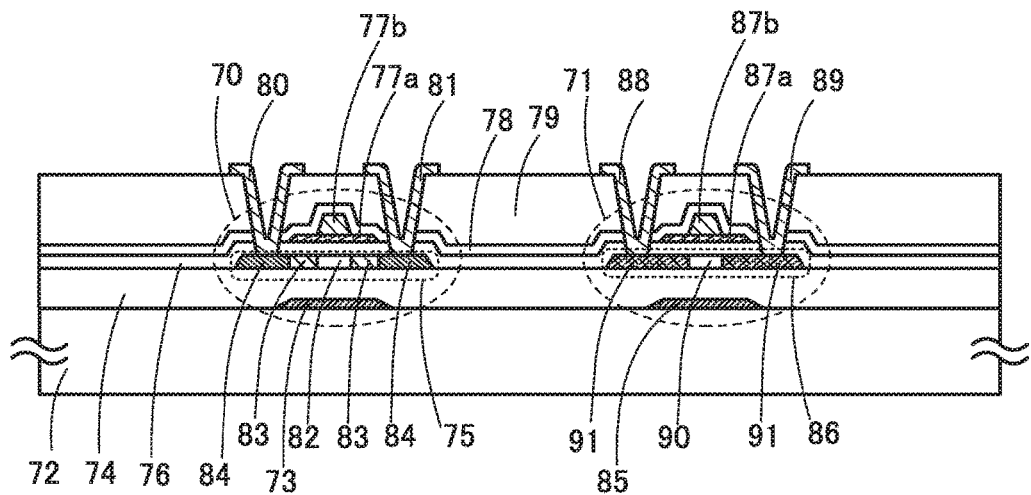
FIGS. 47A and 47B are cross-sectional views each illustrating one embodiment of a transistor.
Figure 47B:
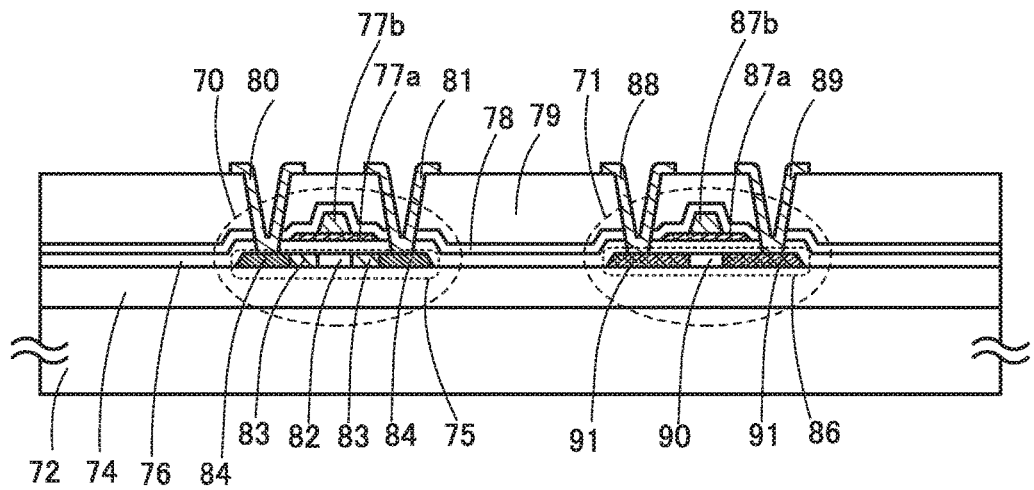

FIGS. 47A and 47B each show the n-channel transistor 70 and the p-channel transistor 71.

An example is shown here in which an n-channel transistor 70 and a p-channel transistor 71 are formed on the same substrate. A CMOS circuit or the like can be formed by a combination of the n-channel transistor 70 and the p-channel transistor 71.

The transistor 70 includes, over the substrate 72 having an insulating surface, the conductive layer 73 functioning as a gate, the insulating layer 74 over the conductive layer 73, the semiconductor layer 75 overlapping with the conductive layer 73 with the insulating layer 74 provided therebetween, the insulating layer 76 over the semiconductor layer 75, the conductive layer 77a and the conductive layer 77b functioning as gates and overlapping with the semiconductor layer 75 with the insulating layer 76 provided therebetween, the insulating layer 78 over the conductive layers 77a and 77b, the insulating layer 79 over the insulating layer 78, and the conductive layer 80 and the conductive layer 81 functioning as a source and a drain and electrically connected to the semiconductor layer 75 through openings provided in the insulating layers 76, 78, and 79.

The width in the channel length direction of the conductive layer 77b is shorter than that of the conductive layer 77a. The conductive layers 77a and 77b are stacked in this order from the insulating layer 76 side. The semiconductor layer 75 includes the channel formation region 82 overlapping with the conductive layer 77b, the pair of LDD regions 83 between which the channel formation region 82 is sandwiched, and the pair of impurity regions 84 between which the channel formation region 82 and the LDD regions 83 are sandwiched. The pair of impurity regions 84 functions as a source region and a drain region.

The transistor 71 includes, over the substrate 72 having an insulating surface, a conductive layer 85 functioning as a gate, the insulating layer 74 over the conductive layer 85, a semiconductor layer 86 overlapping with the conductive layer 85 with the insulating layer 74 provided therebetween, the insulating layer 76 over the semiconductor layer 86, a conductive layer 87a and a conductive layer 87b functioning as gates and overlapping with the semiconductor layer 86 with the insulating layer 76 provided therebetween, the insulating layer 78 over the conductive layers 87a and 87b, the insulating layer 79 over the insulating layer 78, and a conductive layer 88 and a conductive layer 89 functioning as a source and a drain and electrically connected to the semiconductor layer 86 through openings provided in the insulating layers 76, 78, and 79.

The width in the channel length direction of the conductive layer 87b is shorter than that of the conductive layer 87a. The conductive layers 87a and 87b are stacked in this order from the insulating layer 76 side. The semiconductor layer 86 includes a channel formation region 90 overlapping with the conductive layer 87b, and a pair of impurity regions 91 between which the channel formation region 90 is sandwiched. The pair of impurity regions 91 functions as a source region and a drain region.

Although FIG. 47A illustrates a structure including the conductive layers 77a and 77b functioning as gates and the conductive layer 73 functioning as a back gate electrode, another structure can be used. For example, the conductive layer 73 functioning as a back gate electrode may be omitted as shown in FIG. 47B. Although FIG. 47A illustrates a structure including the conductive layers 87a and 87b functioning as gates and the conductive layer 85 functioning as a back gate electrode, another structure can be used. For example, the conductive layer 85 functioning as a back gate electrode may be omitted as shown in FIG. 47B.

The n-channel transistor 70 in FIG. 47A has an s-channel structure as in Embodiment 1 and corresponds to the transistor 70C in FIG. 44B. A top view of the n-channel transistor 70 in FIG. 47A corresponds to the top view of the transistor 70C in FIG. 44B. A cross-sectional view in the channel width direction of the n-channel transistor 70 in FIG. 47A corresponds to the cross-sectional view of the transistor 70C in FIG. 44C.

FIGS. 48A to 48C and FIGS. 49A to 49C are top views and cross-sectional views of transistors partly different from the above transistors.

Figure 48A:
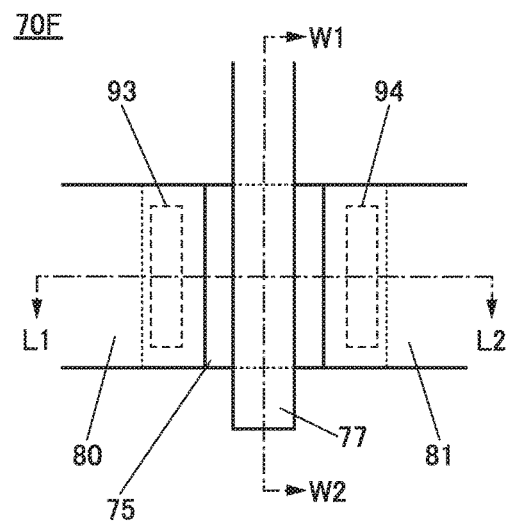
FIGS. 48A to 48C are a plan view and cross-sectional views illustrating one embodiment of a transistor.
Figure 48C:
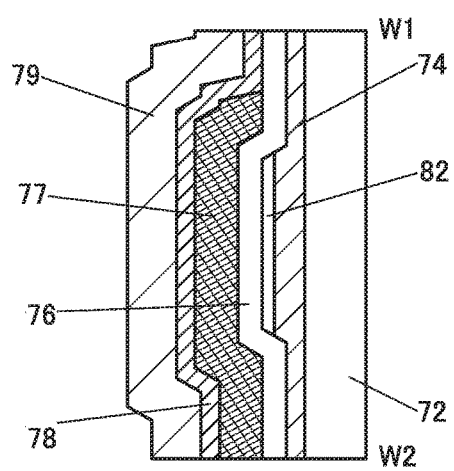
Figure 48B:
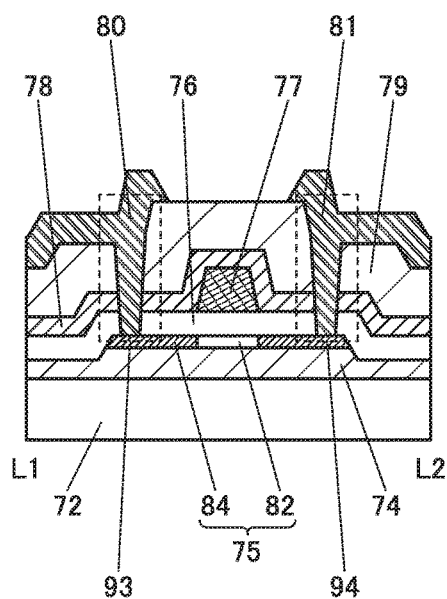

A transistor 70F shown in FIGS. 48A to 48C has a so-called staggered structure.

The transistor 70F includes the insulating layer 74 over the substrate 72, the semiconductor layer 75 over the insulating layer 74, the insulating layer 76 over the insulating layer 74 and the semiconductor layer 75, the conductive layer 77 over the insulating layer 76, the insulating layer 78 over the insulating layer 76 and the conductive layer 77, the insulating layer 79 over the insulating layer 78, and the conductive layer 80 and the conductive layer 81 over the insulating layer 79. The semiconductor layer 75 includes the channel formation region 82 and the impurity region 84. The semiconductor layer 75 may include an LDD region.

The conductive layer 80 is electrically connected to the semiconductor layer 75 through the opening 93 provided in the insulating layers 76, 78, and 79. The conductive layer 81 is electrically connected to the semiconductor layer 75 through the opening 94 provided in the insulating layers 76, 78, and 79.

The insulating layer 74 functions as a base insulating layer. Part of the insulating layer 76 functions as a gate insulating layer, and part of the conductive layer 77 functions as a gate electrode. The insulating layer 78 and the insulating layer 79 function as interlayer insulating layers. Part of the conductive layer 80 functions as a source electrode, and part of the conductive layer 81 functions as a drain electrode. The transistor 70F has a so-called self-aligned structure where the impurity region 84 is formed in a region of the semiconductor layer 75 which does not overlap with the conductive layer 77. The transistor 70F is also a single-gate transistor.

Figure 49A:
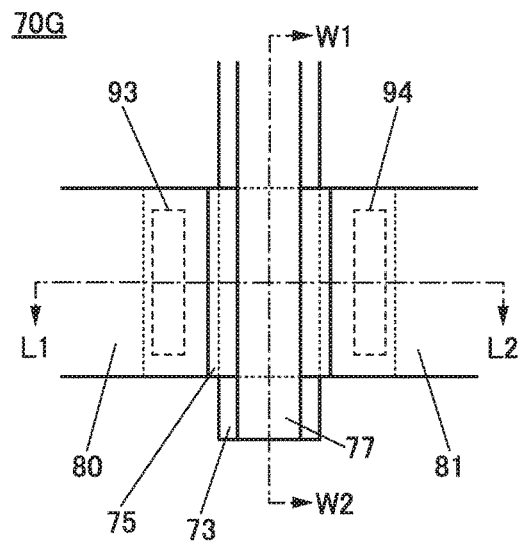
FIGS. 49A to 49C are a plan view and cross-sectional views illustrating one embodiment of a transistor.
Figure 49C:
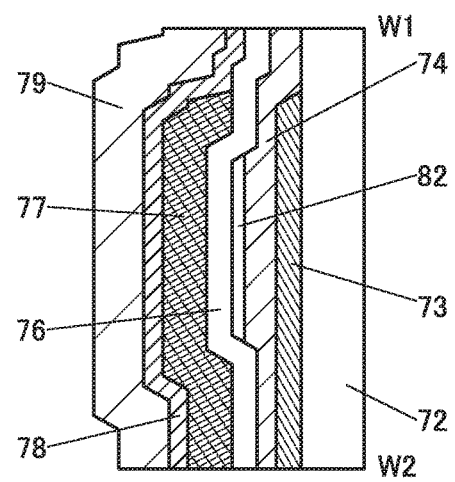
Figure 49B:
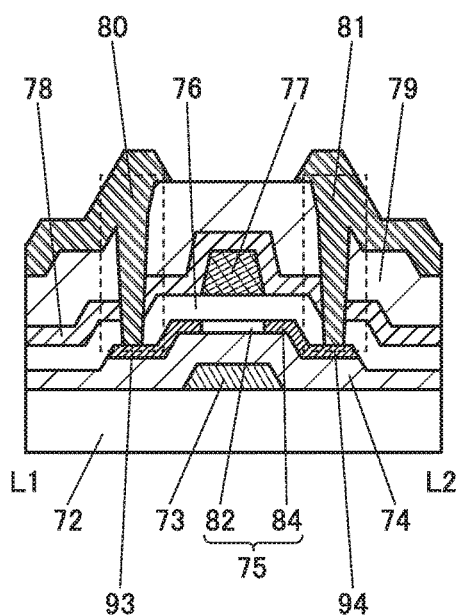

A transistor 70G shown in FIGS. 49A to 49C has a so-called staggered structure in which a back gate electrode is provided for the above-described transistor 70F.

The conductive layer 73 part of which functions as a back gate electrode is positioned below the insulating layer 74. In the transistor 70G, the channel formation region 82 is positioned between the conductive layer 73 and the conductive layer 77. It is preferable that the conductive layer 73 and the conductive layer 77 be electrically connected to each other in a region which is not illustrated.

As illustrated in FIGS. 49B and 49C, a region of the insulating layer 74 which does not overlap with the semiconductor layer 75 is thinner than a region of the insulating layer 74 which overlaps with the semiconductor layer 75. With such a structure, side surfaces of the channel formation region 82 can be covered by the conductive layer 77. Thus, a gate electric field can be effectively applied to the channel formation region 82 from the side surface direction.

At least part of this embodiment can be implemented in combination with any of the other embodiments described in this specification as appropriate.

Embodiment 4

In this embodiment, a structure example of a touch panel module including a touch panel of one embodiment of the present invention and an IC will be described with reference to drawings.

Figure 50:
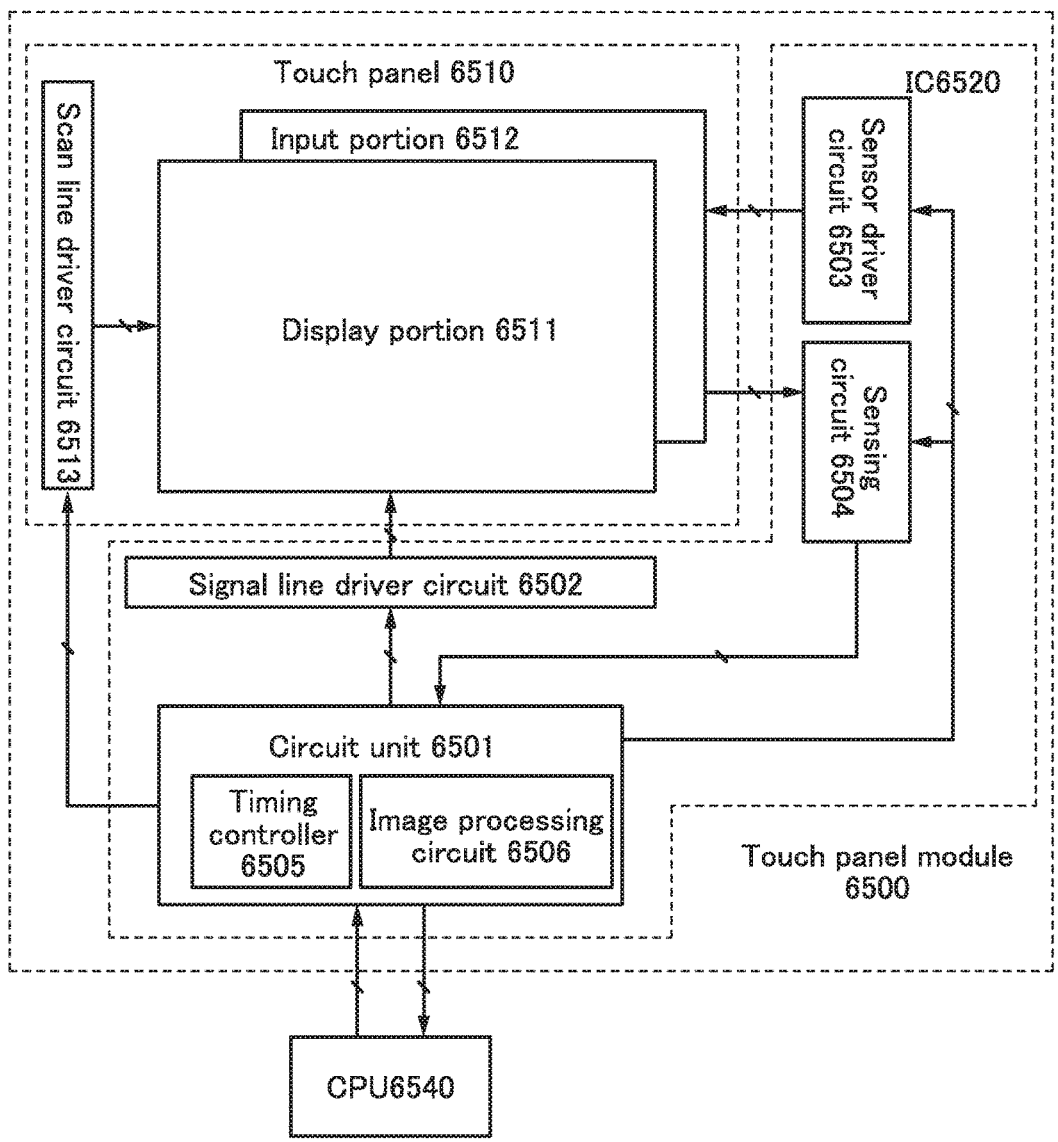
FIG. 50 is a block diagram of a touch panel module of an embodiment.

FIG. 50 is a block diagram of a touch panel module 6500. The touch panel module 6500 includes a touch panel 6510 and an IC 6520.

The touch panel 6510 includes a display portion 6511, an input portion 6512, and a scan line driver circuit 6513. The display portion 6511 includes a plurality of pixels, a plurality of signal lines, and a plurality of scan lines and has a function of displaying an image. The input portion 6512 includes a plurality of sensor elements for sensing an object that is in contact with or in proximity to the touch panel 6510 and functions as a touch sensor. The scan line driver circuit 6513 has a function of outputting scan signals to the scan lines included in the display portion 6511.

The display portion 6511 and the input portion 6512 are separately illustrated in the touch panel 6510 for simplicity; however, a so-called in-cell touch panel having both a function of displaying an image and a function of a touch sensor is preferable.

As a touch sensor that can be used for the input portion 6512, a capacitive touch sensor can be used. Examples of the capacitive touch sensor are a surface capacitive touch sensor and a projected capacitive touch sensor. Examples of the projected capacitive touch sensor include a self-capacitive touch sensor and a mutual capacitive touch sensor. The use of a mutual capacitive touch sensor is preferable because multiple points can be sensed simultaneously.

As the input portion 6512, any of various sensors that can sense the proximity or contact of an object such as a finger or a stylus can be used. For the touch sensor, in addition to a capacitive type, a variety of types such as a resistive type, a surface acoustic wave type, an infrared type, and an optical type can be used, for example.

As typical examples of the in-cell touch panel, a semi-in-cell type and a full-in-cell type can be given. The semi-in-cell type refers to a structure in which an electrode or the like included in a touch sensor is provided over a substrate that supports a display element and a counter substrate or over the counter substrate. Meanwhile, a full-in-cell type refers to a structure in which an electrode or the like included in a touch sensor is provided over a substrate that supports a display element. In the case of a full-in-cell touch panel, a structure of a counter substrate can be simplified, which is preferable. In particular, when an electrode included in a display element also serves as an electrode in a touch sensor in a full-in-cell touch sensor, a manufacturing process can be simplified and manufacturing cost can be reduced, which is preferable.

The resolution of the display portion 6511 is preferably as high as HD (number of pixels: 1280×720), FHD (number of pixels: 1920×1080), WQHD (number of pixels: 2560×1440), WQXGA (number of pixels: 2560×1600), 4K (number of pixels: 3840×2160), or 8K (number of pixels: 7680×4320). In particular, resolution of 4K, 8K, or higher is preferable. The pixel density (definition) of the pixels in the display portion 6511 is higher than or equal to 300 ppi, preferably higher than or equal to 500 ppi, more preferably higher than or equal to 800 ppi, more preferably higher than or equal to 1000 ppi, more preferably higher than or equal to 1200 ppi. The display portion 6511 with such high resolution and high definition enables an increase in a realistic sensation, sense of depth, and the like in personal use such as portable use and home use.

The IC 6520 includes a circuit unit 6501, a signal line driver circuit 6502, a sensor driver circuit 6503, and a sensing circuit 6504. The circuit unit 6501 includes a timing controller 6505, an image processing circuit 6506, or the like.

The signal line driver circuit 6502 has a function of outputting a video signal that is an analog signal to a signal line included in the display portion 6511. For example, the signal line driver circuit 6502 can include a shift register circuit and a buffer circuit in combination. The touch panel 6510 may include a demultiplexer circuit connected to a signal line.

The sensor driver circuit 6503 has a function of outputting a signal for driving a sensor element included in the input portion 6512. As the sensor driver circuit 6503, a shift register circuit and a buffer circuit can be used in combination, for example.

The sensing circuit 6504 has a function of outputting, to the circuit unit 6501, an output signal from the sensor element included in the input portion 6512. The sensing circuit 6504 can include an amplifier circuit and an analog-digital converter (ADC), for example. In that case, the sensing circuit 6504 converts an analog signal output from the input portion 6512 into a digital signal to be output to the circuit unit 6501.

The image processing circuit 6506 included in the circuit unit 6501 has a function of generating and outputting a signal for driving the display portion 6511 of the touch panel 6510, a function of generating and outputting a signal for driving the input portion 6512, and a function of analyzing a signal output from the input portion 6512 and outputting the signal to a CPU 6540.

As specific examples, the image processing circuit 6506 has the following functions: a function of generating a video signal in accordance with an instruction from the CPU 6540; a function of performing signal processing on a video signal in accordance with the specification of the display portion 6511, converting the signal into an analog video signal, and supplying the converted signal to the signal line driver circuit 6502; a function of generating a driving signal output to the sensor driver circuit 6503 in accordance with an instruction from the CPU 6540; and a function of analyzing a signal input from the sensing circuit 6504 and outputting the analyzed signal to the CPU 6540 as positional information.

The timing controller 6505 may have a function of generating and outputting a signal (e.g., a clock signal or a start pulse signal) output to the scan line driver circuit 6513 and the sensor driver circuit 6503 on the basis of a synchronization signal included in a video signal or the like on which the image processing circuit 6506 performs processing. Furthermore, the timing controller 6505 may have a function of generating and outputting a signal for determining timing when the sensing circuit 6504 outputs a signal. Here, the timing controller 6505 preferably outputs synchronized signals as the signal output to the scan line driver circuit 6513 and the signal output to the sensor driver circuit 6503. In particular, it is preferable that a period in which data in a pixel in the display portion 6511 is rewritten and a period in which sensing is performed with the input portion 6512 be separately provided. For example, the touch panel 6510 can be driven by dividing one frame period into a period in which data in a pixel is rewritten and a period in which sensing is performed. Furthermore, detection sensitivity and detection accuracy can be increased, for example, by providing two or more sensing periods in one frame period.

The image processing circuit 6506 can include a processor, for example. A microprocessor such as a digital signal processor (DSP) or a graphics processing unit (GPU) can be used, for example. Furthermore, such a microprocessor may be obtained with a programmable logic device (PLD) such as a field programmable gate array (FPGA) or a field programmable analog array (FPAA). The image processing circuit 6506 interprets and executes instructions from various programs with the processor to process various kinds of data and control programs. The programs executed by the processor may be stored in a memory region included in the processor or a memory device which is additionally provided.

A transistor which includes an oxide semiconductor in a channel formation region and has an extremely low off-state current can be used in the display portion 6511 or the scan line driver circuit 6513 included in the touch panel 6510, the circuit unit 6501, the signal line driver circuit 6502, the sensor driver circuit 6503, or the sensing circuit 6504 included in the IC 6520, the CPU 6540 provided outside the touch panel module 6500, or the like. With the use of the transistor having an extremely low off-state current as a switch for holding electric charge (data) which flows into a capacitor serving as a memory element, a long data retention period can be ensured. For example, by utilizing the characteristic for a register or a cache memory of the image processing circuit 6506, normally off computing is achieved where the image processing circuit 6506 operates only when needed and data on the previous processing is stored in the memory element in the rest of time; thus, power consumption of the touch panel module 6500 and an electronic device on which the touch panel module 6500 is mounted can be reduced.

Although the structure where the circuit unit 6501 includes the timing controller 6505 and the image processing circuit 6506 is used here, the image processing circuit 6506 itself or a circuit having a function of part of the image processing circuit 6506 may be provided outside the IC 6520. Alternatively, the CPU 6540 may have a function of the image processing circuit 6506 or part thereof. For example, the circuit unit 6501 can include the signal line driver circuit 6502, the sensor driver circuit 6503, the sensing circuit 6504, and the timing controller 6505.

Although the example where the IC 6520 includes the circuit unit 6501 is shown here, the structure where the circuit unit 6501 is not included in the IC 6520 may be employed. In that case, the IC 6520 can include the signal line driver circuit 6502, the sensor driver circuit 6503, and the sensing circuit 6504. For example, in the case where the touch panel module 6500 includes a plurality of ICs, the circuit unit 6501 may be separately provided and a plurality of ICs 6520 without the circuit unit 6501 may be provided, and alternatively, the IC 6520 and an IC including only the signal line driver circuit 6502 can be provided in combination.

When an IC has a function of driving the display portion 6511 of the touch panel 6510 and a function of driving the input portion 6512 as described above, the number of ICs mounted on the touch panel module 6500 can be reduced; accordingly, cost can be reduced.

Figure 51A:
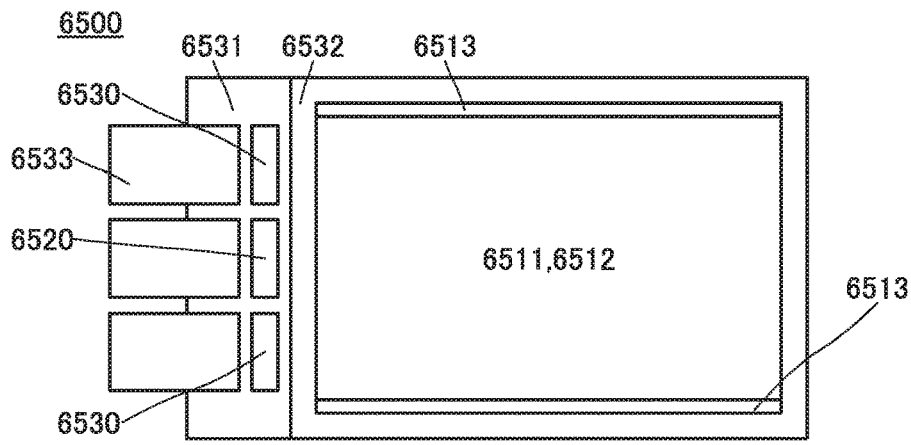
FIGS. 51A to 51C illustrate structure examples of a touch panel module of an embodiment.
Figure 51B:
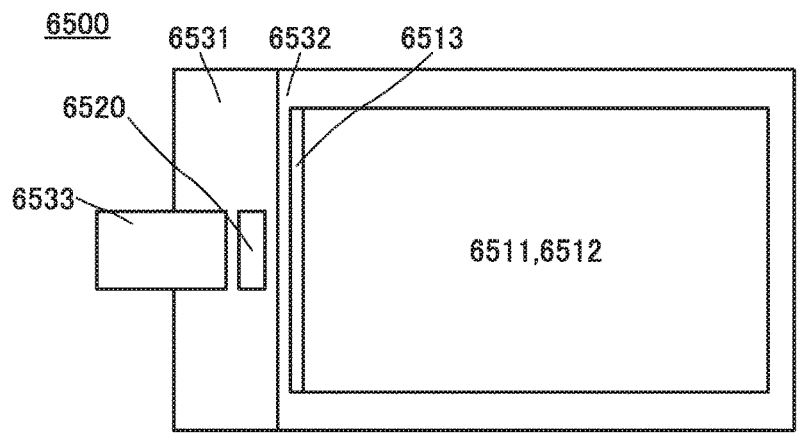
Figure 51C:
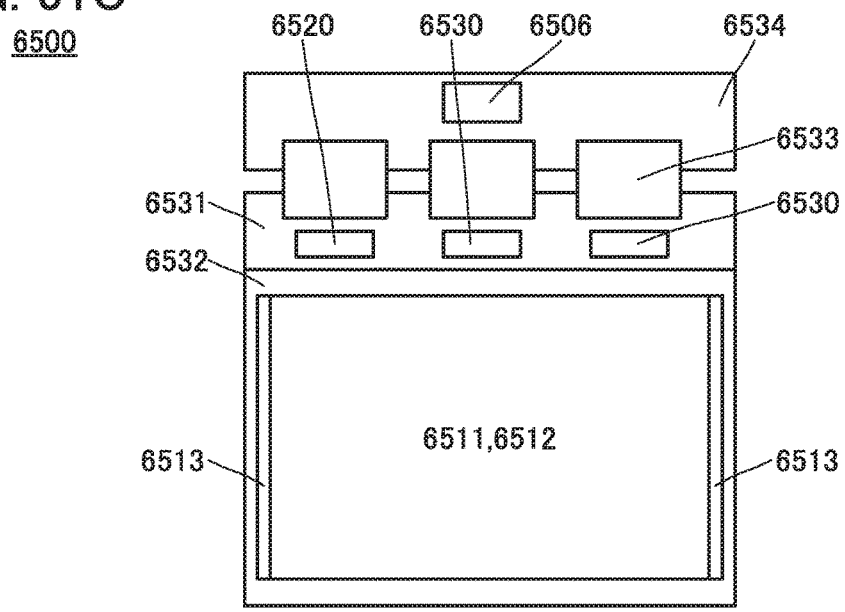

FIGS. 51A to 51C each are a schematic diagram of the touch panel module 6500 on which the IC 6520 is mounted.

In FIG. 51A, the touch panel module 6500 includes a substrate 6531, a counter substrate 6532, a plurality of FPCs 6533, the IC 6520, ICs 6530, and the like. The display portion 6511, the input portion 6512, and the scan line driver circuits 6513 are provided between the substrate 6531 and the counter substrate 6532. The IC 6520 and the ICs 6530 are mounted on the substrate 6531 by a COG method.

The IC 6530 is an IC in which only the signal line driver circuit 6502 is provided in the above-described IC 6520 or an IC in which the signal line driver circuit 6502 and the circuit unit 6501 are provided in the above-described IC 6520. The IC 6520 and the IC 6530 are supplied with a signal from the outside through the FPCs 6533. Furthermore, a signal can be output to the outside from the IC 6520 or the IC 6530 through the FPC 6533.

FIG. 51A illustrates an example where the display portion 6511 is positioned between two scan line driver circuits 6513. The ICs 6530 are provided in addition to the IC 6520. Such a structure is preferable in the case where the display portion 6511 has extremely high resolution.

FIG. 51B illustrates an example where one IC 6520 and one FPC 6533 are provided. It is preferable to bring functions into one IC 6520 in this manner because the number of components can be reduced. In the example in FIG. 51B, the scan line driver circuit 6513 is provided along a side close to the FPC 6533 among two short sides of the display portion 6511.

FIG. 51C illustrates an example where a printed circuit board (PCB) 6534 on which the image processing circuit 6506 and the like are mounted is provided. The ICs 6520 and 6530 over the substrate 6531 are electrically connected to the PCB 6534 through the FPCs 6533. The above-described structure without the image processing circuit 6506 can be applied to the IC 6520.

In each of FIGS. 51A to 51C, the IC 6520 or the IC 6530 may be mounted on the FPC 6533, not on the substrate 6531. For example, the IC 6520 or the IC 6530 may be mounted on the FPC 6533 by a chip on film (COF) method, a tape automated bonding (TAB) method, or the like.

A structure where the FPC 6533, the IC 6520 (and the IC 6530), or the like is provided on a short side of the display portion 6511 as illustrated in FIGS. 51A and 51B enables the frame of the display device to be narrowed; thus, the structure is preferably used for electronic devices such as smartphones, mobile phones, and tablet terminals, for example. The structure with the PCB 6534 illustrated in FIG. 51C can be preferably used for television devices, monitors, tablet terminals, or laptop personal computers, for example.

At least part of this embodiment can be implemented in combination with any of the other embodiments described in this specification as appropriate.

Embodiment 5

In this embodiment, a display module and electronic devices that include the display device of one embodiment of the present invention or a display system will be described with reference to FIG. 52, FIGS. 53A to 53H, and FIGS. 54A and 54B.

Figure 52:
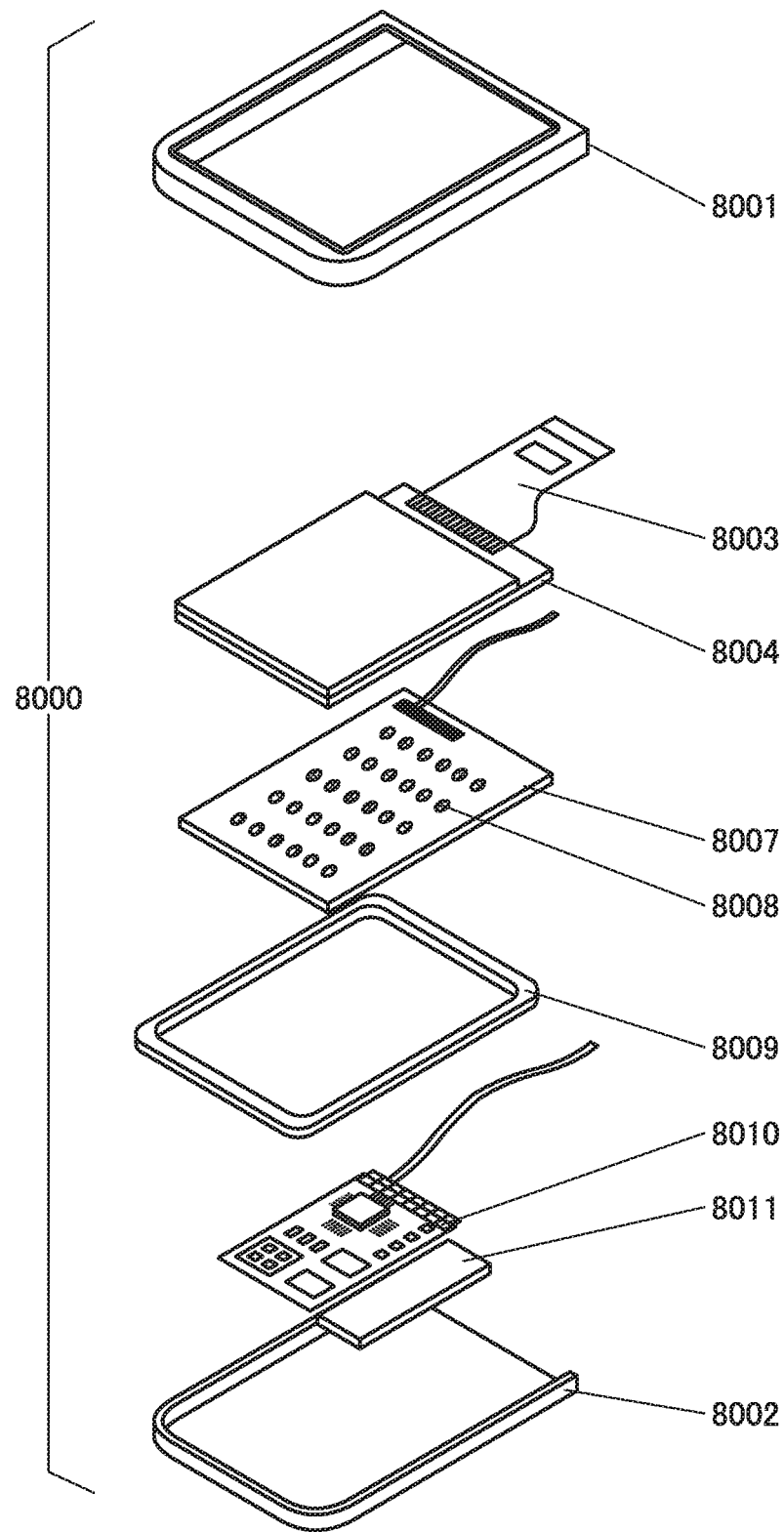
FIG. 52 illustrates a display module of an embodiment.

In a display module 8000 illustrated in FIG. 52, a touch panel 8004 connected to an FPC 8003, a frame 8009, a printed board 8010, and a battery 8011 are provided between an upper cover 8001 and a lower cover 8002.

The display panel, the touch panel, or the touch panel module of one embodiment of the present invention can be used for the touch panel 8004, for example.

The shapes and sizes of the upper cover 8001 and the lower cover 8002 can be changed as appropriate in accordance with the size of the touch panel 8004.

The touch panel 8004 can be a resistive touch panel or a capacitive touch panel and may be formed so as to overlap with a display panel. A counter substrate (sealing substrate) of the touch panel 8004 can have a touch panel function. A photosensor may be provided in each pixel of the touch panel 8004 so that an optical touch panel can be obtained.

In the case of a transmissive or a semi-transmissive liquid crystal element, a backlight 8007 may be provided as illustrated in FIG. 52. The backlight 8007 includes a light source 8008. Note that although a structure in which the light source 8008 is provided over the backlight 8007 is illustrated in FIG. 52, one embodiment of the present invention is not limited to this structure. For example, a structure in which the light source 8008 is provided at an end portion of the backlight 8007 and a light diffusion plate is further provided may be employed. Note that the backlight 8007 needs not be provided in the case where a self-luminous light-emitting element such as an organic EL element is used or in the case where a reflective panel or the like is employed.

The frame 8009 protects the touch panel 8004 and functions as an electromagnetic shield for blocking electromagnetic waves generated by the operation of the printed board 8010. The frame 8009 can also function as a radiator plate.

The printed board 8010 is provided with a power supply circuit and a signal processing circuit for outputting a video signal and a clock signal. As a power source for supplying electric power to the power supply circuit, an external commercial power source or a power source using the battery 8011 provided separately may be used. The battery 8011 can be omitted in the case of using a commercial power source.

The touch panel 8004 can be additionally provided with a component such as a polarizing plate, a retardation plate, or a prism sheet.

FIGS. 53A to 53H and FIGS. 54A and 54B illustrate electronic devices. These electronic devices can each include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone 5008, and the like.

Figure 53A:
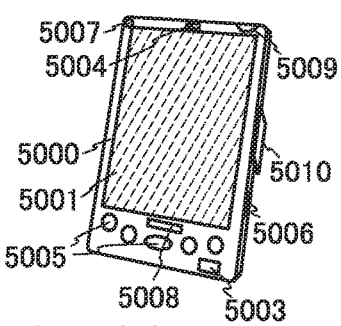
FIGS. 53A to 53H each illustrate an electronic device of an embodiment.

FIG. 53A illustrates a mobile computer, which can include a switch 5009, an infrared port 5010, and the like in addition to the above components.

Figure 53B:
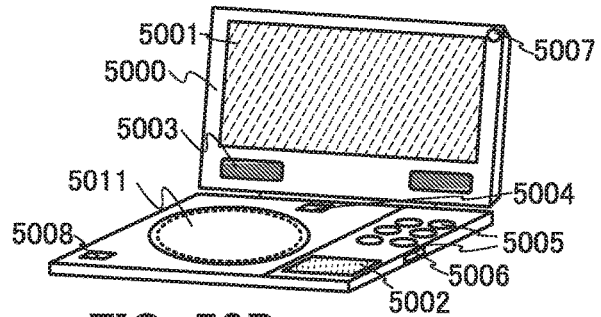

FIG. 53B illustrates a portable image reproducing device provided with a recording medium (e.g., a DVD reproducing device), which can include a second display portion 5002, a recording medium reading portion 5011, and the like in addition to the above components.

Figure 53C:
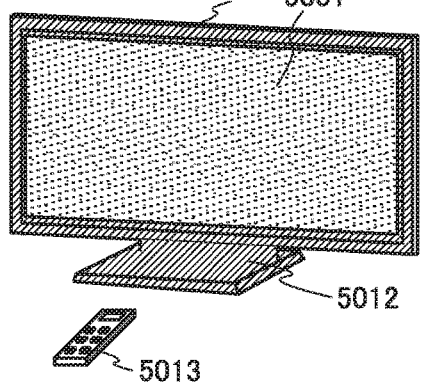

FIG. 53C illustrates a television device, which can include a stand 5012 and the like in addition to the above components. The television device can be operated by an operation switch of the housing 5000 or a separate remote controller 5013. With operation keys of the remote controller 5013, channels and volume can be controlled, and images displayed on the display portion 5001 can be controlled. The remote controller 5013 may be provided with a display portion for displaying data output from the remote controller 5013.

Figure 53D:
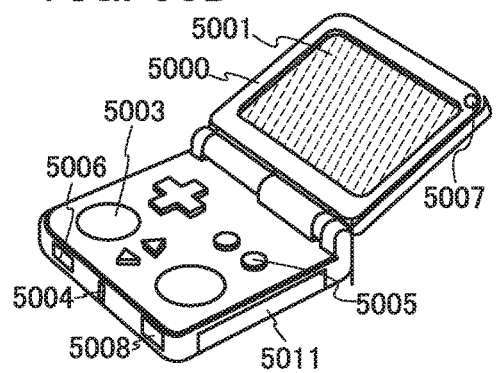

FIG. 53D illustrates a portable game machine, which can include the recording medium reading portion 5011 and the like in addition to the above components.

Figure 53E:
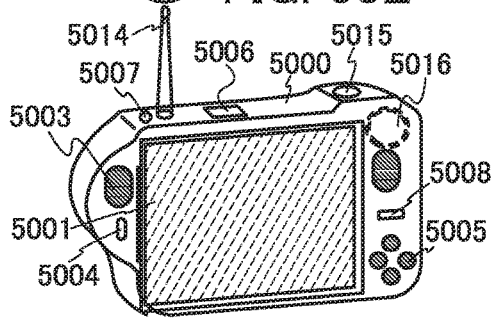

FIG. 53E illustrates a digital camera that has a television reception function and can include an antenna 5014, a shutter button 5015, an image receiving portion 5016, and the like in addition to the above components.

Figure 53F:
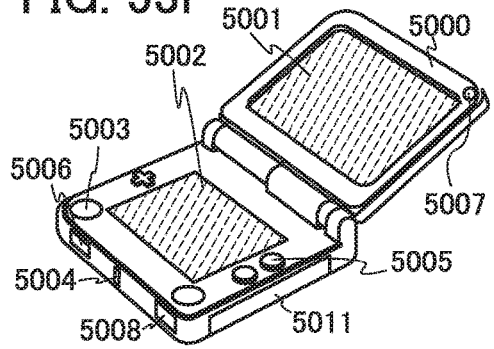

FIG. 53F illustrates a portable game machine, which can include the second display portion 5002, the recording medium reading portion 5011, and the like in addition to the above components.

Figure 53G:
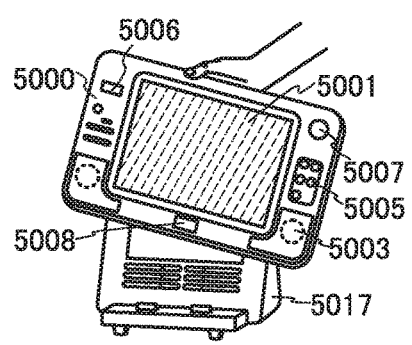

FIG. 53G illustrates a portable television receiver, which can include a charger 5017 capable of transmitting and receiving signals, and the like in addition to the above components.

Figure 53H:
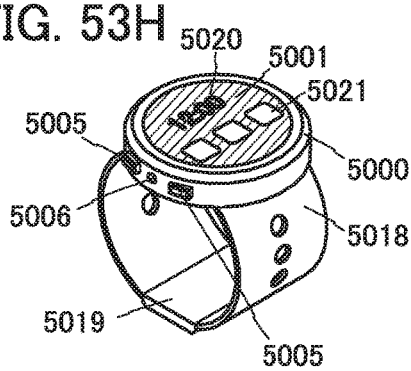

FIG. 53H illustrates a wrist-watch-type information terminal, which can include a band 5018, a clasp 5019, and the like in addition to the above components. The display portion 5001 mounted in the housing 5000 also serving as a bezel includes a non-rectangular display region. The display portion 5001 can display an icon 5020 indicating time, another icon 5021, and the like.

Figure 54A:
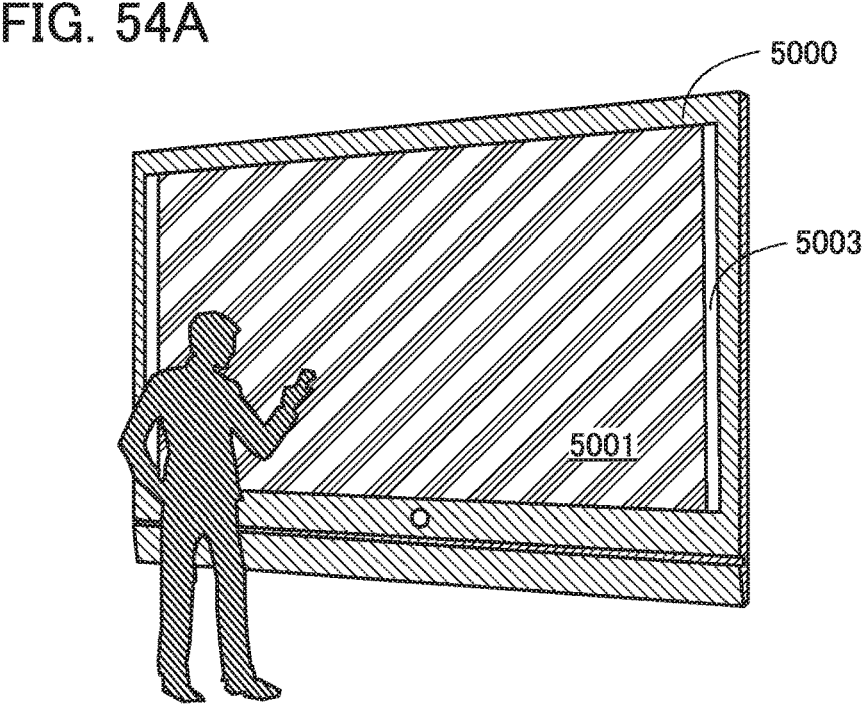
FIGS. 54A and 54B each illustrate an electronic device of an embodiment.
Figure 54B:
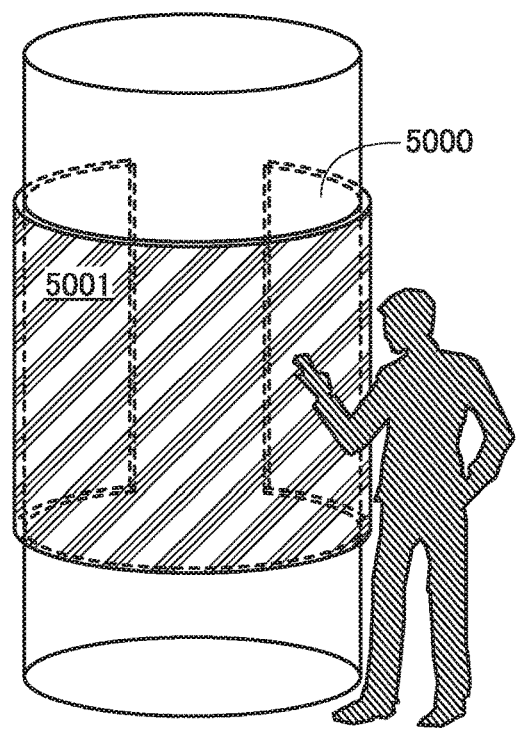

FIG. 54A illustrates a digital signage. FIG. 54B illustrates a digital signage mounted on a cylindrical pillar.

The electronic devices illustrated in FIGS. 53A to 53H and FIGS. 54A and 54B can have a variety of functions, for example, a function of displaying a variety of information (e.g., a still image, a moving image, and a text image) on a display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading a program or data stored in a recording medium and displaying the program or data on a display portion. Furthermore, the electronic device including a plurality of display portions can have a function of displaying image information mainly on one display portion while displaying text information mainly on another display portion, a function of displaying a three-dimensional image by displaying images where parallax is considered on a plurality of display portions, or the like. Furthermore, the electronic device including an image receiving portion can have a function of photographing a still image, a function of photographing a moving image, a function of automatically or manually correcting a photographed image, a function of storing a photographed image in a recording medium (an external recording medium or a recording medium incorporated in the camera), a function of displaying a photographed image on a display portion, or the like. Note that the functions of the electronic devices illustrated in FIGS. 53A to 53H and FIGS. 54A and 54B are not limited thereto, and the electronic devices can have a variety of functions.

The electronic devices in this embodiment each include a display portion for displaying some kind of information. The display panel, the touch panel, the touch panel module, or the like of one embodiment of the present invention can be used for the display portion.

At least part of this embodiment can be implemented in combination with any of the other embodiments described in this specification as appropriate.

This application is based on Japanese Patent Application serial no. 2015-095745 filed with Japan Patent Office on May 8, 2015 and Japanese Patent Application serial no. 2015-095796 filed with Japan Patent Office on May 8, 2015, the entire contents of which are hereby incorporated by reference.

What is claimed is:
1. A touch panel comprising:
a first substrate;
a first conductive layer;
a second conductive layer;

a third conductive layer;
a fourth conductive layer; and
a liquid crystal layer,
wherein the third conductive layer is over the first substrate,
wherein the fourth conductive layer is apart from the third conductive layer on a same plane,
wherein the liquid crystal layer is above the third conductive layer,
wherein the second conductive layer is above the liquid crystal layer,
wherein the first conductive layer is above the second conductive layer,
wherein the first conductive layer has a mesh shape comprising a plurality of openings,
wherein the second conductive layer is configured to transmit visible light and comprises a portion overlapping with the third conductive layer and a portion overlapping with the fourth conductive layer,
wherein the third conductive layer and the fourth conductive layer are configured to transmit visible light,
wherein the third conductive layer comprises a portion overlapping with one of the plurality of openings,
wherein the fourth conductive layer comprises a portion overlapping with another one of the plurality of openings, and
wherein the first conductive layer is between the third conductive layer and the fourth conductive layer in a plan view.

2. The touch panel according to claim 1,
wherein the second conductive layer serves as a common electrode, and
wherein the third conductive layer and the fourth conductive layer each serve as a pixel electrode.

3. The touch panel according to claim 1, wherein the second conductive layer is electrically connected to a terminal supplied with a constant potential.

4. The touch panel according to claim 1,
wherein a second substrate is above the first conductive layer, and
wherein the first conductive layer and the second conductive layer are formed over the second substrate.

5. The touch panel according to claim 1,
wherein a light-blocking layer is above the first conductive layer, and
wherein the light-blocking layer and the first conductive layer overlap with each other in a region.

6. The touch panel according to claim 1, wherein a circularly polarizing plate is above the first conductive layer.

7. The touch panel according to claim 1,
wherein a first coloring layer and a second coloring layer are above the third conductive layer,
wherein the first coloring layer comprises a region overlapping with the one of the plurality of openings, and
wherein the second coloring layer comprises a region overlapping with another one of the plurality of openings.

8. The touch panel according to claim 7, wherein the first conductive layer comprises a portion overlapping with at least one of the first coloring layer and the second coloring layer.

9. The touch panel according to claim 8,
wherein the transistor comprises a first gate electrode and a second gate electrode,
wherein the first gate electrode is below the semiconductor layer,
wherein the second gate electrode is above the semiconductor layer, and
wherein the second gate electrode, the semiconductor layer, and the third conductive layer overlap with each other in a region.

10. The touch panel according to claim 8,
wherein the transistor comprises a first gate electrode and a second gate electrode,
wherein the first gate electrode is below the semiconductor layer,
wherein the second gate electrode is above the semiconductor layer, and
wherein the second gate electrode, the semiconductor layer, and the third conductive layer overlap with each other in a region.

11. The touch panel according to claim 1,
wherein a spacer is above the third conductive layer and below the second conductive layer, and
wherein the spacer comprises a portion overlapping with the first conductive layer.

12. The touch panel according to claim 1,
wherein a transistor is between the liquid crystal layer and the first substrate,
wherein one of a source and a drain of the transistor is electrically connected to the third conductive layer, and
wherein the transistor comprises a semiconductor layer containing an oxide semiconductor.

13. The touch panel according to claim 12,
wherein the transistor comprises a first gate electrode and a second gate electrode,
wherein the first gate electrode is below the semiconductor layer,
wherein the second gate electrode is above the semiconductor layer, and
wherein the second gate electrode, the semiconductor layer, and the third conductive layer overlap with each other in a region.

14. The touch panel according to claim 13, wherein the second gate electrode and the semiconductor layer comprise a same metal element.

15. The touch panel according to claim 1,
wherein a transistor is between the liquid crystal layer and the first substrate,
wherein one of a source and a drain of the transistor is electrically connected to the third conductive layer, and
wherein the transistor comprises a semiconductor layer containing amorphous silicon, polycrystalline silicon, or single crystal silicon.

16. A touch panel comprising:
a first substrate;
a first conductive layer;
a second conductive layer;
a third conductive layer;
a fourth conductive layer;
a fifth conductive layer; and
a liquid crystal layer,
wherein the fifth conductive layer is over the first substrate,
wherein the fifth conductive layer comprises a portion overlapping with the third conductive layer and a portion overlapping with the fourth conductive layer,
wherein the fourth conductive layer is apart from the third conductive layer on a same plane,
wherein the liquid crystal layer is above the third conductive layer and the fifth conductive layer,
wherein the second conductive layer is above the liquid crystal layer, wherein the first conductive layer is above the second conductive layer, wherein the first conductive layer has a mesh shape comprising a plurality of openings, wherein the second conductive layer is configured to transmit visible light and comprises a portion overlapping with the third conductive layer and a portion overlapping with the fourth conductive layer, wherein the third conductive layer comprises a portion overlapping with one of the plurality of openings, wherein the fourth conductive layer comprises a portion overlapping with another one of the plurality of openings, wherein the fifth conductive layer is configured to transmit visible light or the third conductive layer and the fourth conductive layer are configured to transmit visible light, wherein the first conductive layer is between the third conductive layer and the fourth conductive layer in a plan view, wherein the third conductive layer or the fifth conductive layer has a comb-like shape or comprises a slit, wherein the one of the plurality of openings, the third conductive layer, and the fifth conductive layer overlap with each other in a first region, and wherein the one of the plurality of openings overlaps with one of the third conductive layer and the fifth conductive layer and does not overlap with the other of the third conductive layer and the fifth conductive layer in a second region.

17. The touch panel according to claim 16,
wherein the third conductive layer and the fourth conductive layer each serve as a pixel electrode, and
wherein the fifth conductive layer serves as a common electrode.

18. The touch panel according to claim 16, wherein the fifth conductive layer is below the third conductive layer and the fourth conductive layer.

19. The touch panel according to claim 16, wherein the second conductive layer is electrically connected to a terminal supplied with a constant potential.

20. The touch panel according to claim 16,
wherein a second substrate is above the first conductive layer, and
wherein the first conductive layer and the second conductive layer are formed over the second substrate.

21. The touch panel according to claim 16,
wherein a light-blocking layer is above the first conductive layer, and
wherein the light-blocking layer and the first conductive layer overlap with each other in a region.

22. The touch panel according to claim 16, wherein a circularly polarizing plate is above the first conductive layer.

23. The touch panel according to claim 16,
wherein a first coloring layer and a second coloring layer are above the third conductive layer,
wherein the first coloring layer comprises a region overlapping with the one of the plurality of openings, and
wherein the second coloring layer comprises a region overlapping with another one of the plurality of openings.

24. The touch panel according to claim 23, wherein the first conductive layer comprises a portion overlapping with at least one of the first coloring layer and the second coloring layer.

25. The touch panel according to claim 16,
wherein a spacer is above the third conductive layer and below the second conductive layer, and
wherein the spacer comprises a portion overlapping with the first conductive layer.

26. The touch panel according to claim 16,
wherein a transistor is between the liquid crystal layer and the first substrate,
wherein one of a source and a drain of the transistor is electrically connected to the third conductive layer, and
wherein the transistor comprises a semiconductor layer containing an oxide semiconductor.

27. The touch panel according to claim 26,
wherein the transistor comprises a first gate electrode and a second gate electrode,
wherein the first gate electrode is below the semiconductor layer,
wherein the second gate electrode is above the semiconductor layer, and
wherein the second gate electrode, the semiconductor layer, and the third conductive layer overlap with each other in a region.

28. The touch panel according to claim 27, wherein the second gate electrode and the semiconductor layer comprise a same metal element.

29. The touch panel according to claim 16,
wherein a transistor is between the liquid crystal layer and the first substrate,
wherein one of a source and a drain of the transistor is electrically connected to the third conductive layer, and
wherein the transistor comprises a semiconductor layer containing amorphous silicon, polycrystalline silicon, or single crystal silicon.

* * * * *